United States Patent
Ooi et al.

(10) Patent No.: US 6,362,913 B2
(45) Date of Patent: Mar. 26, 2002

(54) OPTICAL MODULATION APPARATUS AND METHOD OF CONTROLLING OPTICAL MODULATOR

(75) Inventors: Hiroki Ooi; Hiroshi Nakamoto; George Ishikawa; Takuji Yamamoto; Yoshinori Nishizawa, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/773,660

(22) Filed: Feb. 2, 2001

Related U.S. Application Data

(62) Division of application No. 09/348,166, filed on Jul. 7, 1999, now Pat. No. 6,278,539.

(30) Foreign Application Priority Data

Nov. 25, 1998 (JP) .......................................... 10-333958

(51) Int. Cl.[7] ................................................. G02F 1/03
(52) U.S. Cl. ........................ 359/245; 359/238; 359/276; 359/279; 359/161
(58) Field of Search ................................. 359/245, 246, 359/237, 238, 278, 279, 276, 123, 127, 161, 181, 189, 139

(56) References Cited

U.S. PATENT DOCUMENTS

| | | | |
|---|---|---|---|
| 5,717,510 A | * | 2/1998 | Ishikawa et al. ............ 359/161 |
| 5,870,213 A | * | 2/1999 | Ishikawa et al. ............ 359/135 |
| 5,896,217 A | * | 4/1999 | Ishikawa et al. ............ 359/189 |
| 6,118,564 A | * | 9/2000 | Ooi et al. .................... 359/139 |

* cited by examiner

Primary Examiner—Loha Ben
(74) Attorney, Agent, or Firm—Staas & Halsey LLP

(57) ABSTRACT

An optical modulator having a voltage-optical output characteristic in which optical output varies periodically with respect to a voltage value of an electrical drive signal is driven by a modulator driving voltage signal, which has an amplitude of $2 \cdot V\pi$ between two light-emission culminations or two light extinction culminations of the voltage-optical output characteristic. A low-frequency superimposing unit superimposes a prescribed low-frequency signal on the modulator driving voltage signal, and an operating-point controller controls the operating point of the optical modulator by detecting operating-point drift of the optical modulator based upon the low-frequency signal component contained in an optical signal output from the optical modulator and controlling the bias voltage of the optical modulator in dependence upon the drift of the operating point of the optical modulator.

16 Claims, 40 Drawing Sheets

FIG.12
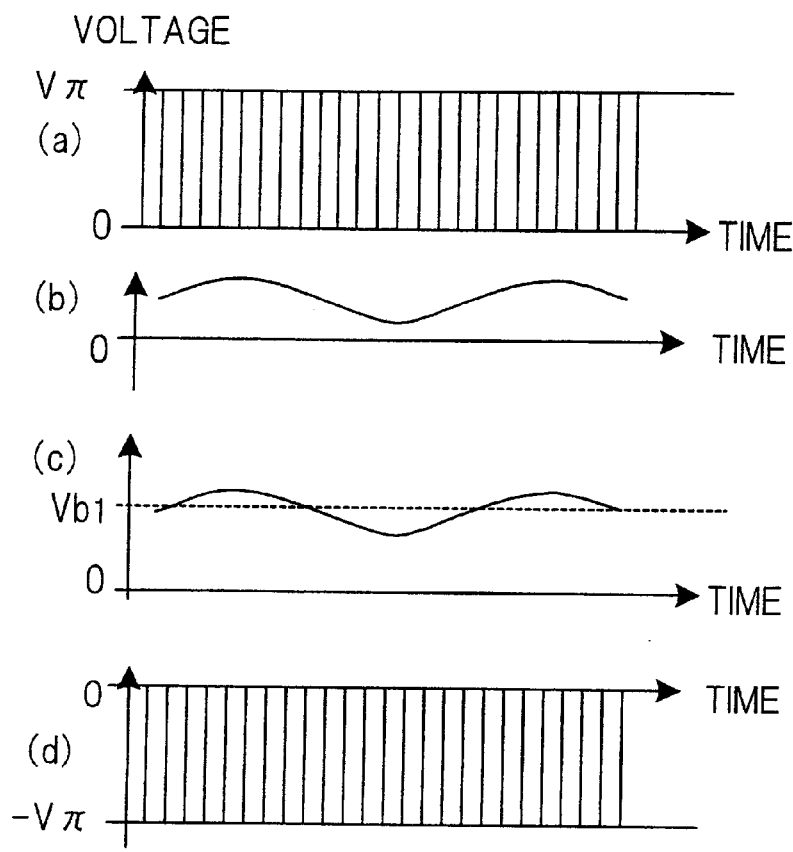
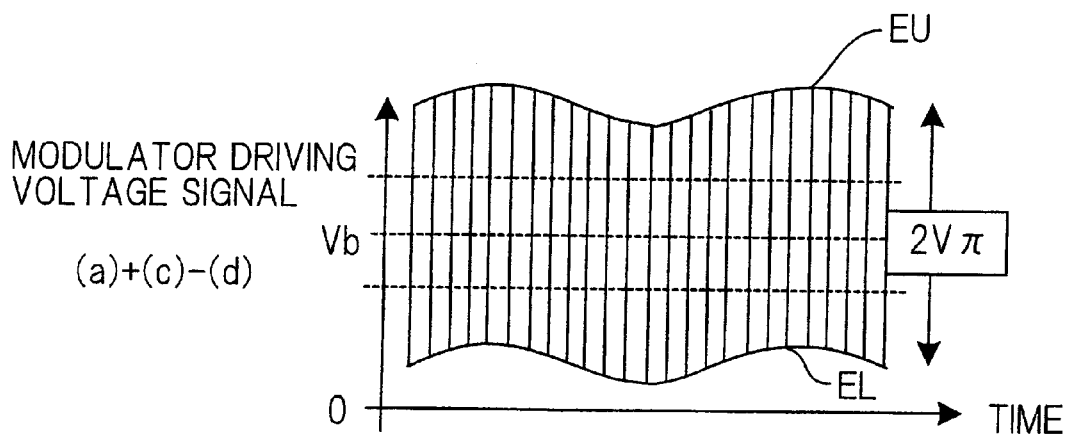
$Vb = Vb1 - Vb2$

MZ-TYPE OPTICAL MODULATOR

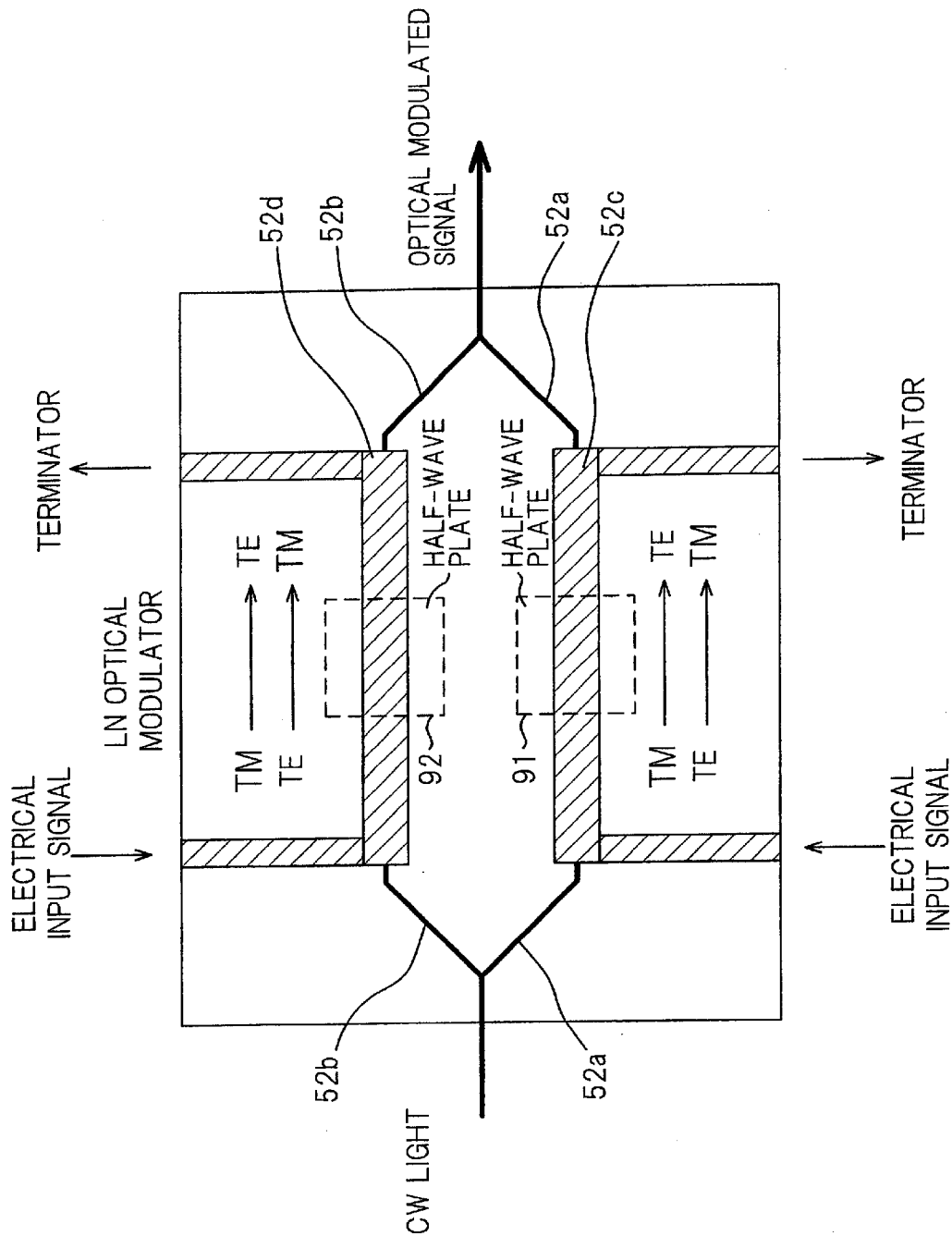

$S_1, S_2$ WAVEFORMS $S_3$, WAVEFORMS

OPTICAL MODULATION APPARATUS AND METHOD OF CONTROLLING OPTICAL MODULATOR

This application is a divisional application of application Ser. No. 09/348,166, filed on Jul. 7, 1999, now U.S. Pat. No. 6,278,539.

BACKGROUND OF THE INVENTION

This invention relates to an optical modulation apparatus and to a method of controlling an optical modulator. More particularly, the invention relates to an optical modulation apparatus and to a method of controlling an optical modulator, wherein even if the operating point of an optical modulator the optical output of which varies periodically with respect to a driving voltage fluctuates owing to a change in ambient temperature or aging, the fluctuation in operating point can be compensated for in stable fashion. More specifically, the present invention relates to a control method for stabilizing the operating point of a Mach-Zehnder optical modulator (referred to as an "MZ-type optical modulator) in an optical transmitter used in a time-division multiplexing (TDM) or wavelength-division multiplexing (WDM) optical transmission system.

The explosive increase in the quantity of available information in recent years has made it desirable to enlarge the capacity and lengthen the distance of optical communications systems. In-line optical amplifier systems which accommodate a transmission speed of 10 Gbps are now being put to practical use. Even greater capacity will be required in the future, and research and development is proceeding in both the TDM and WDM aspects of optical transmission.

Direct modulation

Intensity modulation and direct detection (so-called "direct modulation") is the simplest technique to use for an electro-optic conversion circuit employed in an optical communications system. According to this technique, a current that activates a semiconductor laser is turned on and off directly by the "0"s and "1"s of a data signal to control the emission and extinction of the laser beam. When a laser per se is turned on and off directly, however, the light signal experiences a fluctuation in wavelength (so-called "chirping") owing to the properties of the semiconductor. The higher the transmission speed (bit rate) of the data, the greater the influence of chirping. The reason for this is that an optical fiber exhibits a chromatic dispersion property wherein propagation velocity varies for different wavelengths. When chirping is caused by direct modulation, propagation velocity fluctuates, waveforms are distorted during propagation through optical fiber and it becomes difficult to perform long-distance transmission and transmission at high speed.

External modulation

For the reasons mentioned above, external modulation is used for high transmission speeds of 2.5 to 10 Gbps. According to external modulation, a laser diode emits light continuously and the emitted light is turned on and off by the "1"s and "0"s of data using an external modulator. The above-mentioned MZ-type modulator primarily is used as the external modulator. FIGS. 32A and 32B are diagrams useful in describing the MZ-type modulator, in which FIG. 32A is a schematic view of the construction of the modulator and FIG. 32B is for describing the modulating operation.

Shown in FIG. 32A are a distributed-feedback semiconductor laser diode (DFB-LD) 1 used in long-distance transmission at a speed of greater than 1 Gbps, an MZ-type modulator 2 and optical fibers 3a, 3b. The MZ-type modulator 2 includes on an LiNbO$_3$ substrate, (1) an input optical waveguide 2a formed on the substrate for introducing light from the laser diode 1, (2) branching optical waveguides 2b, 2c and (3) an output optical waveguide 2d formed on the substrate for outputting modulated light; (4) two signal electrodes 2e, 2f formed on the substrate for applying phase modulation to the optical signals in the branching optical waveguides 2b, 2c, and (5) a signal input terminal 2g formed on the substrate for inputting an NRZ electrical drive signal to one of the signal electrodes, namely the electrode 2e.

If a voltage applied to the signal electrodes 2e, 2f is controlled by the "1"s and "0"s of data, the branching optical waveguides 2b, 2c develop a difference in refractive index and the light waves of the optical signals in the optical waveguides develop a difference in phase between them. For example, if the data is a "0", control is performed in such a manner that the phase difference between the light waves of the optical signals in the two optical waveguides 2b, 2c becomes 180°; if the data is a "1", control is performed in such a manner that the phase difference between the light waves of the optical signals in the two optical waveguides 2b, 2c becomes 0°. If this arrangement is adopted, superimposing the optical signals of the two optical waveguides 2b, 2c will make it possible to output the input light upon modulating it (turning it on and off) by the "1"s and "0"s of the data.

As shown in FIG. 32B, the optical output characteristic of the MZ-type optical modulator, which has a voltage difference between the two electrodes thereof, varies periodically in dependence upon the applied voltage. Point A represents the culmination of the light emission and point B the culmination of extinction. The range of the voltage over one period is $2V\pi$. When data is a "1", therefore, voltage having an amplitude of $V\pi$ is applied between the signal electrodes 2e, 2f, whereby light is emitted. When data is a "0", a voltage of zero is applied between the signal electrodes 2e, 2f, whereby light is extinguished.

The MZ-type optical modulator described above is advantageous in that transmitted light exhibits little chirping. However, a change in the temperature of the LiNbO$_3$ constituting the substrate, prolonged application of an electric field thereto and aging thereof are accompanied by polarization of the substrate per se, electric charge remains on the surface of the substrate and the bias voltage across the signal electrodes fluctuates. Consequently, the voltage-optical output characteristic of the MZ-type optical modulator fluctuates to the left and right from the ideal curve a in FIG. 33 to the curves b and c. In other words, the operating point of the MZ-type optical modulator drifts with the passage of time, thereby the on/off light level changes and causes inter symbol interference between codes (refer to output eye patter in FIG. 33).

Bias control method in NRZ modulation

Accordingly, in order to stabilize the operating point, the conventional practice is to perform control in such a manner that the bias voltage is increased correspondingly if the curve shifts to the right and decreased correspondingly if the curve shifts to the left. More specifically, there has been proposed a compensation method (referred to as "automatic bias-voltage control" (ABC) below) which includes superimposing a low-frequency signal on an electrical drive signal, detecting the amount of drift of the operating point and the direction of this drift, and controlling the bias voltage by feedback (see the specification of Japanese Patent Application Laid-Open No. 3-251815). FIG. 34 is a diagram showing the construction of a circuit for stabilizing the operating point of an optical modulator that implements the currently available method of compensating the modulator operating point, and FIG. 35 is a diagram useful in describing the principle of operating-point stabilization.

Shown in FIG. 34 are the semiconductor laser diode (DFB-LD) 1, the MZ-type optical modulator (LN optical modulator) 2, the optical fibers 3a, 3b and a drive circuit 4. An NRZ electric signal (the data signal) is input to the drive circuit 4, which proceeds to generate an electrical drive signal SD having an amplitude (=Vπ) between the culmination A of light emission and the culmination B of light extinction in the voltage-optical output characteristic (see FIG. 32B) of the MZ-type optical modulator 2. A low-frequency oscillator 5 generates a low-frequency signal SLF having a low frequency $f_0$ (e.g., 1 KHz), a low-frequency superimposing circuit 6 for superimposes a low-frequency signal on the drive signal SD, an optical branching unit 7 branches the optical signal from the optical modulator 2, and a light receiver (PD) 8 such as a photodiode converts the optical signal output by the optical modulator 2 to an electrical signal. Numeral 9 denotes an amplifier. A phase comparator 10 detects and outputs a phase difference θ between the low-frequency signal component of the frequency $f_0$ contained in the optical signal output by the optical modulator 2 and the low-frequency signal output by the low-frequency oscillator 5. A low-pass filter (LPF) 11 rectifies the output signal of the phase comparator 10, and a bias supply circuit 12 controls the bias voltage, which is applied to a signal electrode, in such a manner that the phase difference θ will become zero.

The low-frequency superimposing circuit 6 subjects the drive signal of the MZ-type optical modulator 2 to amplitude modulation by the signal having the low frequency of of, the photodiode 8 converts the output light of the optical modulator 2 to an electrical signal, the phase comparator 10 performs a phase comparison between the low-frequency signal impressed upon the drive signal and the low-frequency signal component contained in the optical signal, and the bias supply circuit 12 controls the bias voltage applied to the signal electrode in such a manner that the phase difference θ will become zero.

The optimum operating points of the MZ-type optical modulator are points A and B (see FIG. 35) at which the two levels of the waveform of the drive signal SD give the maximum and minimum output optical powers. In the case that there is no fluctuation in the voltage-optical output characteristic of the MZ-type optical modulator 2. Even if the signal SLF having the low frequency $f_0$ is impressed upon the drive signal SD, upper and lower envelopes ELU, ELL of the output light do not contain the $f_0$ component and a frequency component that is twice $f_0$ appears in the ideal state (curve a).

On the other hand, if the characteristic curve shifts to the left or right from a to b or from a to c (if the operating point shifts to the left or right) in the manner illustrated, the upper and lower envelopes ELU, ELL of the output light both become signals modulated by the same phase. These signals contain the $f_0$ component. In addition, the phases of the upper and lower envelopes ELU, ELL of the output light in characteristic curve b are the opposite of the phases of the upper and lower envelopes ELU, ELL of the output light in characteristic curve c.

By virtue of the foregoing, the direction in which the operating point drifts can be detected by comparing the phase of low-frequency signal SLF superimposed on the drive signal and the phase of the low-frequency signal component contained in the optical signal. The bias voltage can be controlled in such a manner that this phase difference will become zero.

Optical duobinary modulation

In a case where an increase in capacity is intended by TDM, a factor is that chromatic dispersion (GVD) governs transmission distance. Dispersion tolerance is inversely proportional to the square of the data transmission speed (the bit rate). A dispersion tolerance that is about 800 ps/nm in a 10-Gbps system, therefore, deteriorates to about 1/16 of this figure, namely to about 50 ps/nm, in a 40-Gbps system. One method of reducing waveform degradation due to chromatic dispersion is optical duobinary modulation. (For example, see A. J. Price et al., "Reduced bandwidth optical digital intensity modulation with improved chromatic dispersion tolerance", Electron. Lett., vol. 31, No. 1, pp. 58–59, 1995.)

In comparison with the NRZ modulation scheme, optical duobinary modulation reduces the bandwidth of the optical signal spectrum to about half thereby it reduces the effects of chromatic dispersion. For example, whereas the bandwidth of the optical signal spectrum of a 10-Gbps NRZ signal is 10 GHz in terms of frequency and 0.2 nm in terms of wavelength, the bandwidth of the optical signal spectrum of a 10-Gbps duobinary signal is 5 GHz in terms of frequency and 0.1 nm in terms of wavelength. Because the velocity of light differs depending upon wavelength, the larger the bandwidth of the spectrum of the optical signal, the greater the amount of change in the velocity at which light propagates and, hence, the greater the distortion of the waveform caused by long-distance transmission. Accordingly, if the bandwidth of the spectrum of the optical signal can be made small by optical duobinary modulation, the amount of fluctuation in velocity can be reduced and the dispersion tolerance can be increased.

FIG. 36 is a diagram showing the construction of a modulation apparatus that relies upon optical duobinary modulation, FIGS. 37A, 37B are diagrams useful in describing the principle of optical duobinary modulation, and FIGS. 39A, 39B are waveform diagrams of the associated signals.

Shown in FIG. 36 are the semiconductor laser diode (DFB-LD) 1 and the MZ-type optical modulator 2 having two signal electrodes for applying phase modulation to the optical signals in the optical waveguides on both sides, and drive-signal input terminals for inputting complimentary drive signals to the signal electrodes.

A precoder 21 encodes a 40-Gbps binary NRZ electrical input signal. A D-type flip-flop (D-FF) 22 extracts and stores the output of the precoder 21 at a 40-GHz clock and outputs a non-inverted signal D and an inverted signal *D. Phase shifters 23a, 23b adjust the output phases of the flip-flop 22 and apply there outputs to amplitude adjusters 24a, 24b, respectively. The outputs thereof are applied to electrical low-pass filters 25a, 25b, respectively, having a bandwidth that is one-fourth the bit rate (=40 Gbps). Bias adjustment circuits (bias tees) are shown at 26a, 26b and terminators at 27a, 27b. The binary NRZ electrical input signal encoded by the precoder 21 is made 3-value electrical signals S1 and S2 having inverted signs by passage through the low-pass filters 25a, 25b, and these signals are in turn passed through the bias tees 26a, 26b, thereby generating complimentary 3-value electrical drive signals (push-pull signals) S1', S2' that are applied to the respective ones of the two symmetrical signal electrodes of the MZ-type optical modulator 2.

In the MZ-type optical modulator 2, the driving amplitude necessary to turn the CW light on and off generally is Vπ (see FIG. 37B) based upon the voltage-optical output characteristic. In optical duobinary modulation, however, each of the two signal electrodes is subjected to push-pull modulation by the amplitude Vπ. (This is modulation in which voltages that are always opposite in sign are applied to the two electrodes). The voltage applied to the optical modulator 2 is the voltage difference (=S1'−S2') between the input signals S1' and S2'. In optical duobinary modulation, in other words, the MZ-type optical modulator 2 is modulated by a driving amplitude 2Vπ, namely an amplitude that is twice Vπ. Further, the bias voltage (the center voltage of the electrical signal) is set in such a manner that the optical modulator is driven between two light-emission culminations A, A on the voltage-optical output characteristic curve.

The details of optical duobinary modulation will now be described.

As shown in FIG. 38, the precoder 21 includes a NOT gate 21a for inverting an input signal an, a 1-bit (25 ps) delay gate 21b, and an EX-OR gate 21c for outputting a signal $c_n$ obtained by taking the exclusive-OR between the preceding output $c_{n-1}$ and the present inverted input $b_n$. If reference is had to a truth table of the inverted signal $b_n$, the preceding output signal $c_{n-1}$ of the EX-OR gate and the present output signal $c_n$ of the EX-OR gate, we have the following:

(1) $c_n = c_{n-1}$ (no change in sign) if $b_n$="0" holds; and
(2) $c_n = 1 - c_{n-1}$ (sign inverted) if $b_n$="1" holds.

A low-pass filter 25a has a bandwidth which is only one-fourth of the bit rate, namely 10 GHz. Consider two successive bits of the input signal $c_n$. If the input data varies at high speed in the manner "0, 1" or "1, 0", the low-pass filter 25a cannot follow up this change and outputs 0.5, which is the level intermediate the 0 and 1 levels. If the input data is two successive "1"s, namely "1, 1", the low-pass filter 25a outputs the level 1.0; if the input data is two successive "0"s, namely "0, 0", the low-pass filter 25a outputs the level 0.0. More specifically, the low-pass filter 25a:

(3) outputs the 0.0 level in a case where the output $c_n$ of the precoder is successive "0"s ("00": no change in sign);

(4) outputs the 1.0 level in a case where the output $c_n$ of the precoder is successive "1"s ("11": no change in sign); and (5) outputs the 0.5 level in a case where the sign of the output $c_n$ of the precoder reverses ("01" or "10").

From (1) to (5) above, the output of the low-pass filter 25a changes if the sign of the precoder output changes. That is, the low-pass filter 25a outputs the 0.0 or +1.0 level as the output $d_n$ if the input data an is "1", and outputs the +0.5 level as the output $d_n$ if the input data $a_n$ is "0". Similarly, the low-pass filter 25b outputs the 0.0 or −1.0 level as the output $*d_n$ if the input data $a_n$ is "1", and outputs the 0.5 level as the output $*d_n$ if the input data $a_n$ is "0". Accordingly, if the level ±1.0 is ±Vπ and the level ±0.5 is ±Vπ/2, then 2Vπ or 0 is input across the signal electrodes of the MZ-type optical modulator 2 when the input data an is "1" and Vπ is input across the signal electrodes of the MZ-type optical modulator 2 when the input data an is "0". As a result, with reference to FIG. 37B, (1) "1" is output (light is emitted) if the input data $a_n$ is "1", at which value 2Vπ or 0 is input across the signal electrodes of the MZ-type optical modulator 2; and (2) "0" is output (light is extinguished) if the input data $a_n$ is "0", at which value Vπ is input across the signal electrodes of the MZ-type optical modulator 2.

Thus, the waveforms of the output signals S1, S2 from the low-pass filters 25a, 25b are as shown in FIG. 39A, and the optical signal output S3 from the MZ-type optical modulator 2 becomes as shown in FIG. 39B.

The characterizing feature of the optical duobinary modulation method is that the bandwidth of the optical signal spectrum is approximately half that obtained with the conventional NRZ modulation method described above. This makes it possible to reduce the effects of chromatic dispersion.

Further, in accordance with optical duobinary modulation, channels can be disposed at higher density in the WDM scheme. In a case where the intent is to enlarge capacity by the WDM technique, bandwidth of wavelength at which a optical amplifier can amplify are limiting factors. However, if optical duobinary modulation is used, the fact that this method provides a narrow bandwidth for the optical signal spectrum can be utilized and channels can be disposed at a higher density within the amplification bandwidth of the light amplifier.

Further, in optical duobinary modulation, chirping can be reduced because of push-pull drive. Chirping occurs and the direction thereof reverses when the applied voltage of an optical modulator increases and decreases. With optical duobinary modulation, however, the electrodes are driven by mutually complimentary electrical signals. Consequently, when the applied voltage increases at one electrode, it decreases at the other, and when the applied voltage decreases at one electrode, it increases at the other. Since the optical phase of the output optical signal is the sum of the optical phases produced at the two electrodes, chirping is reduced by cancellation.

An advantage of the MZ-type optical modulator is the fact that transmitted light experiences little chirping, as mentioned above. However, a change in the temperature of the $LiNbO_3$ constituting the substrate and the aging thereof are accompanied by temporal drift of the operating point of the voltage-optical output characteristic.

For this reason, it is necessary to control the bias voltage in dependence upon drift of the operating point, just is in the NRZ modulation scheme, in optical duobinary modulation as well. However, the problems set forth below arise when the operating-point compensation technique of NRZ modulation is applied directly to optical duobinary modulation. FIG. 40 is a diagram useful in describing a case where the operating-point compensation technique of NRZ modulation is applied directly to optical duobinary modulation.

With optical duobinary modulation, the driving voltage is made twice that used in NRZ modulation. Consequently, if the voltage-optical output characteristic shifts to the left or right from the ideal characteristic a to b or c, the envelopes ELU, ELL of the optical signal corresponding to the ON-side and OFF-side portions EU and EL of the electrical driving signal of the modulator subjected to low-frequency modulation take on mutually opposite phases and cancel each other out, making it impossible to detect the signal component of the low frequency $f_0$. The problem that arises, therefore, is that the ABC control method employed in the conventional NRZ modulation method cannot be applied to a modulation scheme, which includes optical duobinary modulation, wherein an optical modulator is driven between two light-emission culminations or between two light-extinction culminations of the voltage-optical output characteristic.

Another problem is that the conventional ABC control method only assumes use of an MZ-type optical modulator configured for electrode drive on one side. This means that it is necessary to also consider setting of an operating point in a case where an optical modulator configured for driving electrodes on both sides is used in optical duobinary modulation, NRZ modulation and RZ modulation.

SUMMARY OF THE INVENTION

Accordingly, an object of the present invention is to make it possible to compensate for drift of the operating point that accompanies a variation in the voltage-optical output characteristic of an optical modulation apparatus in which an optical modulator is driven by the amplitude between two light-emission culminations or two light-extinction culminations of the voltage-optical output characteristic.

Another object of the present invention is to so arrange it that the operating point can be controlled to assume the proper position even if the voltage-optical output characteristic of the optical modulator varies in a case where the optical modulator, which is configured for driving electrodes on both sides, is used in optical duobinary modulation, NRZ modulation and RZ modulation.

According to a first aspect of the present invention, when an optical modulator having a voltage-optical output characteristic in which optical output varies periodically with respect to a voltage value of an electrical drive signal is driven by the electrical drive signal, which has an amplitude (=2Vπ) between two light-emission culminations or two light extinction culminations of the voltage-optical output characteristic, (1) a prescribed low-frequency signal is superimposed on the drive signal, (2) operating-point drift of the optical modulator is detected based upon the low-frequency signal component contained in an optical signal output by the optical modulator, and (3) the operating point of the optical modulator is controlled in dependence upon the operating-point drift (NRZ modulation, RZ modulation).

According to a second aspect of the present invention, two mutually complimentary drive signals having an amplitude between a light-emission culmination and a neighboring light-extinction culmination of a voltage-optical output characteristic of an optical modulator are generated, a low-frequency signal is superimposed on at least one of these complimentary drive signals, and the drive signals are input to the signal electrodes to drive electrodes on both sides of the optical modulator (optical duobinary modulation).

In the first and second aspects of the present invention, the optical modulator is an optical modulator, e.g., an MZ-type optical modulator, having optical waveguides that branch on a light input side and merge on a light output side, two signal electrodes for applying phase modulation to optical signals in the branched optical waveguides on both sides, and two drive-signal input terminals for inputting complimentary drive signals to respective ones of the signal electrodes.

Further, in the first and second aspects of the present invention, examples of methods of superimposing a low-frequency signal on a drive signal are:

(1) superimposing the low-frequency signal on the drive signal in such a manner that phases of upper and lower envelopes of the drive signal coincide;

(2) superimposing the low-frequency signal on the drive signal in such a manner that only an upper or a lower envelope of the drive signal varies;

(3) superimposing the low-frequency signal on the drive signal in such a manner that amplitudes of upper and lower envelopes of the drive signal differ;

(4) superimposing the low-frequency signal on the drive signal in such a manner that frequencies of upper and lower envelopes of the drive signal differ; and (5) superimposing the low-frequency signal on the drive signal in such a manner that phases of upper and lower envelopes of the drive signal differ.

In accordance with the first and second aspects of the present invention as described above, a low-frequency signal component can be detected from an optical signal output by an optical modulator, and operating-point drift that accompanies fluctuation of the voltage-optical output characteristic of the optical modulator can be compensated for by a simple arrangement. Further, in accordance with optical duobinary modulation of the second aspect of the present invention, the influence of chromatic dispersion can be reduced and chirping can be diminished by push-pull drive.

According to a third aspect of the present invention, an optical modulator having optical waveguides that branch on a light input side and merge on a light output side, two signal electrodes for applying phase modulation to optical signals in the optical waveguides on both sides, two drive-signal input terminals for inputting complimentary drive signals to respective ones of the signal electrodes, and a voltage-optical output characteristic that varies periodically, is driven by a drive signal that has an amplitude (=Vπ) between a light-emission culmination and a neighboring light extinction culmination of the voltage-optical output characteristic. At this time, (1) complimentary drive signals whose amplitude is one-half of the amplitude (=Vπ) are generated, (2) a prescribed low-frequency signal is superimposed on one of the complimentary drive signals, and (3) operating-point drift of the optical modulator is detected based upon the low-frequency signal component contained in an optical signal output by the optical modulator, and the operating point of the optical modulator is controlled in dependence upon the operating-point drift.

The third aspect of the present invention is such that when the optical modulator is driven by the drive signal that has an amplitude Vπ between the light-emission culmination and the neighboring light extinction culmination of the voltage-optical output characteristic, two complimentary drive signals of amplitude Vπ/2 are generated and the optical modulator is subjected to push-pull drive by these complimentary drive signals. As a result, chirping can be reduced. Moreover, the low-frequency signal component can be detected reliably from the optical signal output by the optical modulator, thereby making it possible to compensate for drift of the operating point.

In accordance with the first through third inventions, as described above, the low-frequency signal component can be detected reliably from the optical signal output of the optical modulator by way of a simple arrangement, thereby making it possible to compensate for operating-point drift that accompanies variation of the voltage-optical output characteristic of the optical modulator, even in a case where an optical modulator configured for drive on both sides is used in optical duobinary modulation, NRZ modulation and RZ modulation.

Other features and advantages of the present invention will be apparent from the following description taken in conjunction with the accompanying drawings.

BRIEF DESCRIPTION OF THE DRAWINGS

FIG. 12 is a waveform diagram of signals associated with FIG. 11;

FIG. 31 is a diagram showing the construction of an optical modulator capable of modulating any polarized light wave;

DESCRIPTION OF THE PREFERRED EMBODIMENTS (A) Overview of the invention (a) Basic construction FIG. 1 is a diagram showing the basic construction of a first optical modulation apparatus according to the present invention. Shown in FIG. 1 are a semiconductor laser (DFB-LD) 51, an optical modulator (e.g., an MZ-type optical modulator) 52 the voltage-optical output characteristic whereof varies periodically, a drive signal generator 53 for generating electrical drive signals SD, SD' that drive the optical modulator by an amplitude $2 \cdot V\pi$ between two light-emission culminations A, A or two light extinction culminations B, B of the voltage-optical output characteristic, a low-frequency oscillator 54 for generating a prescribed low-frequency signal, a low-frequency superimposing unit 55 for superimposing the low-frequency signal on the drive signal SD, an optical branching unit 56 for branching an optical signal output by the optical modulator 52, a low-frequency signal detector 57 for detecting the low-frequency signal component contained in an optical signal output by the optical modulator and detecting operating-point drift of the optical modulator based upon the low-frequency signal component, and an operating-point control unit 58 for controlling the position of the operating point by controlling the bias voltage of the optical modulator in dependence upon the direction of drift of the operating point of the optical modulator.

Figure 1:
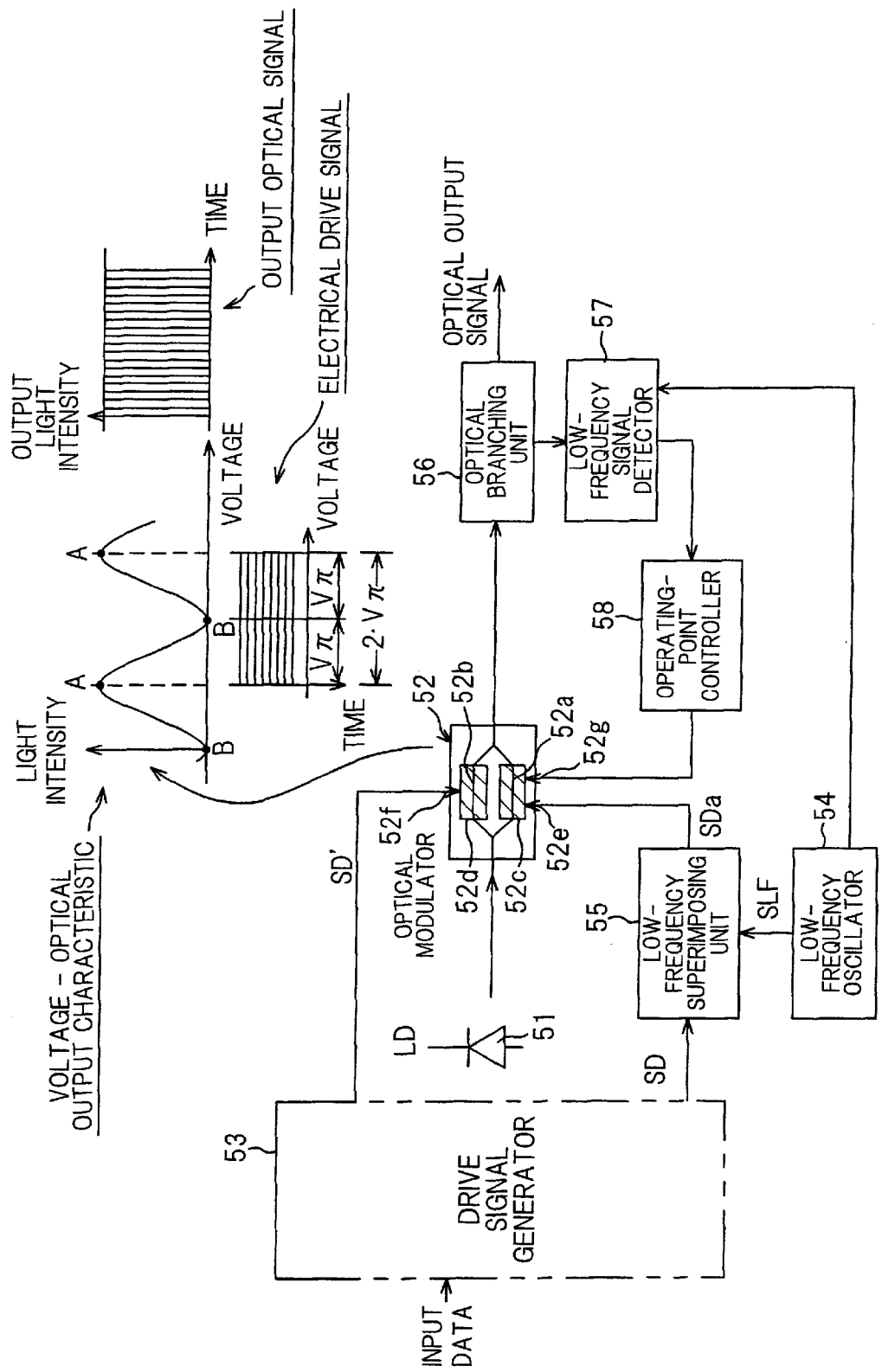
FIG. 1 is a diagram showing the principle underlying an optical modulation apparatus according to the present invention.

When the optical modulator 52 is driven by the electrical signal having the amplitude $2 \cdot V\pi$, the low-frequency superimposing unit 55 superimposes a low-frequency signal SLF on the electrical drive signal SD output by the drive signal generator 53. The low-frequency signal detector 57 detects the low-frequency signal component contained in the optical signal output by the optical modulator 52, and the operating-point control unit 58 discriminates the direction of operating-point drift based upon this detected low-frequency signal component and controls the bias voltage of the optical modulator 52. More specifically, the operating-point control unit 58 controls the operating point in such a manner that the center level of the electrical drive signal (the modulator driving voltage signal) applied to the modulator will coincide with the level of the extinction culmination B of the characteristic curve and the levels on both sides of the electrical drive signal will coincide with the light-emission culminations A, A of the characteristic curve.

(b) Method of superimposing low-frequency signal

Methods of superimposing the low-frequency signal on the drive signal are as follows:

(1) a first method (FIG. 2) of superimposing the low-frequency signal SLF on the drive signal SD in such a manner that the phases of upper and lower envelopes EU, EL of the modulator driving voltage signal (the input electrical drive signal of the modulator) will coincide;

(2) a second method (FIG. 3) of superimposing the low-frequency signal SLF on the drive signal SD in such a manner that only the upper envelope EU or lower envelope EL of the modulator driving voltage signal will vary;

(3) a third method (FIG. 4) of superimposing the low-frequency signal SLF on the drive signal SD in such a manner that the amplitudes of the upper and lower envelopes EU and EL of the modulator driving voltage signal will differ; and (4) a fourth method (FIG. 5) of superimposing the low-frequency signal SLF on the drive signal SD in such a manner that the frequencies of the upper and lower envelopes EU and EL of the modulator driving voltage signal will differ; and (5) a fifth method (FIG. 6) superimposing the low-frequency signal SLF on the drive signal SD in such a manner that the phases of the upper and lower envelopes EU and EL of the modulator driving voltage signal will differ.

Figure 2:
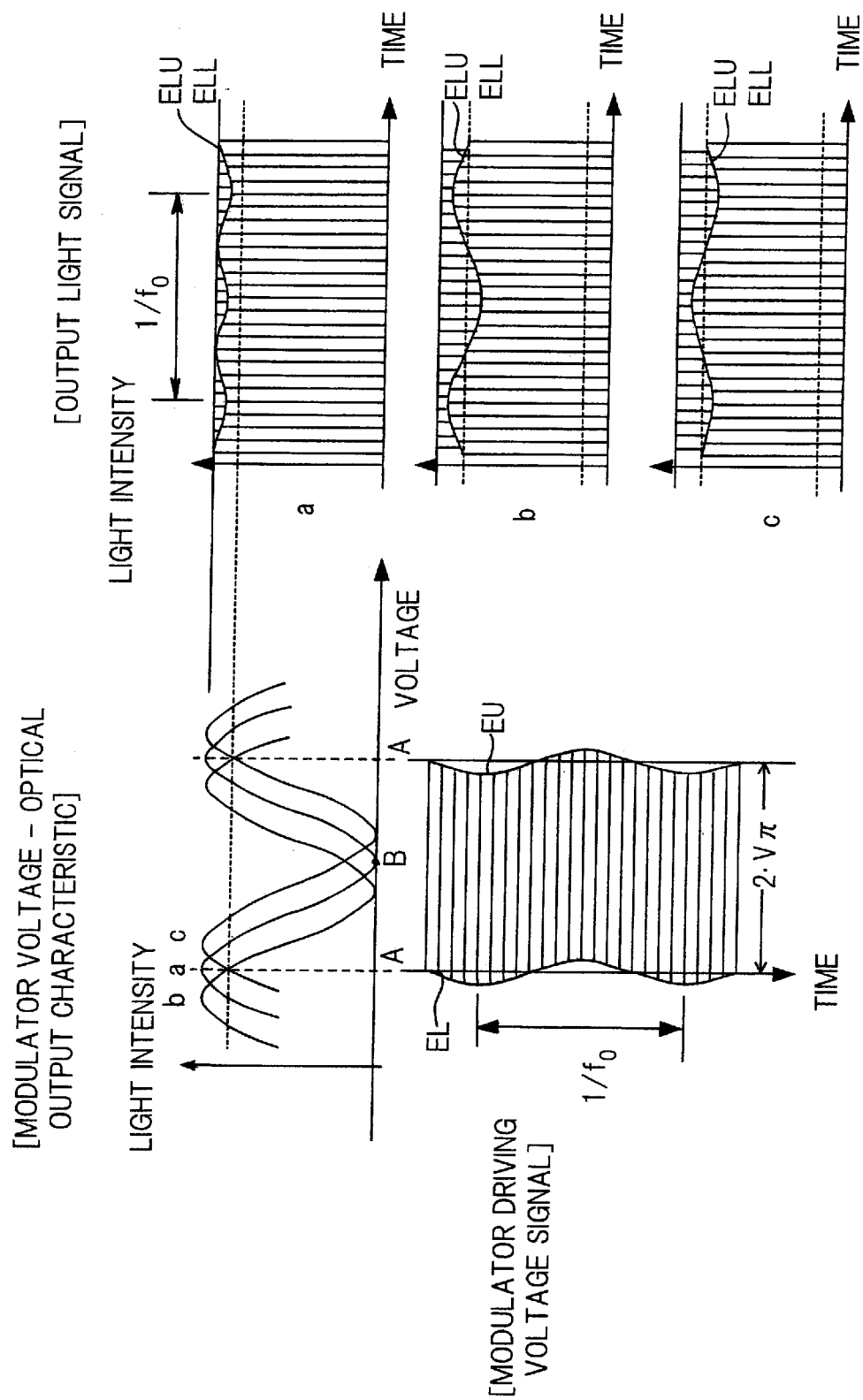
FIG. 2 is a diagram useful in describing the principle underlying a first method according to the present invention (same-phase low-frequency modulation applied to ON and OFF sides of an electrical drive signal)

As shown in FIG. 2, the first method is a method of performing low-frequency modulation in such a manner that the envelopes EU and EL corresponding to the ON and OFF sides, respectively, of the modulator driving voltage signal take on the same phase. The optimum operating points of the MZ-type optical modulator 52 are the points A, A at which the two levels of the waveform of the modulator driving voltage signal give the maximum output optical power and the point B at which the intermediate level gives the minimum output optical power. In the case that there is no fluctuation in the voltage-optical output characteristic of the MZ-type optical modulator 52. Even if the signal SLF having the low frequency $f_0$ is impressed upon the modulator driving voltage signal, the upper and lower envelopes ELU, ELL of the output light do not contain the $f_0$ component and a frequency component that is twice $f_0$ appears in the ideal state (curve $\underline{a}$).

Figure 40:
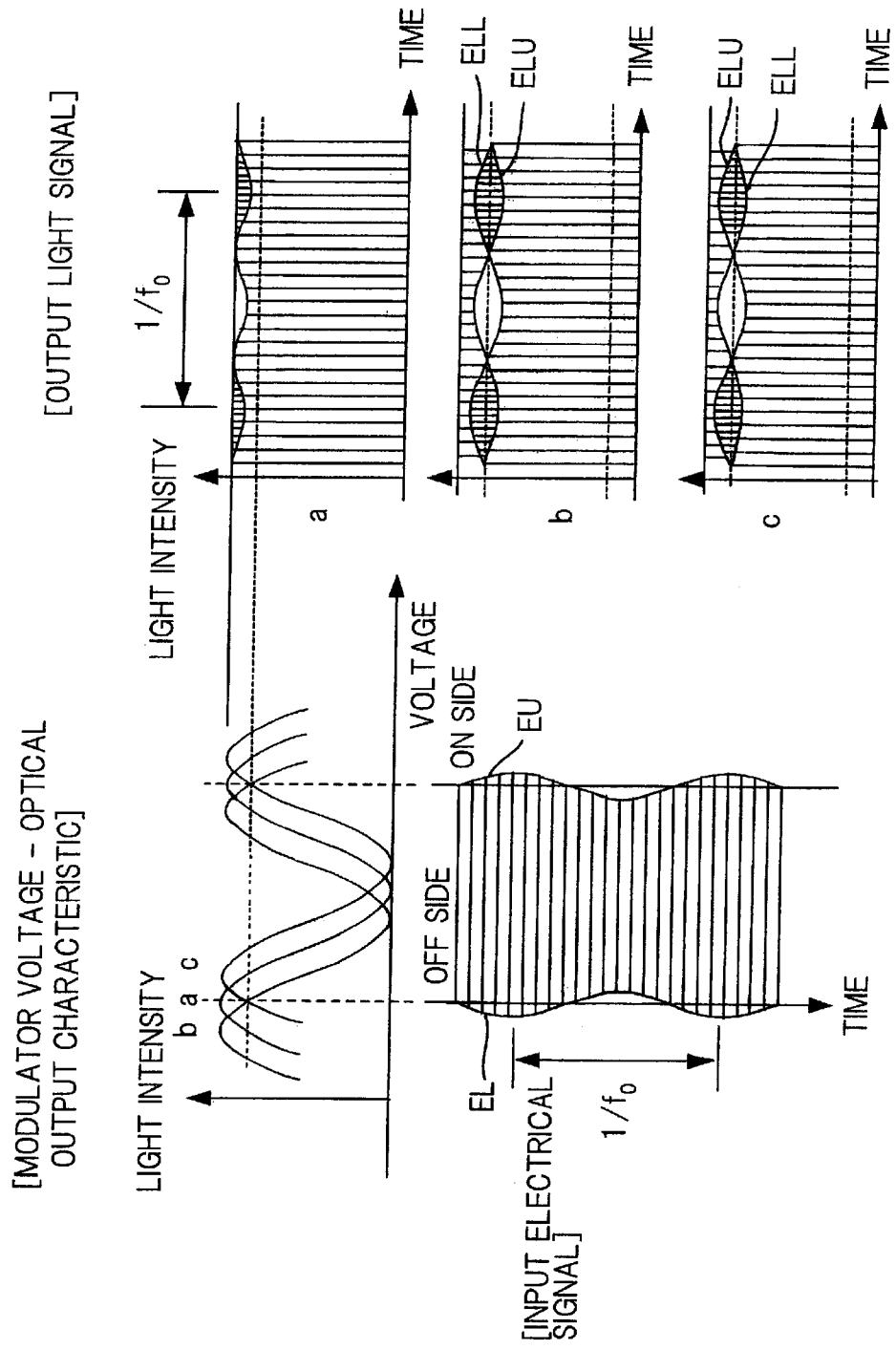
FIG. 40 is a diagram useful in describing a case where a technique similar to that of NRZ modulation is applied to optical duobinary modulation.

On the other hand, if the characteristic curve shifts from $\underline{a}$ to the left or right, as indicated by b, c (if the operating point shifts to the left or right), the upper and lower envelopes ELU, ELL of the output light will contain the $f_0$ component. In this case, the envelopes EU and EL on the ON and OFF sides, respectively, of the modulator driving voltage signal are made identical in phase, whereby the envelopes ELU, ELL of the optical signal are made identical in phase, unlike the situation illustrated in FIG. 40. As a consequence, the $f_0$ component is not canceled out and can be detected reliably. Moreover, the phase of the envelopes ELU, ELL of the output light is inverted depending upon the direction in which the characteristic curve shifts. This means that signal component of the superimposed low frequency $f_0$ can be detected even if the voltage-optical output characteristic of the modulator shifts to the left or right from the ideal curve $\underline{a}$ to the curve b or c, i.e., even if the operating point varies from the optimum point. Further, since the phase of the signal of the $f_0$ component differs by 180° depending upon the direction in which the operating point drifts, the direction in which the operating point drifts can be detected by comparing this phase with the phase of the low-frequency signal SLF superimposed upon the electrical drive signal SD.

Figure 3:
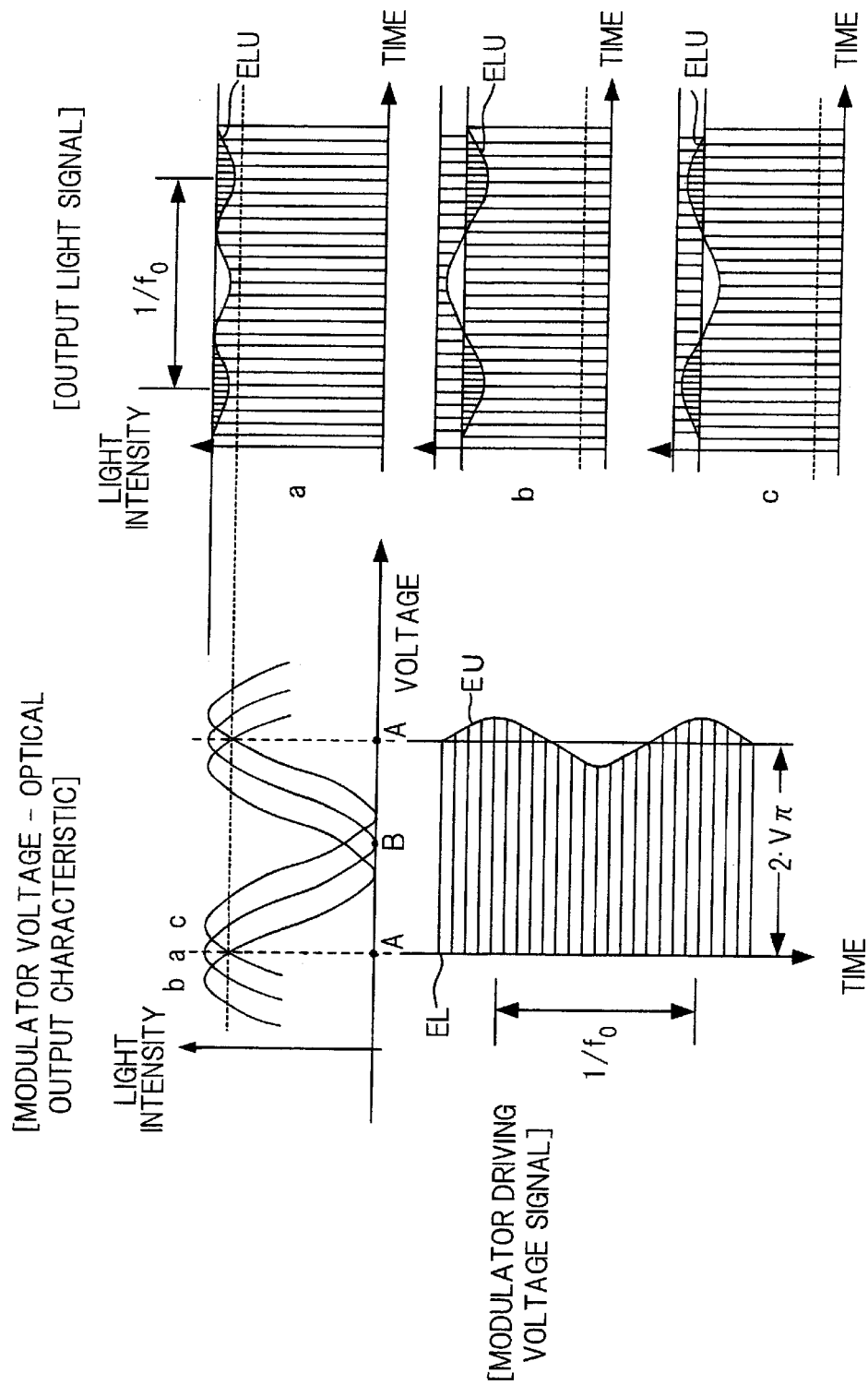
FIG. 3 is a diagram useful in describing the principle underlying a second method according to the present invention (low-frequency modulation applied only to the ON side of an electrical drive signal)

As shown in FIG. 3, the second method is a method of performing low-frequency modulation only on the ON side (or on the OFF side). The second method is such that if the characteristic curve shifts from $\underline{a}$ to the left or right, as indicated by b, c, only the envelope ELU on the upper side of the output light will contain the $f_0$ component. As a result, the low-frequency signal component can be detected reliably. Moreover, the phase of the envelope ELU of the output light is inverted depending upon the direction of shift. This means that signal component of the superimposed low frequency $f_0$ can be detected even if the voltage-optical output characteristic of the modulator shifts to the left or right from the ideal curve $\underline{a}$ to the curve b or c, i.e., even if the operating point varies from the optimum point. Further, since the phase of the signal of the $f_0$ component differs by 180° depending upon the direction in which the operating point drifts, the direction in which the operating point drifts can be detected by comparing this phase with the phase of the low-frequency signal SLF superimposed upon the electrical drive signal SD.

Figure 4:
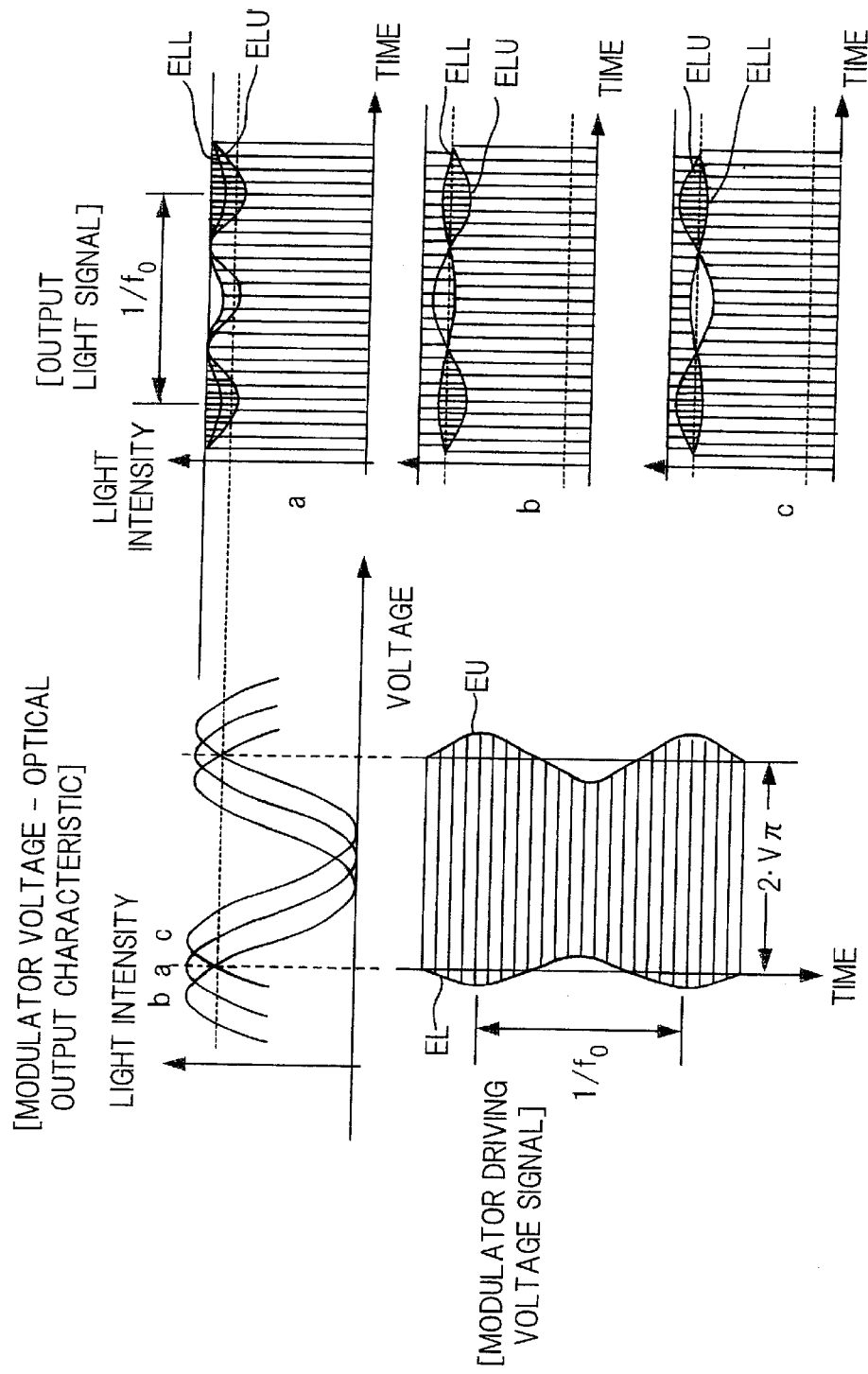
FIG. 4 is a diagram useful in describing the principle underlying a third method according to the present invention (low-frequency modulation of different amplitudes applied to ON and OFF sides of an electrical drive signal)

As shown in FIG. 4, the third method is a method of performing amplitude modulation in such a manner that the envelopes EU and EL corresponding to the ON and OFF sides of the modulator driving voltage signal take on different amplitudes. If the voltage-optical output characteristic curve shifts from $\underline{a}$ to the left or right, as indicated by b, c, the upper and lower envelopes ELU, ELL of the output light will contain the $f_0$ component. In this case, the envelopes EU and EL on the ON and OFF sides, respectively, of the modulator driving voltage signal are opposite in phase, and therefore the phases of the envelopes ELU, ELL of the optical signal also are opposite in phase. However, since the amplitudes of the envelopes EU, EL are different, the signal obtained by combining the envelopes ELU, ELL of the optical signal does not become zero and the $f_0$ component can be detected reliably. Moreover, the phase of the signal obtained by combining the envelopes ELU, ELL of the output light is inverted depending upon the direction of shift. This means that the signal component of the superimposed low frequency $f_0$ can be detected even if the voltage-optical output characteristic of the modulator shifts to the left or right from the ideal curve $\underline{a}$ to the curve b or c, i.e., even if the operating point varies from the optimum point. Further, since the phase of the signal of the $f_0$ component differs by 180° depending upon the direction in which the operating point drifts, the direction in which the operating point drifts can be detected by comparing this phase with the phase of the low-frequency signal SLF superimposed upon the electrical drive signal SD.

Figure 5:
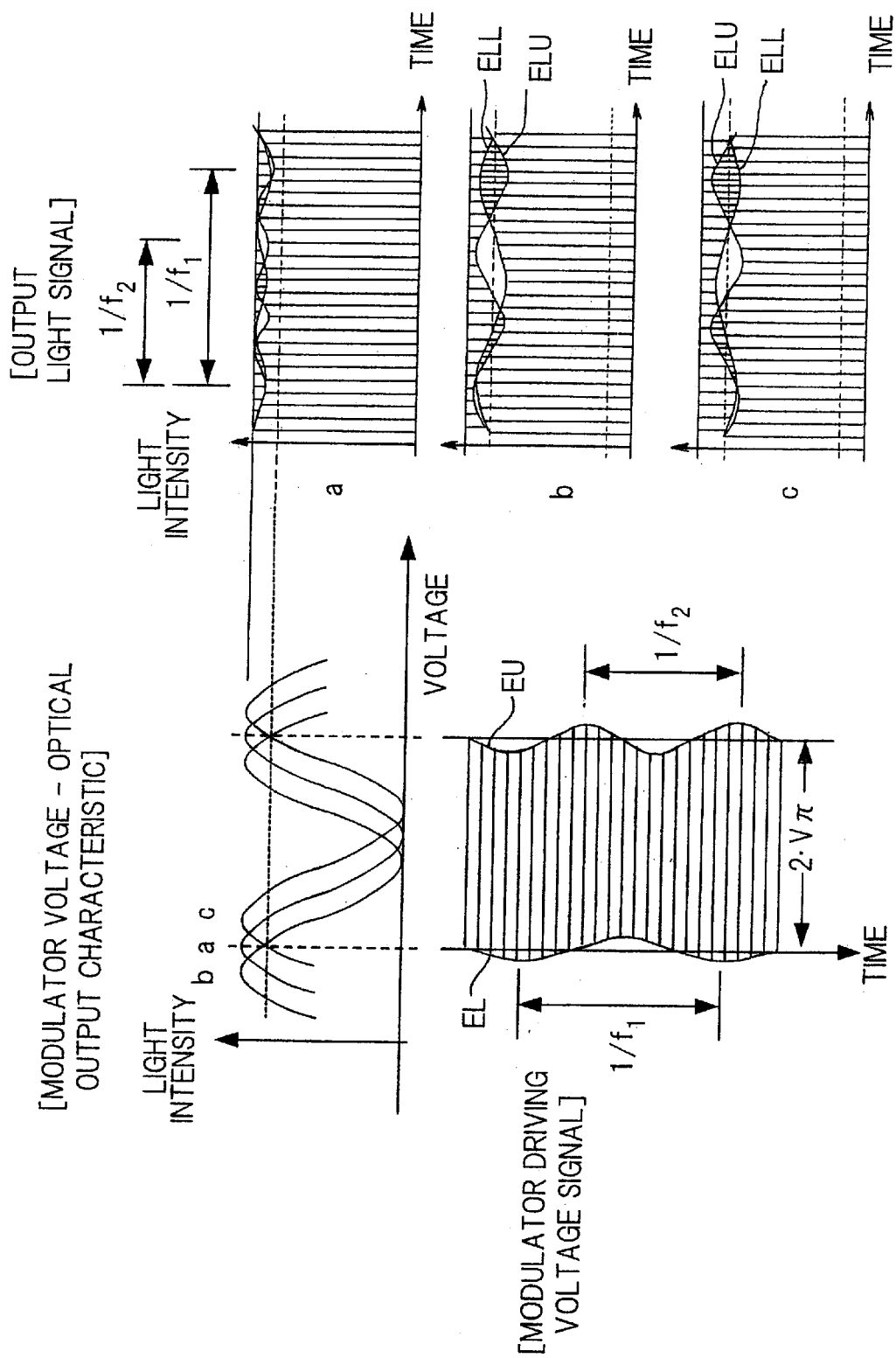
FIG. 5 is a diagram useful in describing the principle underlying a fourth method according to the present invention (low-frequency modulation of different frequencies applied to ON and OFF sides of an electrical drive signal)

As shown in FIG. 5, the fourth method is a method of obtaining different frequencies $f_1$, $f_2$ of low-frequency modulation of the envelopes EU and EL corresponding to the ON and OFF sides of the modulator driving voltage signal. If the voltage-optical output characteristic curve shifts from $\underline{a}$ to the left or right, as indicated by b, c, the upper and lower envelopes ELU, ELL of the output light will contain the $f_1$, $f_2$ components, respectively. As a consequence, these signal components can be detected reliably. Moreover, the phases of the envelopes ELU, ELL of the output light are inverted depending upon the direction in which the operating point shifts. This means that signal components of the superimposed frequencies $f_1$, $f_2$ can be detected from the output light of the modulator even if the voltage-optical output characteristic of the modulator shifts to the left or right from the ideal curve a to the curve b or c. Further, since the phases of the signal components of the frequencies $f_1$, $f_2$ differ by 180° depending upon the direction in which the operating point drifts, this direction can be detected.

Figure 6:
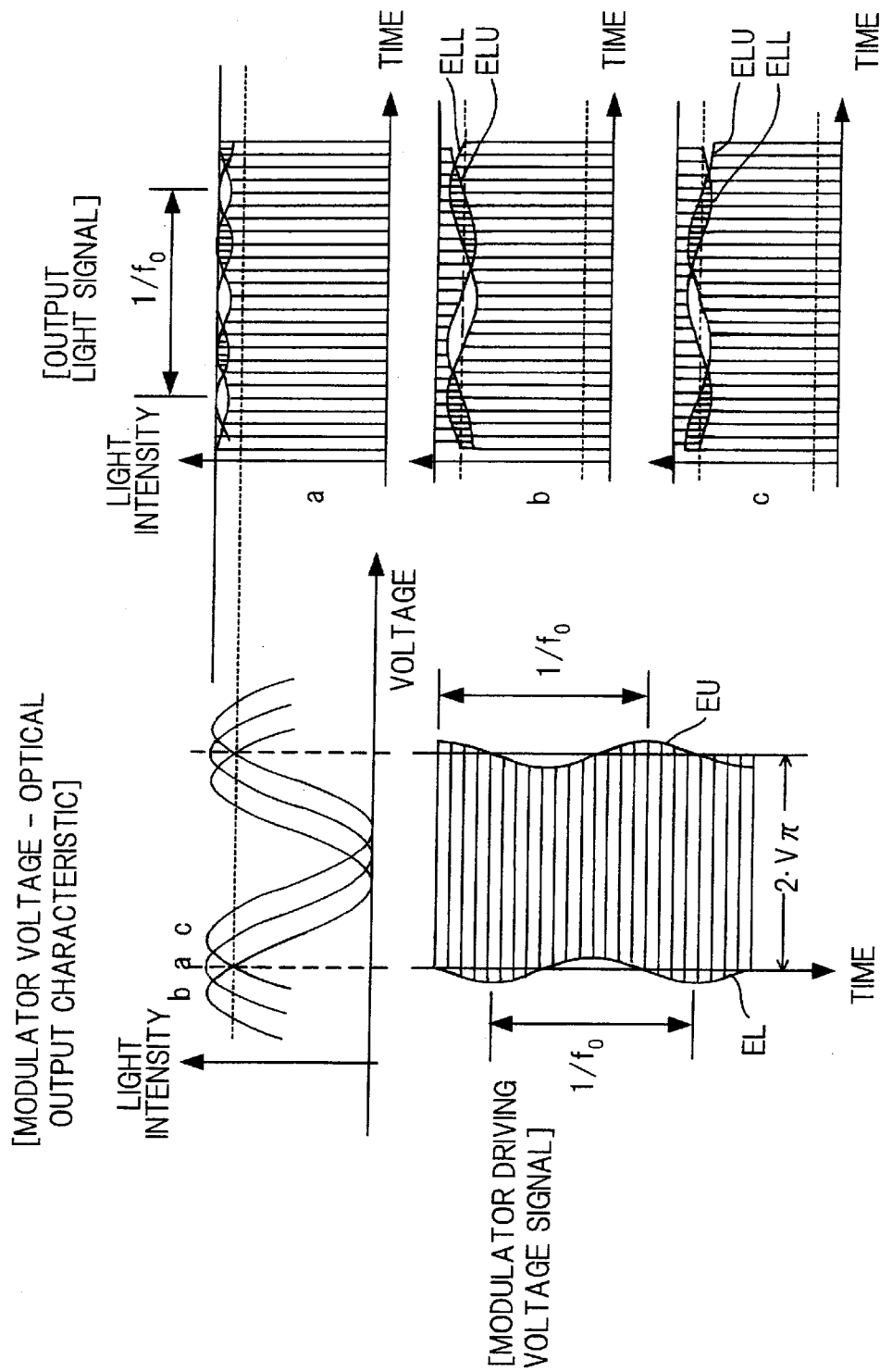
FIG. 6 is a diagram useful in describing the principle underlying a fifth method according to the present invention (low-frequency modulation of different phases applied to ON and OFF sides of an electrical drive signal)

As shown in FIG. 6, the fifth method is a method of obtaining different phases of low-frequency modulation of the envelopes EU and EL corresponding to the ON and OFF sides of the modulator driving voltage signal. If the voltage-optical output characteristic curve shifts from a to the left or right, as indicated by b, c, the upper and lower envelopes ELU, ELL of the output light will contain the $f_0$ component. In this case, the phases of the envelopes EU, EL on the ON side and OFF side of the modulator driving voltage signal are offset by θ, and therefore the signal obtained by combining the envelopes ELU, ELL of the optical signal does not become zero and the $f_0$ component can be detected reliably. Moreover, the phase of the signal obtained by combining the envelopes ELU, ELL of the output light is inverted depending upon the direction of shift. This means that the signal component of the superimposed low frequency $f_0$ can be detected even if the voltage-optical output characteristic of the modulator shifts to the left or right from the ideal curve a to the curve b or c. Further, since the phase of the signal of the $f_0$ component is inverted depending upon the direction in which the operating point drifts, this direction can be detected.

(c) Optical modulator configured for electrode drive on both sides

The optical modulator is not defined above. Used as the optical modulator 52 is an LN optical modulator (MZ-type optical modulator) configured for electrode drive on both sides, having (1) optical waveguides 52a, 52b that are formed on the LiNbO₃ substrate and branch on a light input side and merge on a light output side; (2) two signal electrodes 52c, 52d for applying phase modulation to optical signals in the branched optical waveguides on both sides; (3) two drive-signal input terminals 52e, 52f for inputting complimentary drive signals to respective ones of the signal electrodes; and (4) a bias-voltage input terminal 52g.

In a case where use is made of such an optical modulator having driven electrodes on both sides thereof, the drive signal generator 53 generates two mutually complimentary drive signals (push-pull drive signals) SD, SD' having an amplitude Vπ between a light-emission culmination A and a neighboring light-extinction culmination B of the voltage-optical output characteristic of the optical modulator are generated, and the low-frequency superimposing unit 55 superimposes the low-frequency signal SLF on at least one of the electrical drive signals, i.e., the drive signal SD, and inputs the resulting signal to the signal electrode 52c. The other drive signal SD' is input to the signal electrode 52d. Thus, both sides of the modulator are driven. It should be noted that the above-described low-frequency signal superimposing method can be applied also in a case where the optical modulator driven on both its sides is used in NRZ modulation and RZ modulation, etc.

(B) Embodiment
   (a) First embodiment

Figure 7:
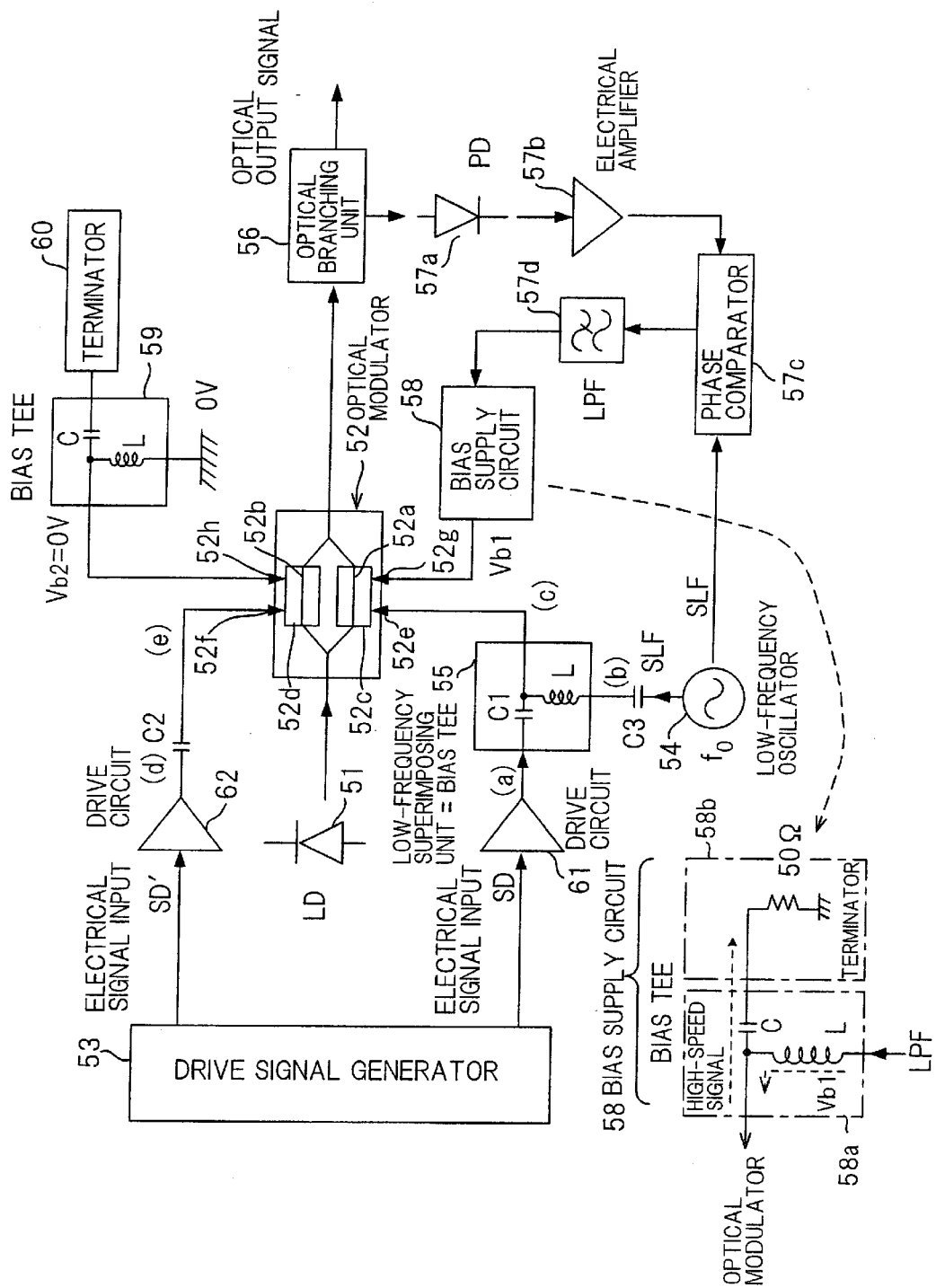
FIG. 7 is a diagram showing the construction of an optical modulation apparatus according to a first embodiment.
Figure 8:
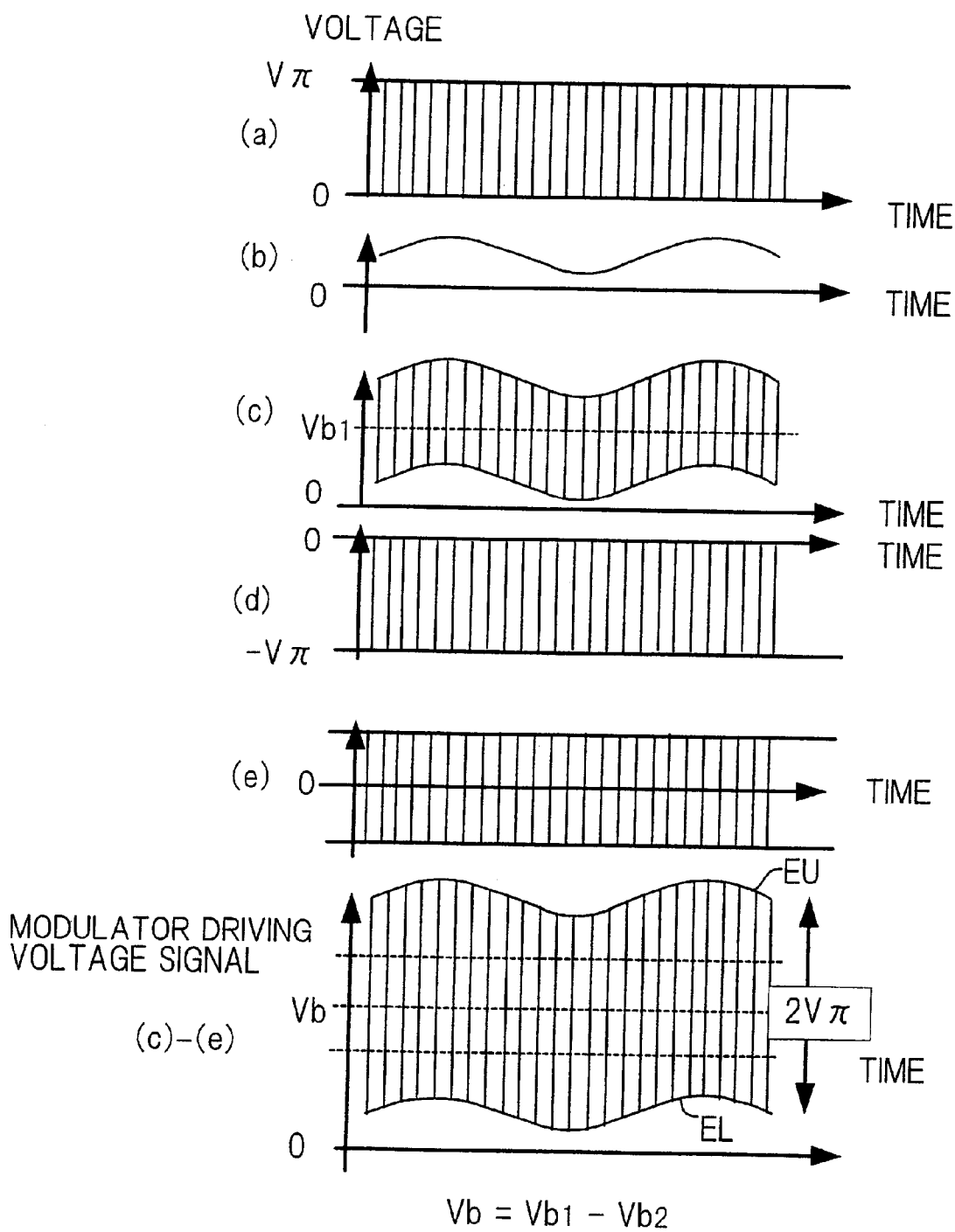
FIG. 8 is a waveform diagram of signals associated with FIG. 7.

FIG. 7 is a diagram showing the construction of an optical modulation apparatus according to a first embodiment. This is an example in which an LN optical modulator (MZ-type optical modulator) configured for drive on both sides (i.e., the modulator has driven electrodes on both sides) is used as the optical modulator and low-frequency modulation is carried out in such a manner that envelopes on the ON and OFF sides, respectively, of the modulator driving voltage signal applied to the optical modulator will take on the same phase (see FIG. 2 showing the principle underlying the first method of the present invention). FIG. 8 is a waveform diagram of signals associated with FIG. 7.

Shown in FIG. 7 are the semiconductor laser (DFB-LD) 51, and the MZ-type optical modulator 52 the voltage-optical output characteristic whereof varies periodically. The optical modulator 52 includes the optical waveguides 52a, 52b that are formed on the LiNbO₃ substrate and branch on the light input side and merge on the light output side, the two signal electrodes 52c, 52d for applying phase modulation to optical signals in the branched optical waveguides on both sides, and two drive-signal input terminals 52e, 52f for inputting complimentary drive signals to respective ones of the signal electrodes, and bias-voltage input terminals 52g, 52h for inputting bias voltages to the signal electrodes.

Figure 36:
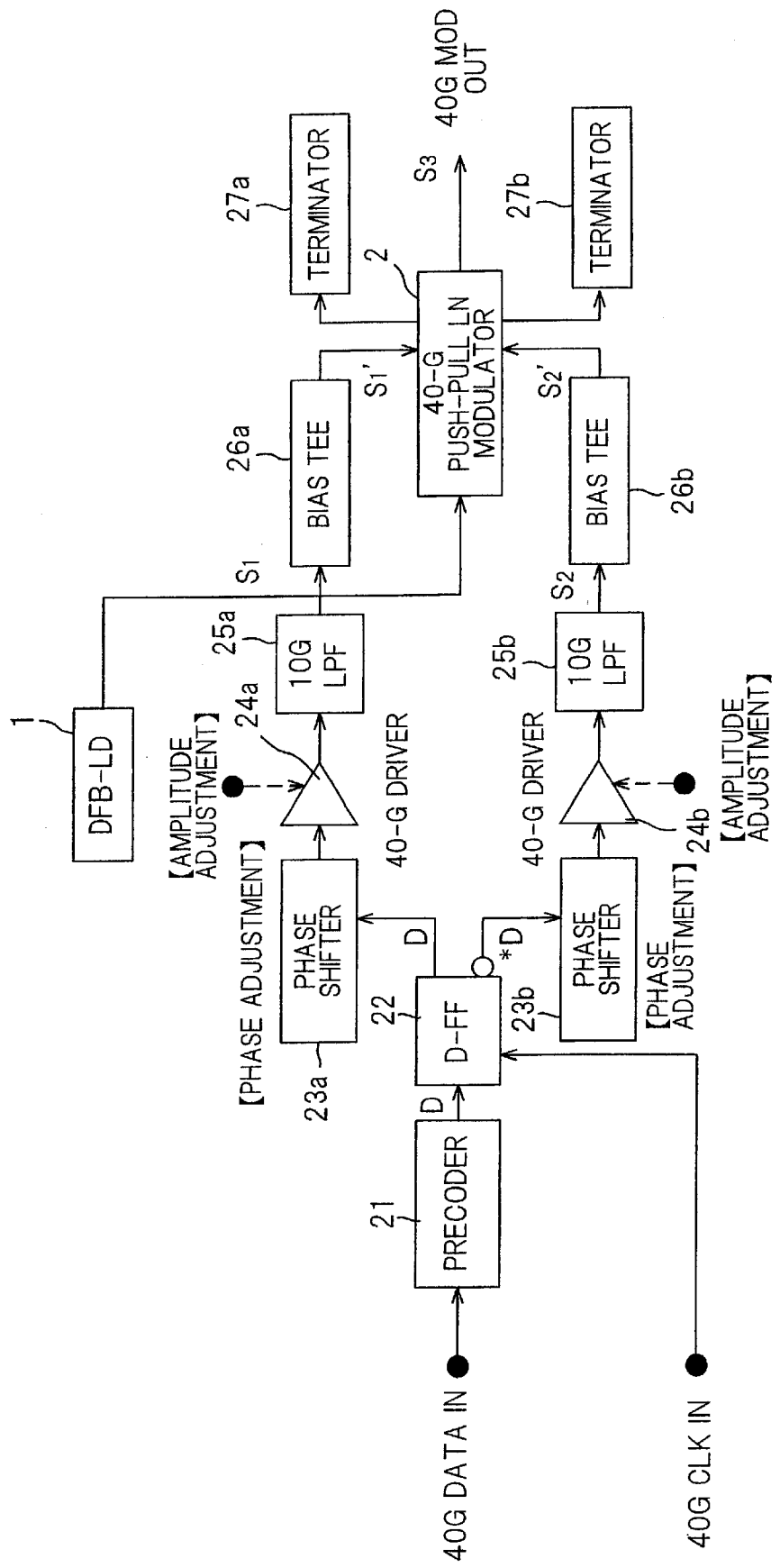
FIG. 36 is a diagram showing an example of the construction of a modulator using optical duobinary modulation.
Figure 37A:
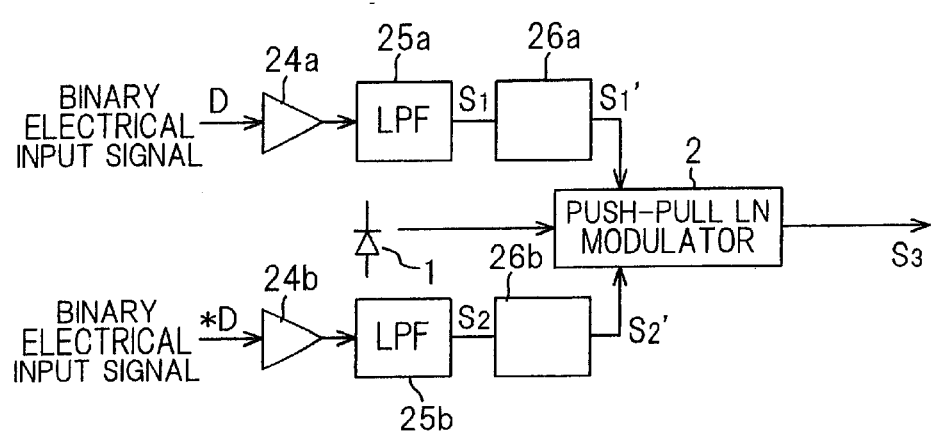
FIGS. 37A and 37B are diagrams for describing the principle of optical duobinary modulation.
Figure 37B:
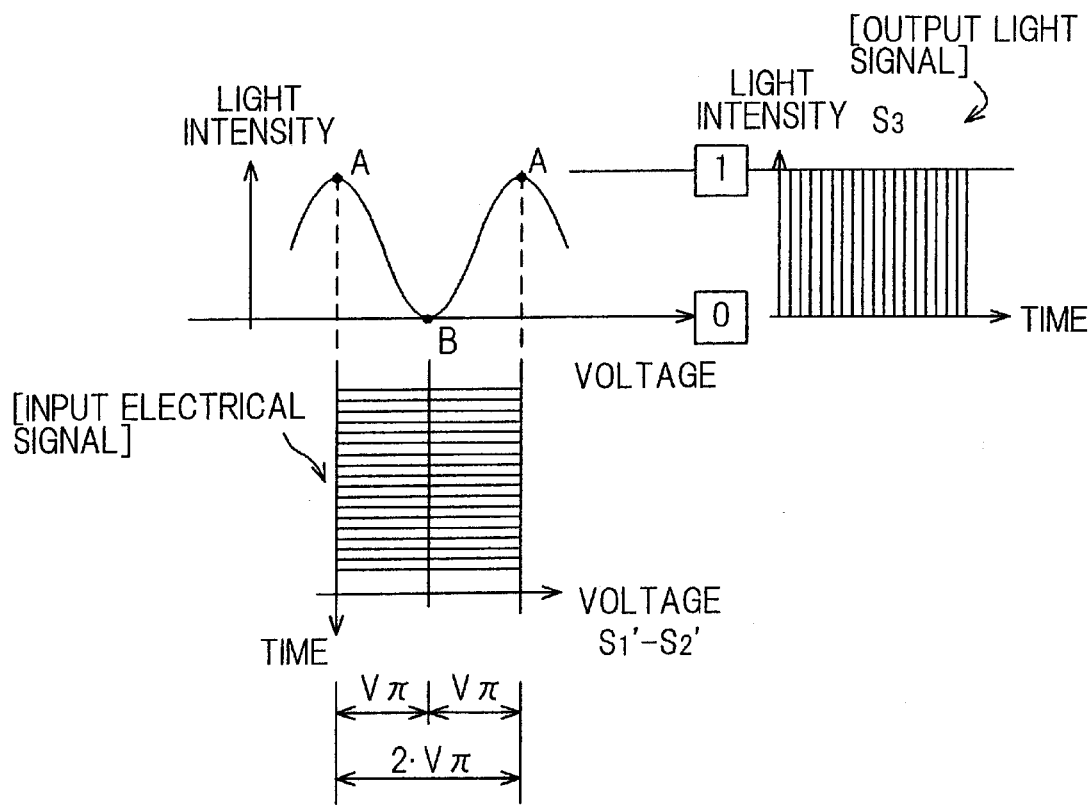
Figure 38:
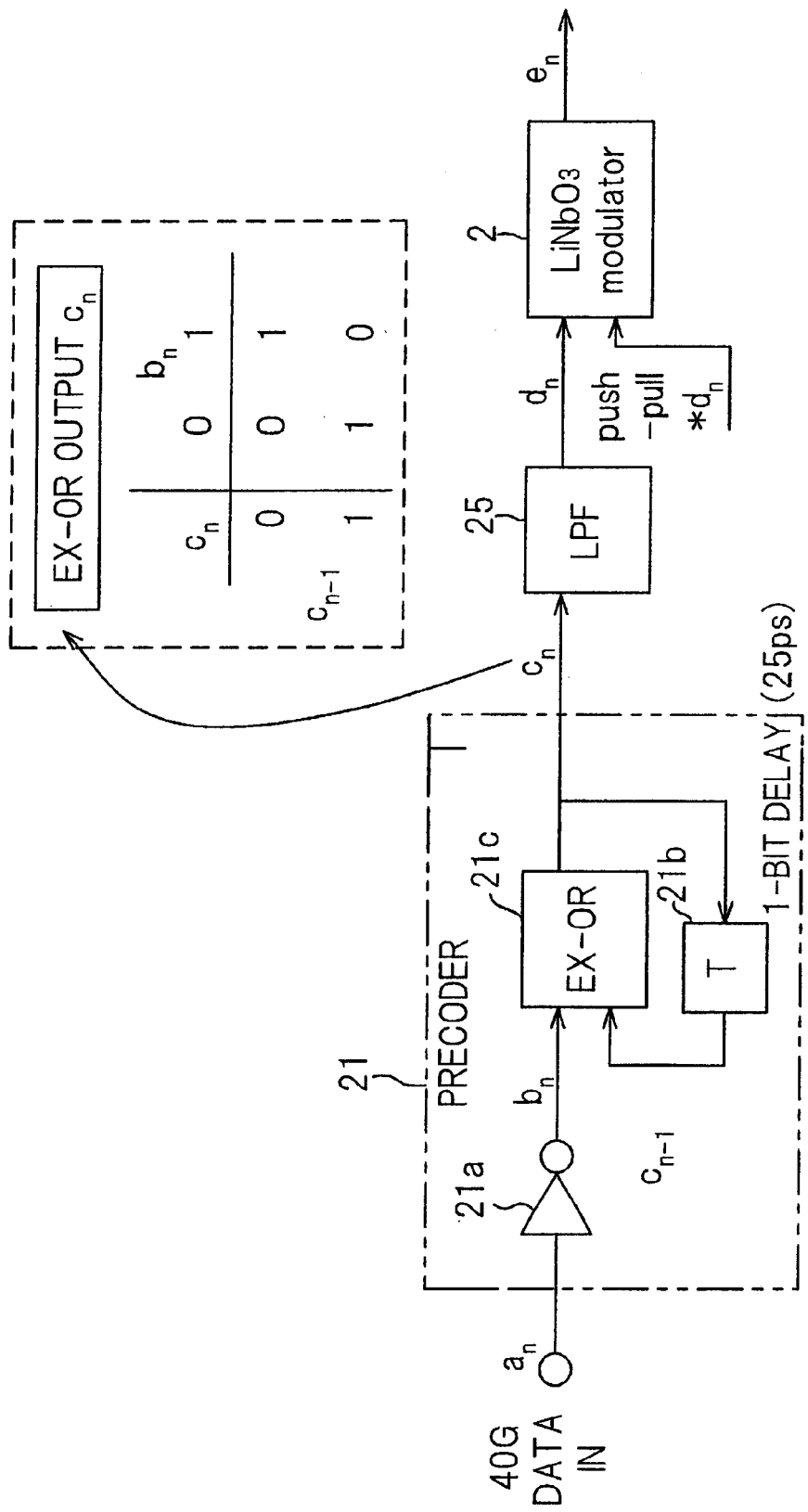
FIG. 38 is another diagram for describing the principle of optical duobinary modulation.
Figure 39A:
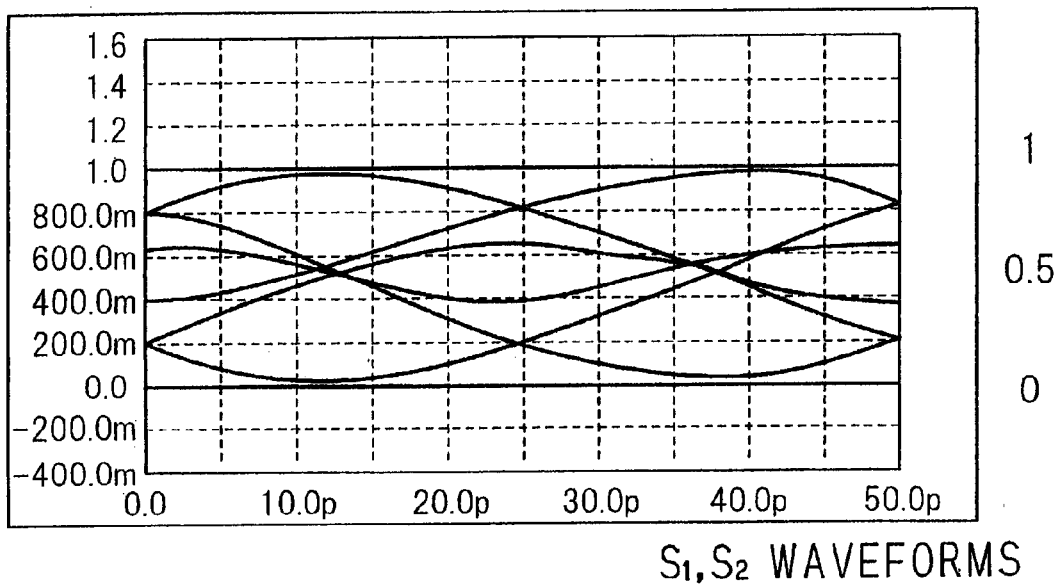
FIGS. 39A and 39B are waveform diagrams showing signals associated with the optical duobinary modulator.
Figure 39B:
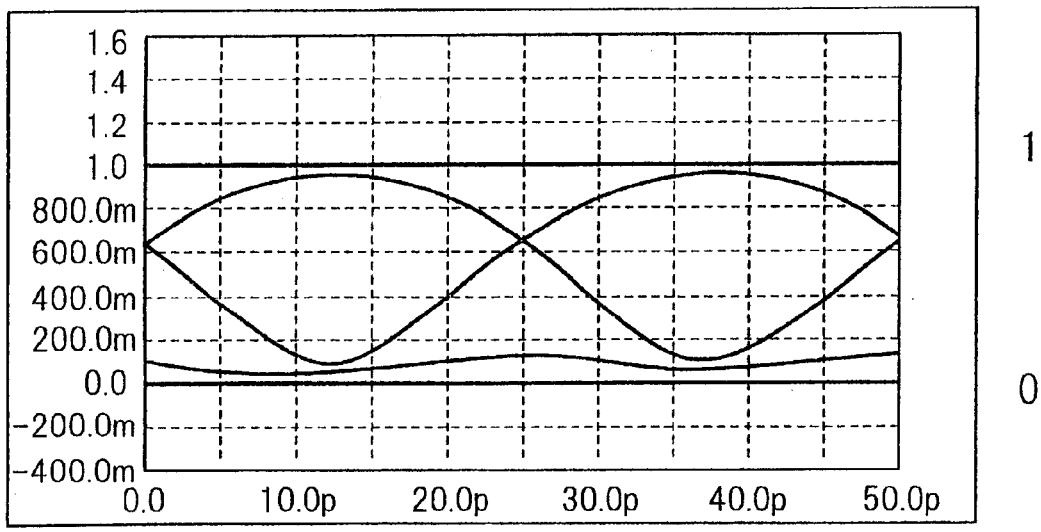

The arrangement further includes the drive signal generator 53 which generates the two mutually complimentary drive signals (push-pull drive signals) SD, SD' having the amplitude Vπ between the light-emission culmination A and the neighboring light-extinction culmination B of the voltage-optical output characteristic (see FIG. 1) of the optical modulator 52. The drive signal generator 53, which corresponds to the circuitry from the precoder 21 to the low-pass filters 25a, 25b of FIG. 36, converts the binary input data to the 3-value push-pull drive signals SD, SD' and outputs these signals. The drive signal SD is a 3-value signal, namely a signal having a Vπ or 0 level if the input data is "1" and a Vπ/2 level if the input data is "0". The drive signal SD' is a 3-value signal having a −Vπ or 0 level if the input data is "1" and a −Vπ/2 level if the input data is "0".

The arrangement further includes the low-frequency oscillator 54 for generating the prescribed low-frequency signal SLF, e.g., a frequency $f_0$ of 1 KHz, and the low-frequency superimposing unit 55, which is constituted by a coil L for passing a low-frequency signal and a capacitor C1 for cutting direct current, for superimposing the low-frequency signal on one drive signal, namely the drive signal SD. The low-frequency superimposing unit 55 uses a bias tee to vary the center voltage of the drive signal SD by the low-frequency signal of frequency $f_0$ at the input side of the optical modulator 52. The optical branching unit 56 branches the optical signal output by the MZ-type optical modulator 52. A light receiver 57a such as a photodiode converts the branched light to an electrical signal, an amplifying circuit 57b amplifies the output of the photodiode 57a, a phase comparator 57c to which the low-frequency signal SLF output by the low-frequency oscillator 54 and an electrical signal conforming to the photodiode output are input detects the low-frequency signal component contained in the photodiode output by a phase comparison and outputs the detected low-frequency signal component as a signal indicative of the drift of the operating point of the modulator, and a low-pass filter 57d smoothens the output of the phase comparator. The photodiode 57a, amplifying circuit 57b, phase comparator 57c and low-pass filter 57d construct the low-frequency signal detector 57 of FIG. 1 that detects drift of the operating point of the optical modulator. In order to raise the precision of the phase comparator, a bandpass filter for the frequency $f_0$ can be inserted on the output side of the amplifying circuit 57b.

The bias supply circuit (operating-point control unit) 58, which is constituted by a bias tee 58a and a 50-Ω terminator 58b, controls the position of the operating point by controlling the bias voltage Vb1 applied to the signal electrode 52a in dependence upon the direction of drift of the operating point of the optical modulator. The bias tee 58a has a coil L, which is for supplying the signal electrode 52a of the optical modulator with the bias voltage Vb1, and a capacitor C for inputting a high-frequency signal from the modulator to the terminator 58b. A bias tee 59, which consists of a coil L and capacitor C, supplies the other signal electrode 52b of the modulator with a bias voltage Vb2. A terminator 60 is connected to the bias tee 59. Drive circuits 61, 62 input the drive signals SD, SD', which are output by the drive signal generator 53, to the respective signal electrodes of the optical modulator 52, thereby driving the modulator.

In the first embodiment, the amplitude of the modulator driving voltage signal applied to the optical modulator 52 is 2·Vπ (the voltage between the two light-emission culminations A, A of the voltage-optical output characteristic). As a result, the modulator performs push-pull modulation, in which drive signals [see (a) and (d) in FIG. 8] of mutually inverted amplitude Vπ output by the drive circuits 61, 62 are input to the optical modulator 52. Chirping of the optical modulated signal is made zero by this push-pull modulation and degradation of the transmitted waveform can be reduced.

The voltage plotted along the horizontal axis of the voltage-optical output characteristic (FIG. 1) of the optical modulator 52 is not the absolute value of the potentials of both electrodes, but is the potential difference between these electrodes. The bias voltage Vb2 corresponding to the drive circuit 62 therefore is fixed at zero (or at another constant voltage) using the bias tee 59. Only the bias voltage Vb1 corresponding to the drive circuit 61 is controlled based upon operating-point drift. Further, low-frequency amplitude modulation is performed using the low-frequency signal SLF, which is output by the low-frequency oscillator 54, superimposed solely on the drive signal from the drive circuit 61 by the low-frequency superimposing unit 55.

Capacitances C1, C2 and C3 interrupt the bias voltages applied to the signal electrodes of the optical modulator at the indicated positions. It is required that the capacitance C3 be made a sufficiently large value so as to be capable of passing the low-frequency signal SLF.

The centers of the output signals from the low-frequency superimposing unit 55 and drive circuit 62 agree with the bias voltages Vb1, Vb2 (=0 V) of the optical modulators 52a, 52b, and therefore the signal waveforms become as shown in (c) and (e) of FIG. 8. As a result, the modulator driving voltage signal applied to the optical modulator 52 has the amplitude 2·Vπ [indicated by (c)–(e) in FIG. 8], which corresponds to the potential difference across both electrodes, as well as the envelopes EU, EL, on the ON and OFF sides, modulated by the low frequency $f_0$ and at the same phase.

If the operating point of the optical modulator 52 drifts from the optimum value, a low-frequency signal component having a phase conforming to the direction of drift is produced in the optical signal output by the optical modulator 52. From this point onward, therefore, the bias voltage Vb1 of the optical modulator is controlled in a direction that will cancel out this low-frequency component. More specifically, the optical branching unit 56 branches part of the optical signal output from the optical modulator 52, the photodiode 57a converts this optical signal to an electrical signal, and the amplifying circuit 57b inputs the electrical signal to the phase comparator 57c upon amplifying the signal to the required amplitude. The phase comparator 57c, to which the low-frequency signal SLF output by the low-frequency oscillator 54 and the electrical signal conforming to the photodiode output are input, extracts the low-frequency signal from the photodiode output by a phase comparison and inputs the extracted low-frequency signal to the bias supply circuit 58. The latter controls the bias voltage Vb1 in such a direction that the low-frequency signal component in the photodiode output will be come zero.

FIG. 7 illustrates a method in which low frequency is superimposed solely upon the drive circuit 61. However, it is also possible to subject the drive signals from both drive circuits 61, 62 to similar low-frequency amplitude modulation simultaneously at phases that are the opposite of each other. In such case the low-frequency modulated amplitude of the modulator driving voltage signal indicated at (c)–(e) in FIG. 8 would double.

Figure 9:
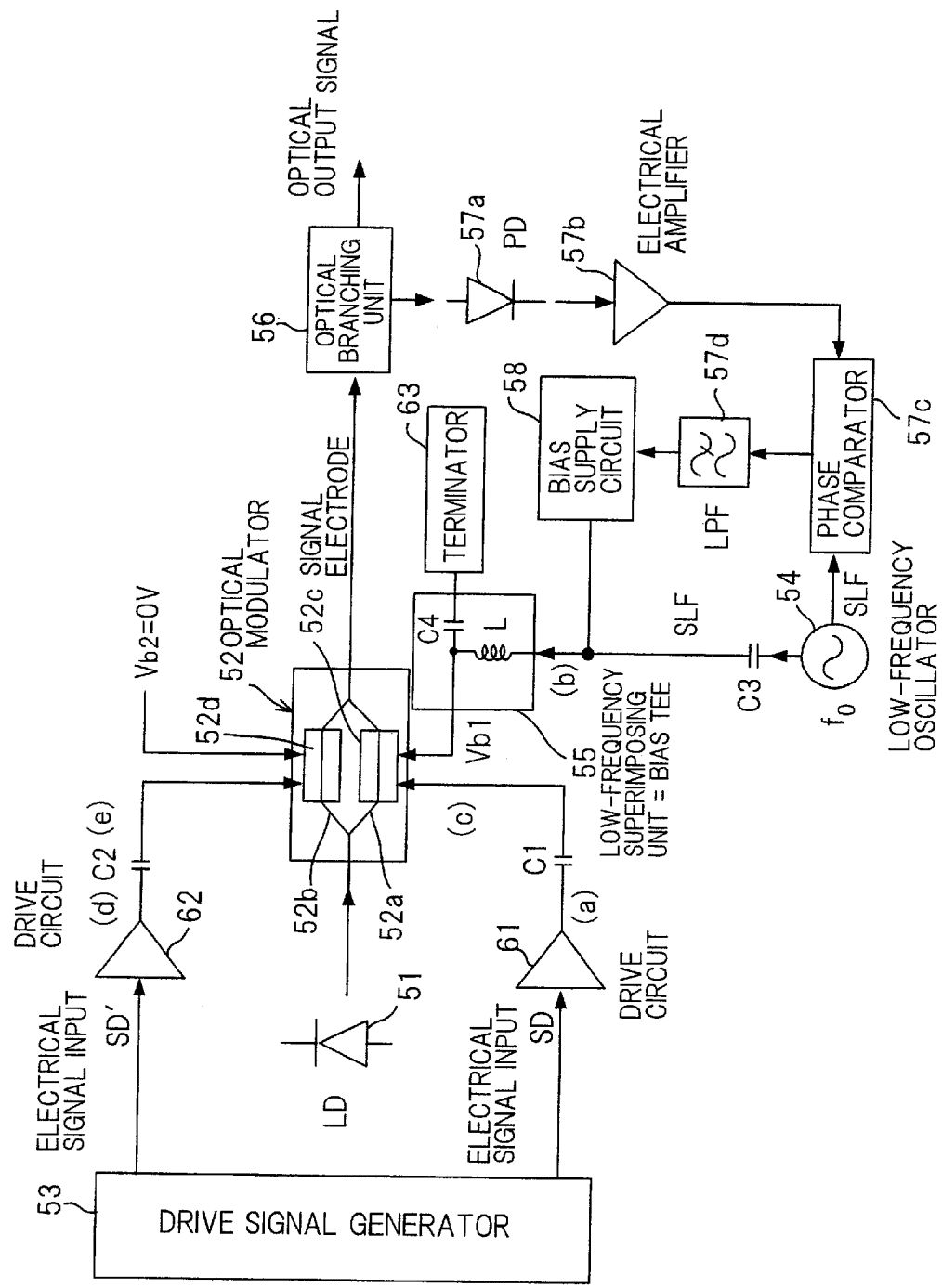
FIG. 9 is a first modification of the optical modulation apparatus according to the first embodiment.

FIG. 9 illustrates a first modification of the optical modulation apparatus according to the first embodiment. Components identical with those shown in FIG. 7 are designated by like reference characters. In the first embodiment, the center voltage of the drive signal SD is varied by the low-frequency signal of frequency $f_0$ at the input side of the optical modulator 52. In this modification, however, the bias voltage input to the signal electrode 52c can be varied by the low-frequency signal of frequency $f_0$. The modification of FIG. 9 differs from the first embodiment in the following respects:

(1) The output terminal of the low-frequency oscillator 54 and the output terminal of the bias supply circuit 58 are connected to vary the bias voltage Vb1 by the low-frequency signal of frequency $f_0$.

(2) The bias voltage Vb1, the amplitude of which is varied by the low-frequency, is input to the signal electrode 52c of the optical modulator 52 via the low-frequency superimposing unit 55. The capacitances C1, C2 and C3 interrupt the bias voltages, which are applied to the signal electrodes of the optical modulator, at the indicated positions, thereby preventing input of these voltages to the drive circuits and low-frequency oscillator.

Figure 10:
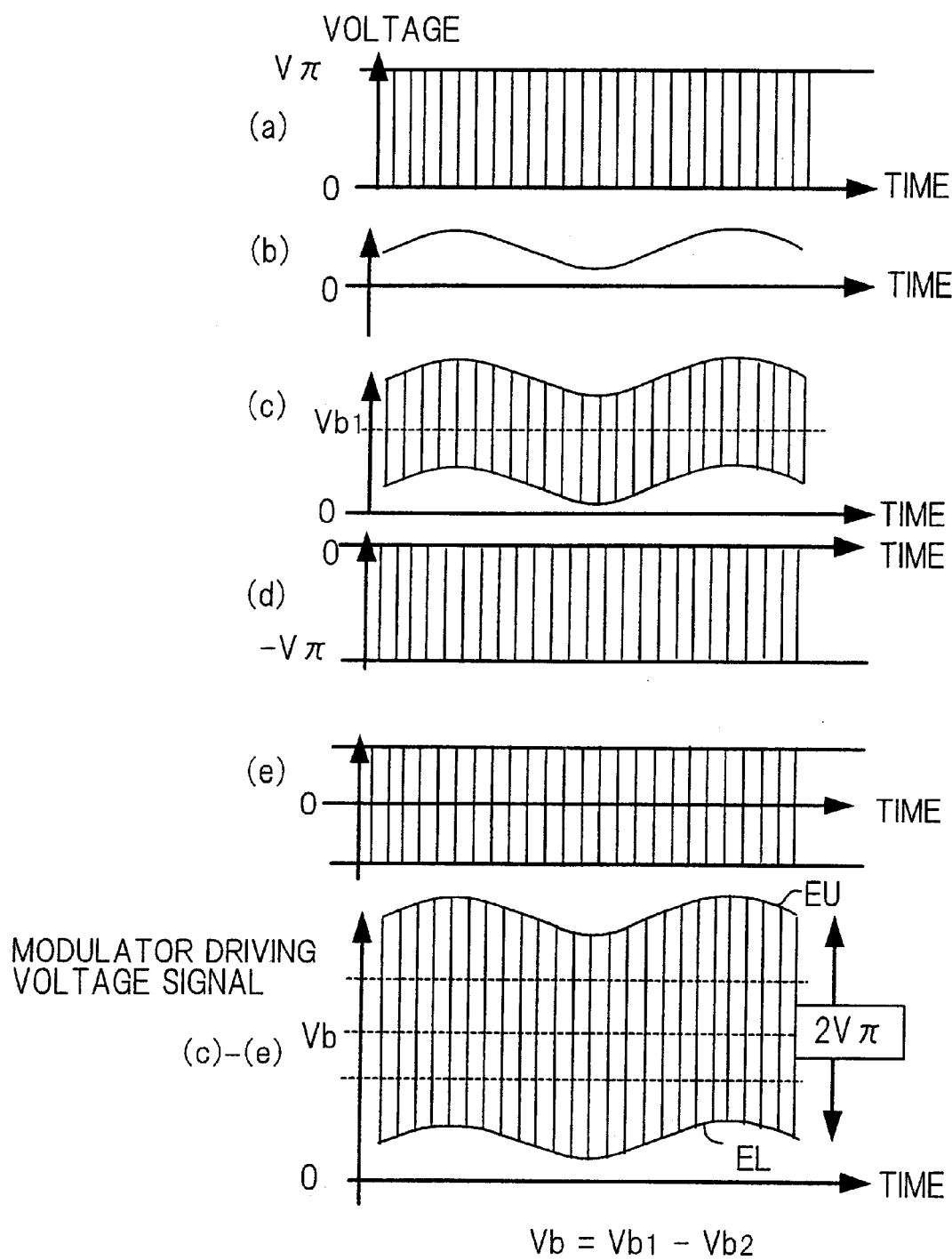
FIG. 10 is a waveform diagram of signals associated with FIG. 9.

The signal waveforms associated with the arrangement of FIG. 9 are identical with those of the first embodiment, as illustrated in FIG. 10. That is, the modulator driving voltage signal [see (c)–(e) in FIG. 10] applied to the optical modulator 52 has the amplitude 2·Vπ as well as the envelopes EU, EL, on the ON and OFF sides, both modulated by the low frequency $f_0$ and at the same phase. Subsequent control of the operating point is the same as in the first embodiment.

Figure 11:
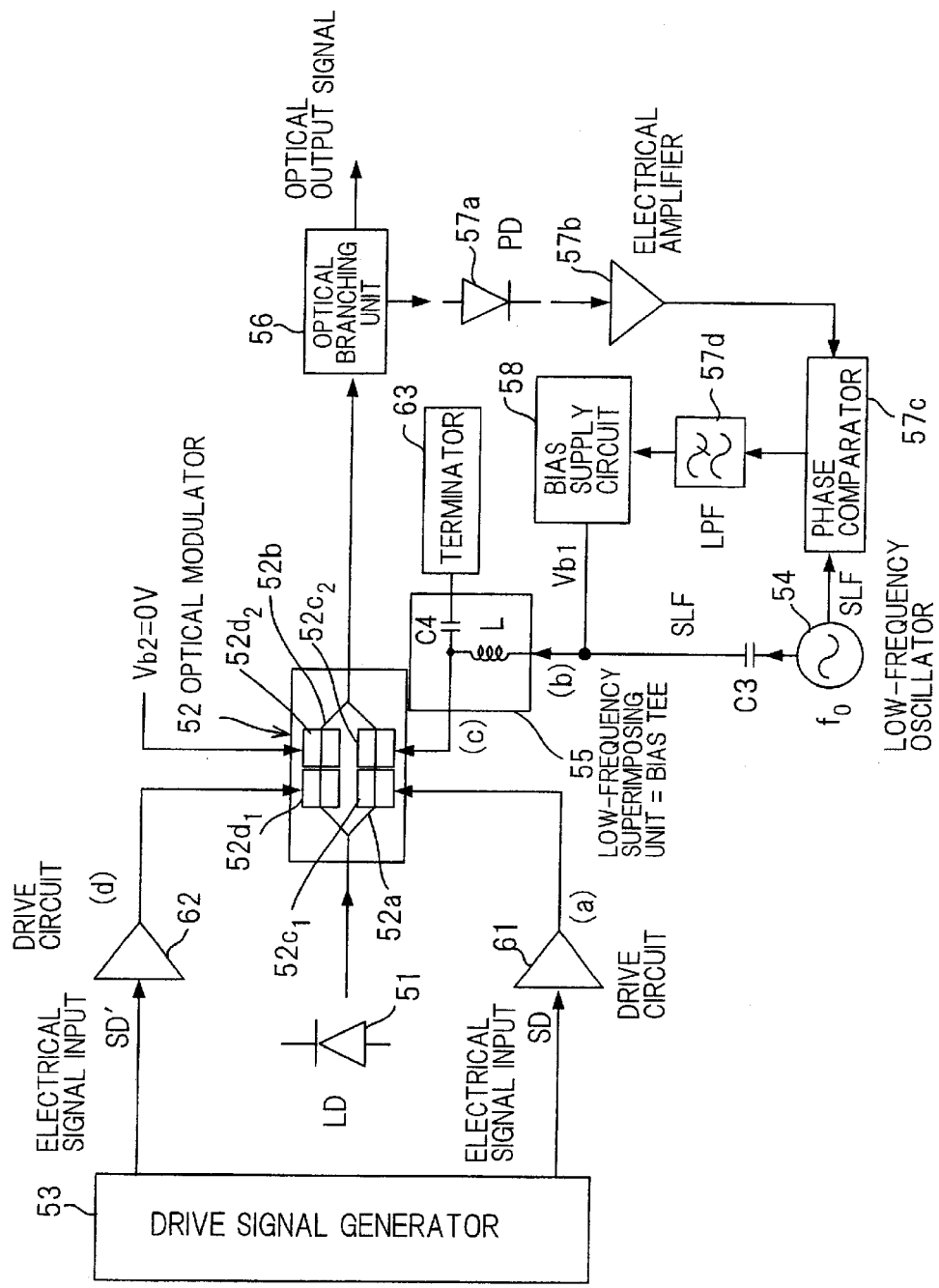
FIG. 11 is a second modification of the optical modulation apparatus according to the first embodiment.

FIG. 11 illustrates a second modification of the optical modulation apparatus according to the first embodiment. Components identical with those shown in FIG. 7 are designated by like reference characters. In both the first embodiment and first modification, the signal electrodes of the optical modulator 52 that apply the modulating signals are common with the bias electrodes that apply the center voltage. However, these electrodes can be provided as separate electrodes for drive signals and for the bias voltages. Providing these electrodes as separate electrodes makes it possible to eliminate the capacitances C1, C2 for interrupting the bias voltages.

The modification of FIG. 11 differs from the first embodiment in the following respects:

(1) The output terminal of the low-frequency oscillator 54 and the output terminal of the bias supply circuit 58 are connected to vary the bias voltage Vb1 by the low-frequency signal of frequency $f_0$.

(2) The electrode 52c is separated into electrodes 52c$_1$, 52c$_2$ for the drive signal and bias voltage, respectively, and the electrode 52d is separated into electrodes 52d$_1$, 52d$_2$ for the drive signal and bias voltage, respectively.

(3) The drive signals output by the drive circuits 61, 62 are input to the signal electrodes 52c$_1$, 52d$_1$, respectively.

(4) The bias voltage Vb1 whose amplitude is varied by the low-frequency signal is input to the bias voltage electrode 52c$_2$ of the optical modulator 52 via the low-frequency superimposing unit 55, and the bias voltage Vb2 (=0) is input to the bias voltage electrode 52d$_2$.

(5) The capacitances C1 and C2 are deleted.

The bias voltage output by the low-frequency superimposing unit 55 has a waveform upon which the low-frequency signal is superimposed, as shown at (c) in FIG. 8. As a result of separately providing the electrodes for the drive signals and the electrodes for the bias voltages, a modulator driving voltage signal indicated at (a)+(c)−(d) in FIG. 12 enters the optical modulator 52. The modulator driving voltage signal possesses a waveform having the amplitude 2·Vπ as well as the envelopes EU, EL, on the ON and OFF sides, modulated by the low frequency f$_0$ and at the same phase.

In FIG. 11, the electrodes in the arrangement of the first modification (FIG. 9) are separated into electrodes for drive signals and electrodes for bias voltages. However, the electrodes in the arrangement of the first embodiment shown in FIG. 7 can also be separated into electrodes for drive signals and electrodes for bias voltages.

(b) Second embodiment

Figure 13:
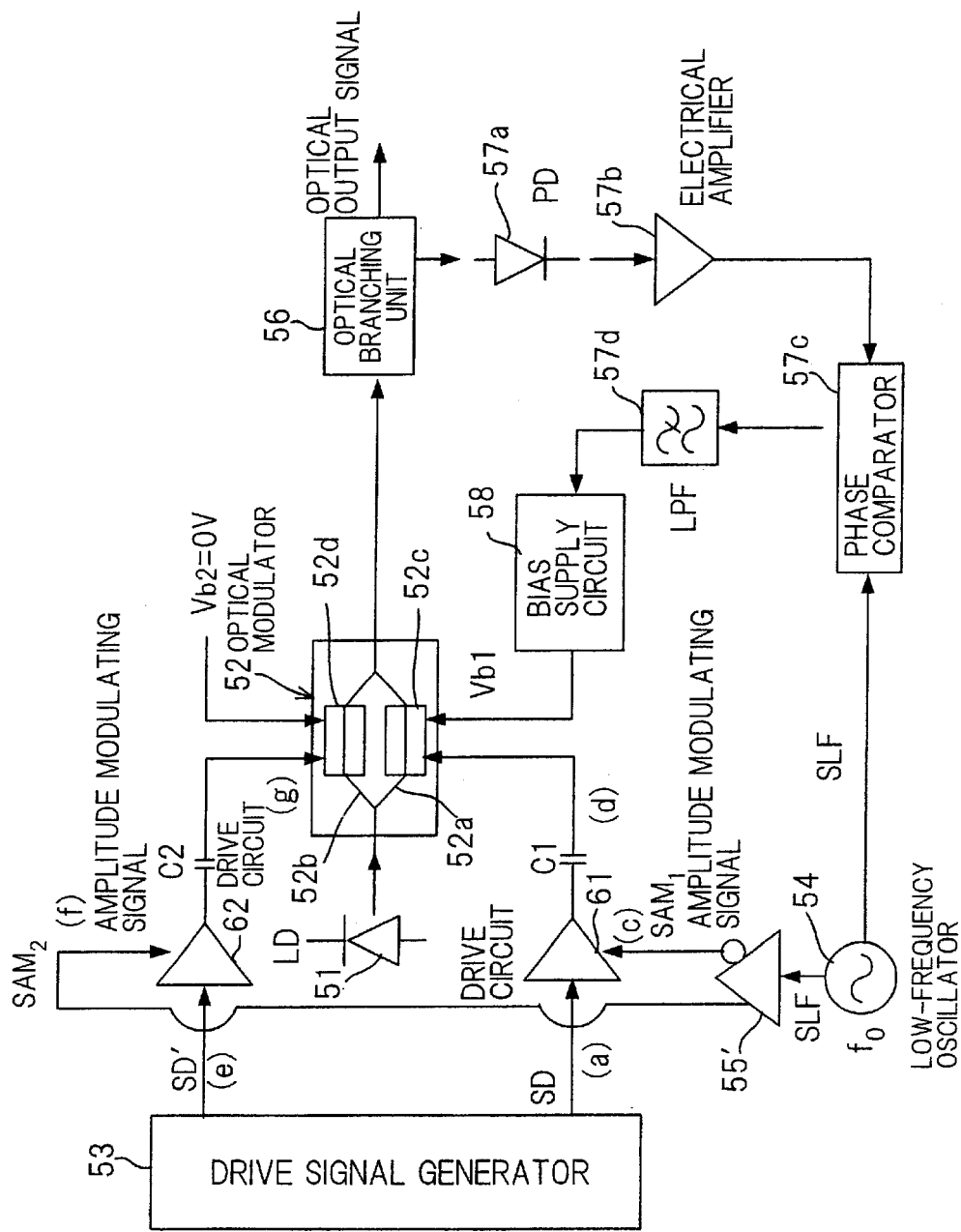
FIG. 13 is a diagram showing the construction of an optical modulation apparatus according to a second embodiment.
Figure 14:
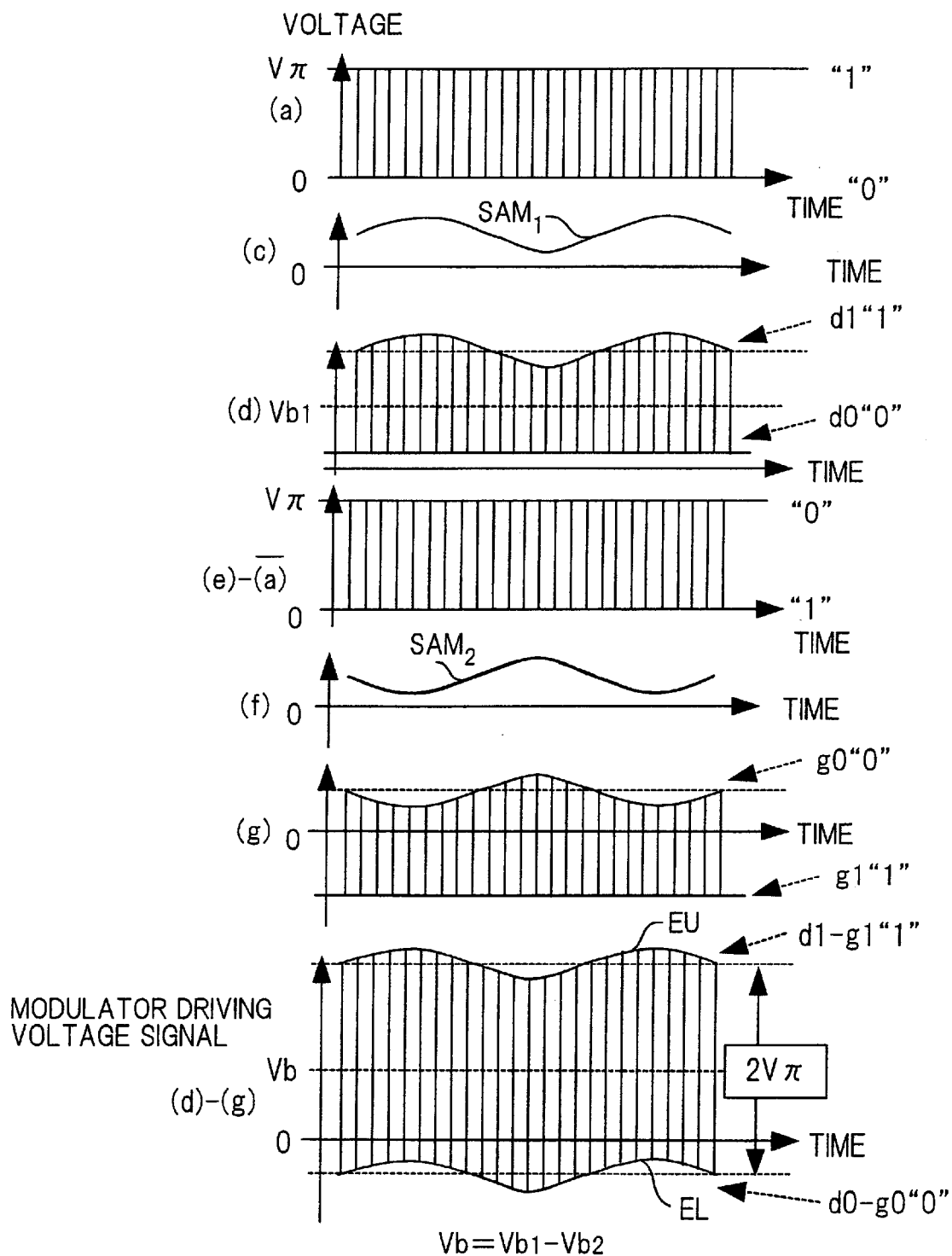
FIG. 14 is a waveform diagram of signals associated with FIG. 13.

FIG. 13 is a diagram showing the construction of an optical modulation apparatus according to a second embodiment, and FIG. 14 shows the associated signal waveforms. The second embodiment differs from the first embodiment in the method of superimposing the low-frequency signal. Components identical with those shown in FIG. 7 are designated by like reference characters.

According to the first embodiment, the arrangement is such that the input side of the optical modulator 52 is provided with the low-frequency superimposing unit 55 to vary the center voltage of the drive signal SD by the low-frequency signal. According to the second embodiment, however, the gains of the drive circuits 61, 62 are varied by a low-frequency signal, thereby amplitude modulating the drive signals by the low-frequency signal.

Shown in FIG. 13 are the semiconductor laser (DFB-LD) 51, and the MZ-type optical modulator 52, the drive signal generator 53 which generates the two mutually complimentary drive signals (push-pull drive signals) SD, SD' [(a), (e) in FIG. 14] having the amplitude Vπ, the low-frequency oscillator 54 for generating the low-frequency signal SLF of frequency f$_0$, and an amplitude modulating signal generator 55', to which the low-frequency SLF is input, for generating two amplitude modulating signals SAM$_1$, SAM$_2$ [(c), (f) in FIG. 14] whose phases are displaced from each other by 180°. The amplitude modulating signal generator 55' functions as low-frequency superimposing means for superimposing a low-frequency signal upon the drive signals SD, SD'.

Also shown in FIG. 13 are the optical branching unit 56 for branching the optical signal output by the MZ-type optical modulator 52, the photodiode 57a, the amplifying circuit 57b for amplifying the output of the photodiode 57a, the phase comparator 57c for detecting the low-frequency signal component contained in the photodiode output and outputting the low-frequency signal component as a signal indicative of the drift of the operating point of the modulator, and the low-pass filter 57d for smoothing the output of the phase comparator. Also shown are the bias supply circuit (operating-point controller) 58 for controlling the position of the operating point by controlling the bias voltage Vb1, which is applied to the signal electrode 52c, based upon the low-frequency signal component contained in the photodiode output, namely the drift of the operating point of the optical modulator 52. The drive circuits 61, 62 input the drive signals SD, SD', which are output by the drive signal generator 53, to the respective signal electrodes 52c, 52d of the optical modulator 52, thereby driving the modulator. The drive circuits 61, 62 have gain control terminals to which the amplitude modulating signals SAM$_1$, SAM$_2$, respectively, from the amplitude modulating signal generator 55' are applied. The capacitances C1, C2 interrupt the bias voltages, which are applied to the respective signal electrodes of the modulator, at the positions they occupy.

By mutually inverting the amplitude modulating signals SAM$_1$, SAM$_2$, which are applied to the drive circuits 61, 62, respectively, in the manner shown at (c) and (f) in FIG. 14, the drive circuits 61 and 62 are made to output drive signals indicated at (d) and (g), respectively, in FIG. 14. As a result, the modulator driving voltage signal applied to the optical modulator 52 becomes a potential difference [indicated at (d)–(g) in FIG. 14] that is applied between the signal electrodes 52c, 52d. This is the same as the waveform of the first embodiment shown in FIG. 8. Subsequent control of the operating point is the same as in the first embodiment.

In FIG. 14, "1", "0" correspond to the logic of the input electrical signal. Because of push-pull drive, the drive signal (g) takes on the "1" level at the instant the drive signal (d) assumes the "1" level, and therefore the envelope EU indicated at (d)–(g) becomes as shown at d1–g1. Similarly, the drive signal (g) takes on the "0" level at the instant the drive signal (d) assumes the "0" level, and therefore the envelope EL indicated at (d)–(g) becomes as shown at d0–g0. In FIG. 14, (e) is a signal that is the inverse of (a).

Figure 15:
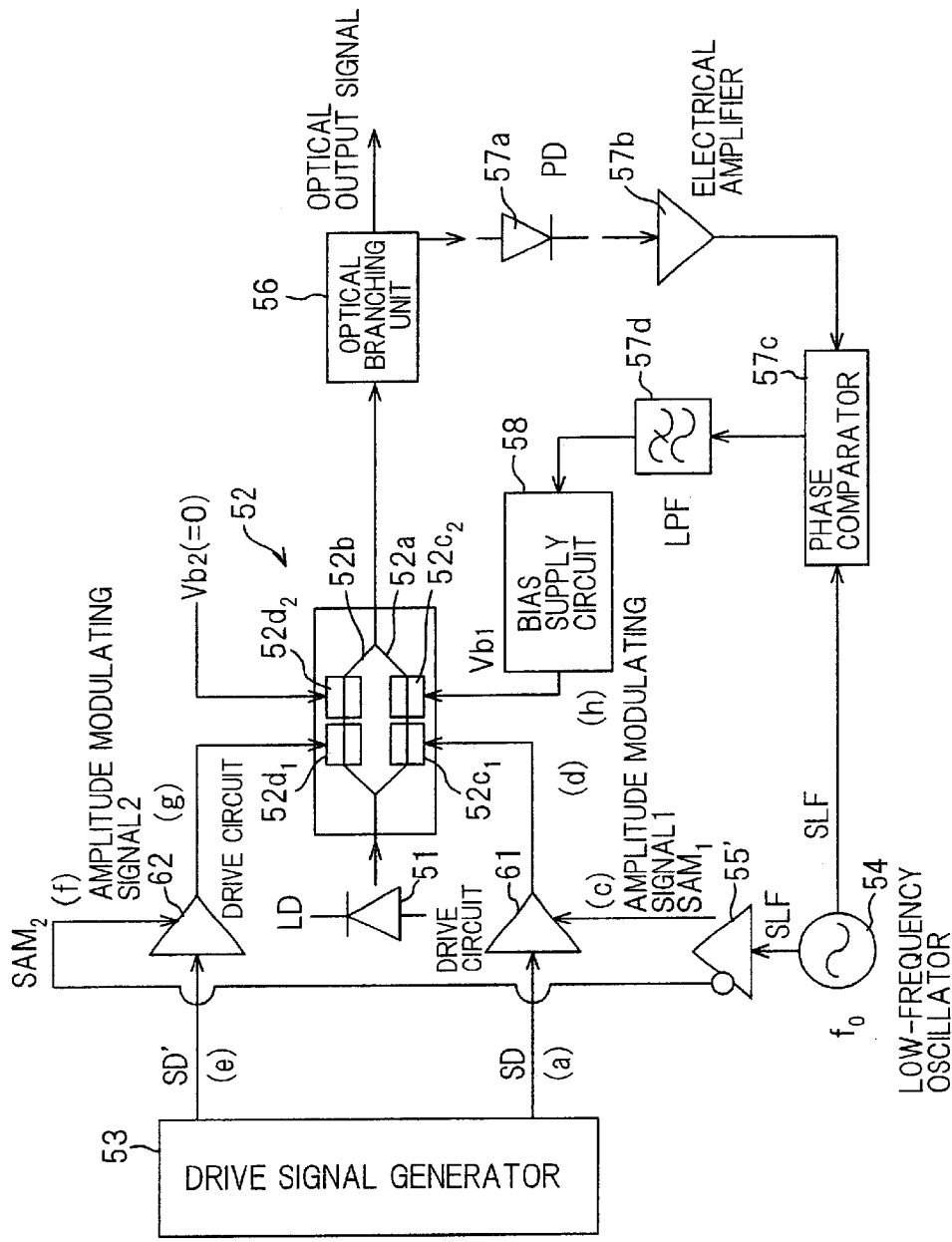
FIG. 15 is a modification of the optical modulation apparatus according to the second embodiment.

FIG. 15 illustrates a modification of the optical modulation apparatus according to the second embodiment. Components identical with those shown in FIG. 13 are designated by like reference characters. In the second embodiment, the electrodes for entering the drive signals are common with the electrodes for entering the bias voltages. However, these electrodes are provided as separate electrodes for drive signals and for the bias voltages in this modification. Providing these electrodes as separate electrodes makes it possible to eliminate capacitances for interrupting the bias voltages.

The modification of FIG. 15 differs from the second embodiment in the following aspects:

(1) The electrode 52c is separated into electrodes 52c$_1$, 52c$_2$ for the drive signal and bias voltage, respectively, and the electrode 52d is separated into electrodes 52d$_1$, 52d$_2$ for the drive signal and bias voltage, respectively.

(2) The drive signals output by the drive circuits 61, 62 are input to the signal electrodes 52c$_1$, 52d$_1$, respectively.

(3) The bias voltage Vb1 (=Vb) is input to the bias voltage electrode 52c$_2$ of the optical modulator 52, and the bias voltage Vb2 (=0) is input to the bias voltage electrode 52d$_2$.

(4) The capacitances C1 and C2 are deleted.

Figure 16:
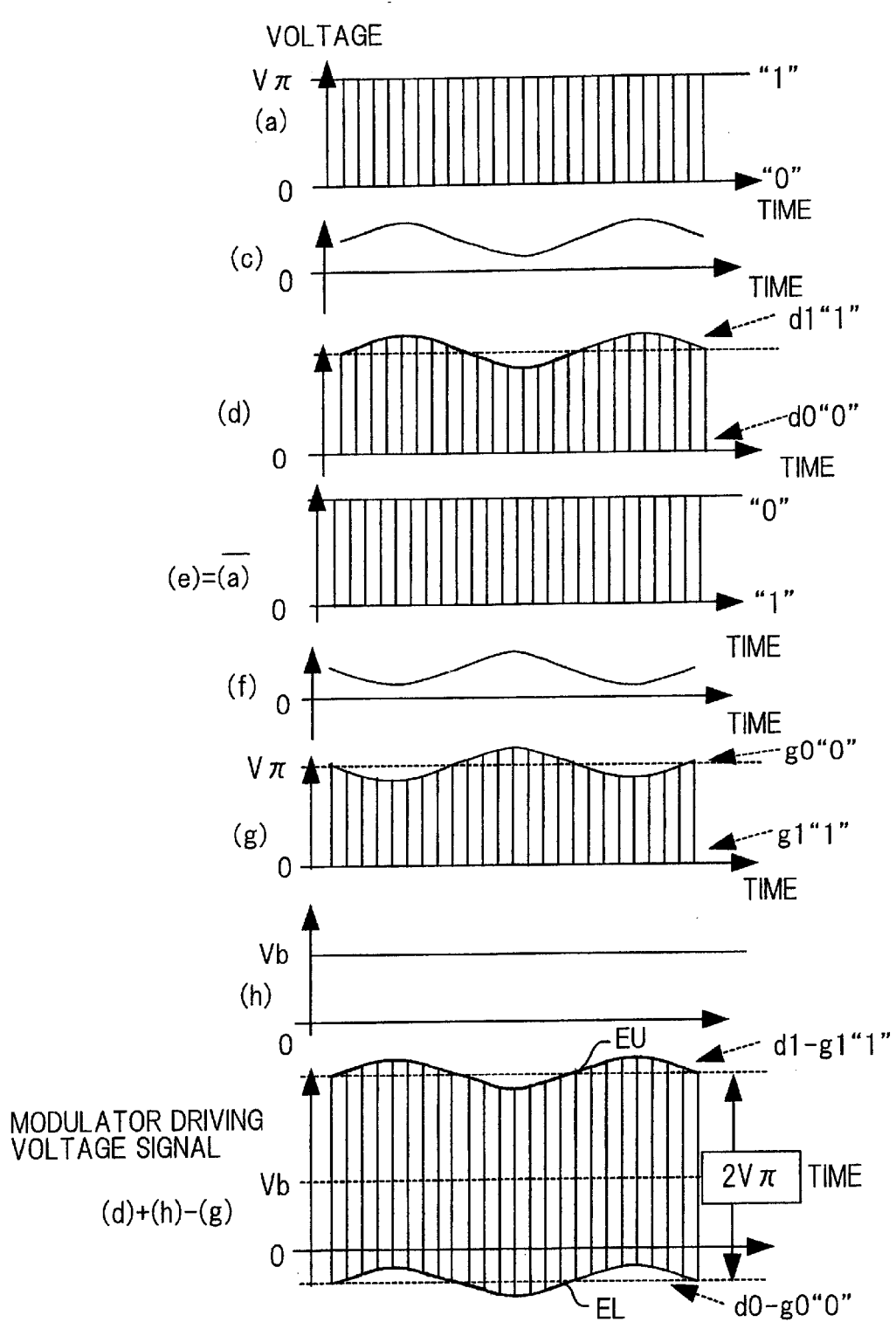
FIG. 16 is a waveform diagram of signals associated with FIG. 15.

By mutually inverting the amplitude modulating signals SAM$_1$, SAM$_2$, which are applied to the drive circuits 61, 62, respectively, in the manner shown at (c) and (f) in FIG. 16, the drive circuits 61 and 62 are made to output drive signals indicated at (d) and (g), respectively, in FIG. 16. As a result of separately providing electrodes for the drive signals and bias voltages in the modification of FIG. 15, the modulator driving voltage signal applied to the optical modulator 52 takes on a value obtained by adding the bias voltage Vb1 (=Vb) of the bias electrode 52c$_2$ to the potential difference input between the two signal electrodes 52c$_1$, 52d$_1$. The waveform of this modulator driving voltage signal is as indicated at (d)+(h)−(g) in FIG. 16. This is a waveform similar to that of the second embodiment.

(c) Third embodiment

Figure 17:
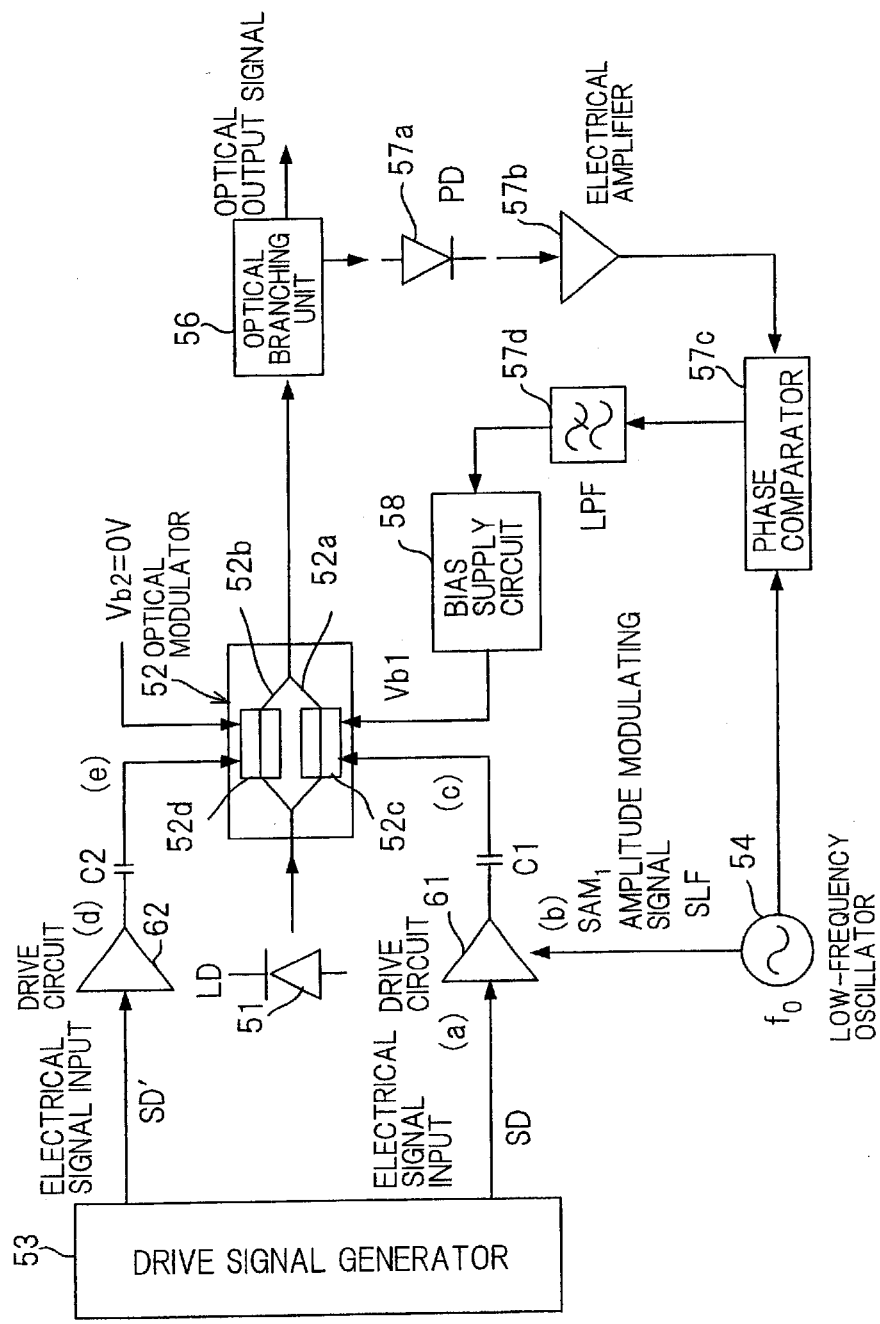
FIG. 17 is a diagram showing the construction of an optical modulation apparatus according to a third embodiment.

FIG. 17 is a diagram showing the construction of an optical modulation apparatus according to a third embodiment. Components identical with those of the second embodiment shown in FIG. 13 are designated by like reference characters. In the second embodiment, the drive signals SD, SD' are both amplitude modulated by low-frequency signals, whereby the ON and OFF sides of the modulator driving voltage signal are modulated by low-frequency signals having the same phase. In the third embodiment, only one of the drive signals SD, SD' is amplitude modulated by a low-frequency signal, whereby only the ON side or OFF side of the modulator driving voltage signal is modulated by the low-frequency signal.

Figure 18:
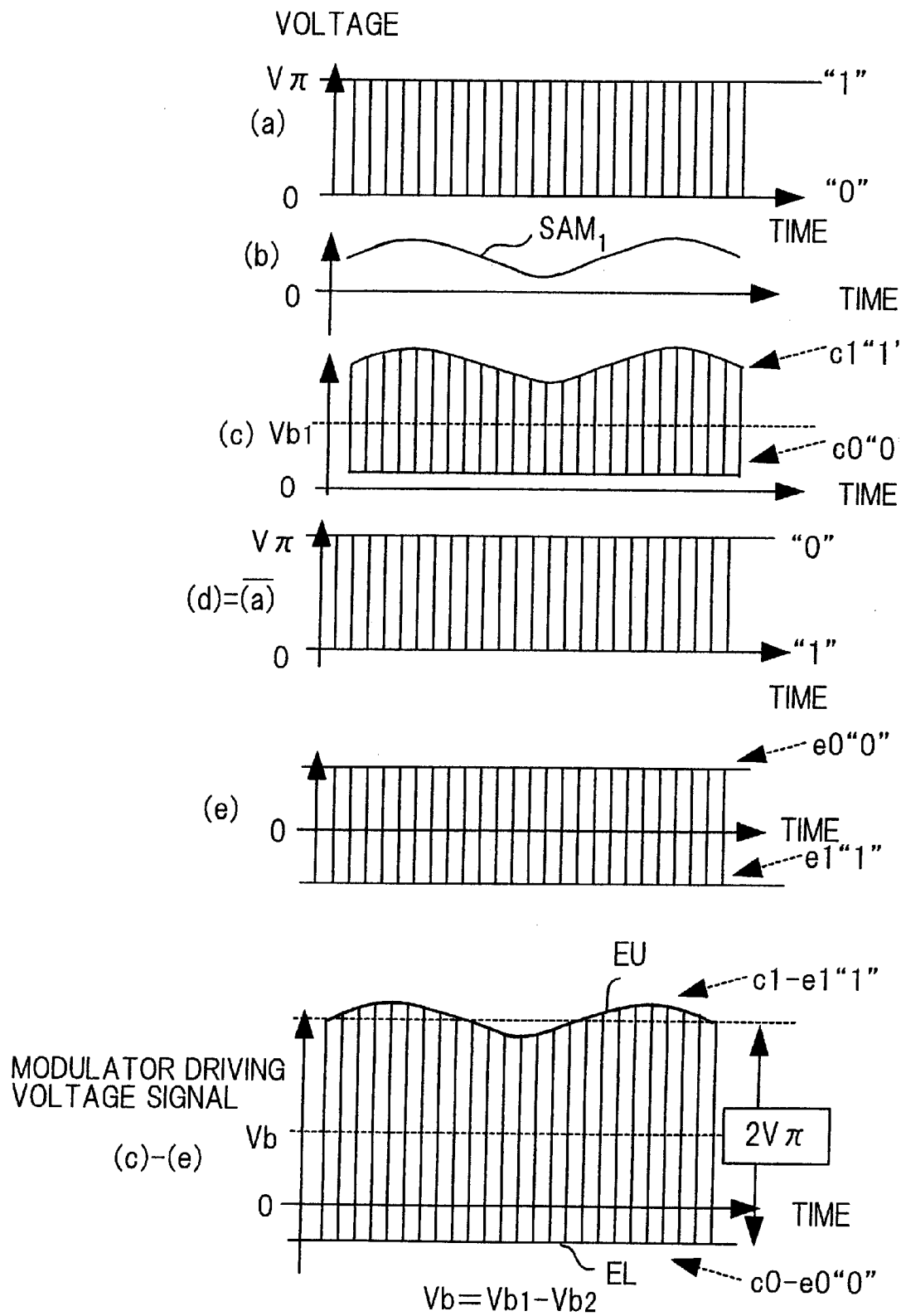
FIG. 18 is a waveform diagram of signals associated with FIG. 17.

The third embodiment shown in FIG. 17 differs from the second embodiment of FIG. 13 in that the low-frequency signal SLF of frequency $f_0$ is input to the gain control terminal of the drive circuit 61 as the amplitude modulating signal SAM$_1$; the gain of the drive circuit 62 is not controlled. If the amplitude modulating signal SAM$_1$ is input to the gain control terminal of the drive circuit 61, the gain of this drive circuit changes. As a result, the drive circuit 61 outputs a drive signal of the kind shown at (c) in FIG. 18. Since the gain of the other drive circuit 62 remains constant, however, this drive circuit outputs a drive signal of the kind indicated at (e) in FIG. 18, the center of this signal being the bias voltage Vb2 (=0). As a result, the modulator driving voltage signal applied to the optical modulator 52 develops a potential difference [indicated at (c)−(e) in FIG. 18] that is applied between the signal electrodes 52c, 52d. This is the waveform shown in FIG. 3. Accordingly, from this point onward the operating point is controlled in such a manner that the low-frequency signal component of frequency $f_0$ contained in the optical signal output by the optical modulator 52 will become zero.

(d) Fourth embodiment

Figure 19:
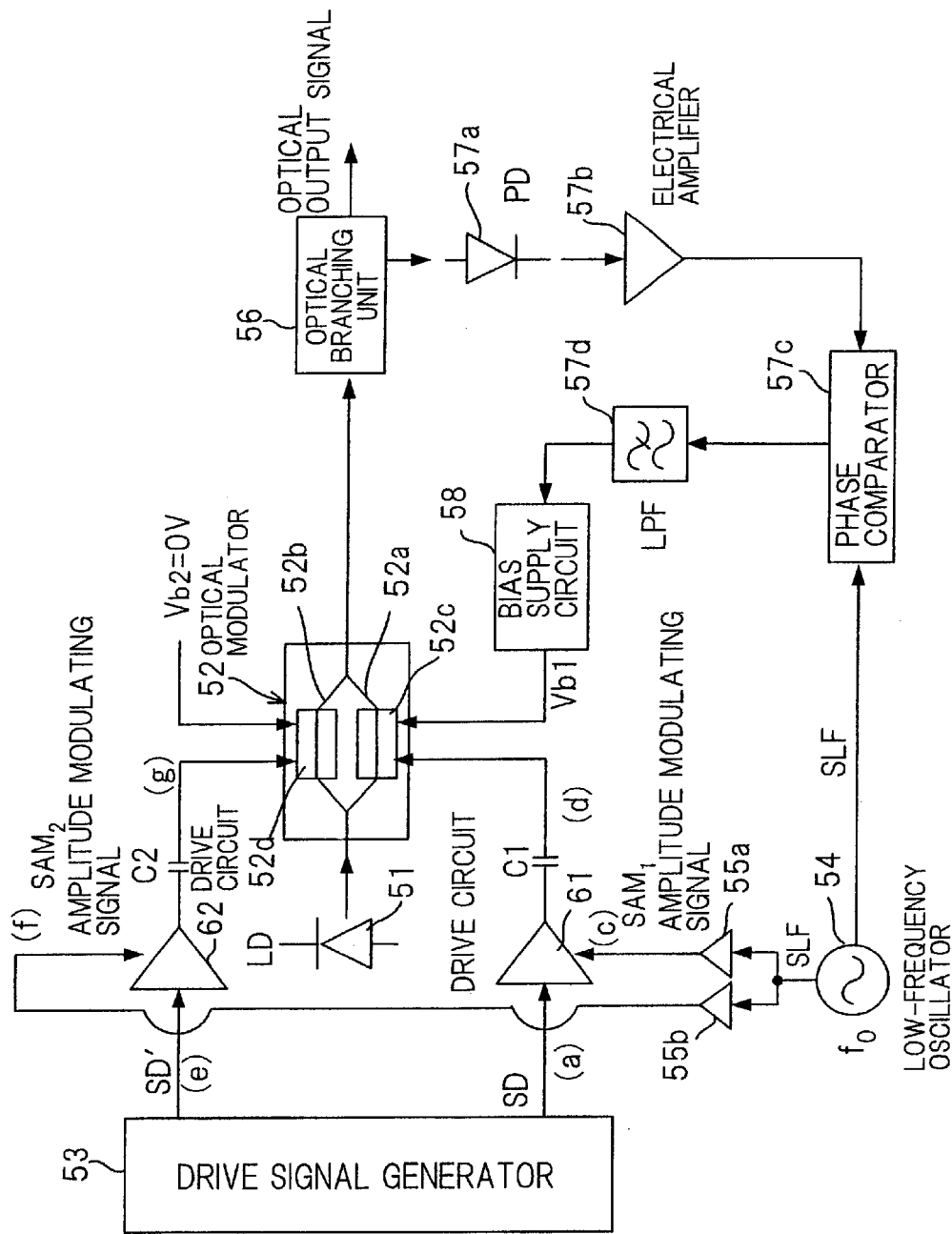
FIG. 19 is a diagram showing the construction of an optical modulation apparatus according to a fourth embodiment.

FIG. 19 is a diagram showing the construction of an optical modulation apparatus according to a fourth embodiment. Components identical with those of the second embodiment shown in FIG. 13 are designated by like reference characters. In the second embodiment, the drive signals SD, SD' are modulated respectively by the low-frequency signal SAM$_1$ and the low-frequency signal SAM$_2$ obtained by inverting the signal SAM$_1$, whereby the ON and OFF sides of the modulator driving voltage signal are modulated by low-frequency signals having the same phase. In the fourth embodiment, the drive signals SD, SD' are amplitude modulated by the low-frequency signals SAM$_1$, SAM$_2$ of identical phase but different amplitude, whereby the ON and OFF sides of the modulator driving voltage signal are modulated by low-frequency signals of identical phase but different amplitudes.

The fourth embodiment of FIG. 19 differs from the second embodiment of FIG. 13 in the following respects:

(1) First and second amplitude modulating signal generators 55a, 55b constituted by amplifiers having different gains are provided instead of the amplitude modulating signal generator 55', and the low-frequency signal SLF is input to each of these signal generators.

(2) The amplitude modulating signal SAM$_1$ output by the first amplitude modulating signal generator 55a is input to the gain control terminal of the drive circuit 61, and the amplitude modulating signal SAM$_2$ output by the second amplitude modulating signal generator 55b is input to the gain control terminal of the drive circuit 62.

Figure 20:
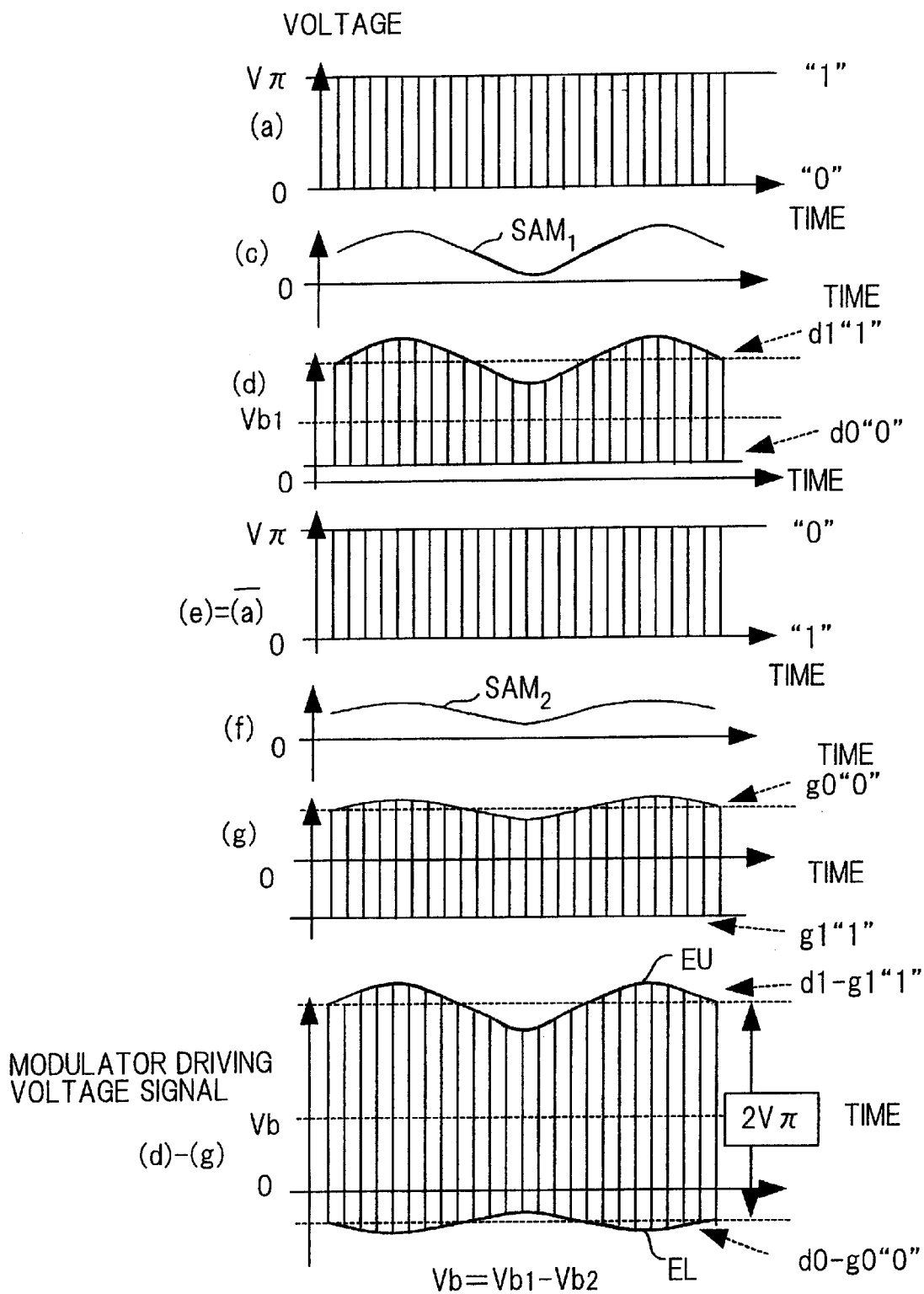
FIG. 20 is a waveform diagram of signals associated with FIG. 19.

By varying the amplitudes of the amplitude modulating signals SAM$_1$, SAM$_2$, which are applied to the drive circuits 61, 62, respectively, as shown at (c) and (f) in FIG. 20, the drive circuits 61, 62 output the drive signals indicated at (d) and (g), respectively, in FIG. 20. As a result, the modulator driving voltage signal applied to the optical modulator 52 develops a potential difference [indicated at (d)−(g) in FIG. 20] that is applied between the signal electrodes 52c, 52d. This is the waveform shown in FIG. 4. Accordingly, from this point onward the operating point is controlled in such a manner that the low-frequency signal component of frequency $f_0$ contained in the optical signal output by the optical modulator 52 will become zero.

(e) Fifth embodiment

Figure 21:
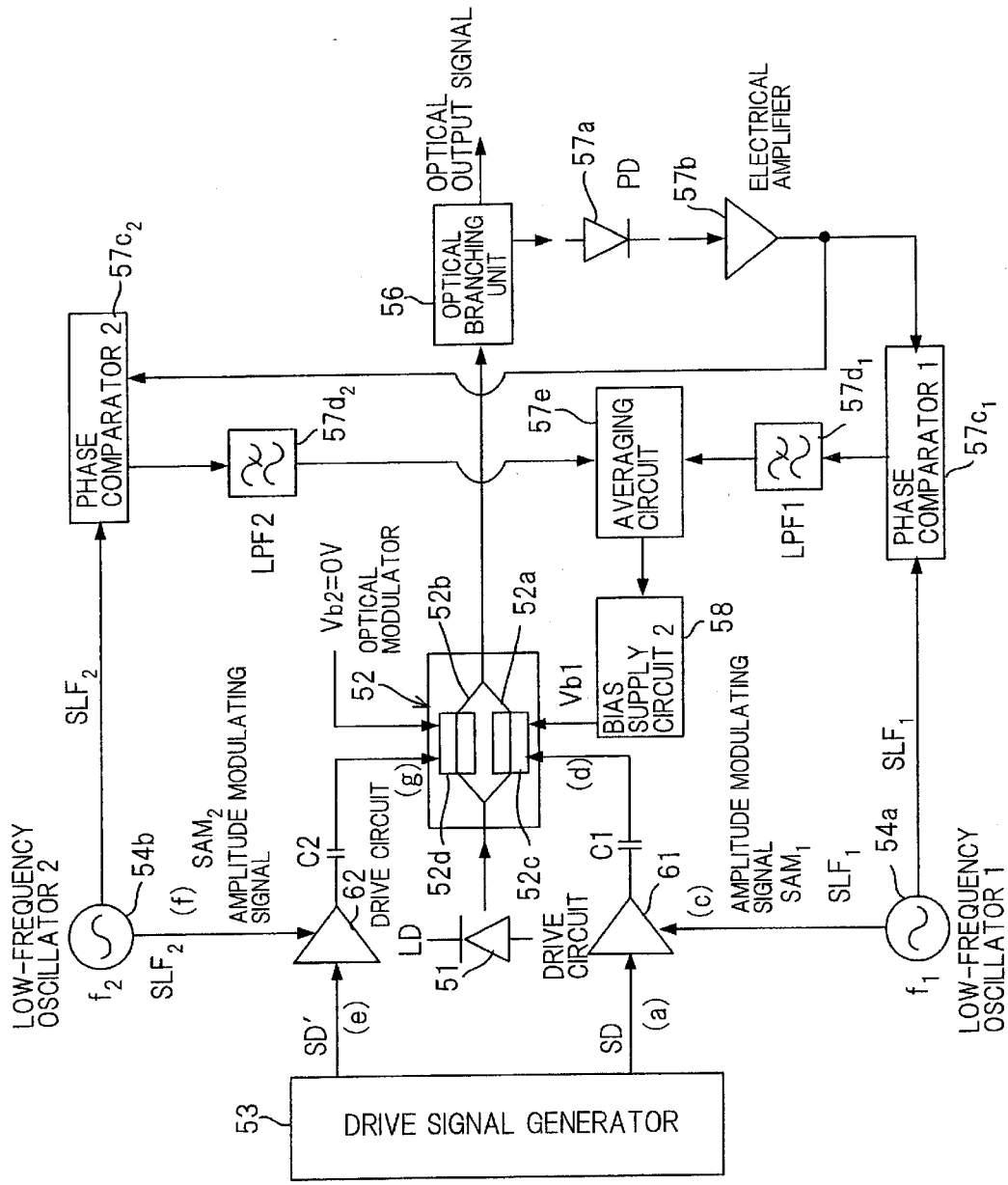
FIG. 21 is a diagram showing the construction of an optical modulation apparatus according to a fifth embodiment.

FIG. 21 is a diagram showing the construction of an optical modulation apparatus according to a fifth embodiment. Components identical with those of the second embodiment shown in FIG. 13 are designated by like reference characters. In the fifth embodiment, the drive signals SD, SD' are modulated respectively by the low-frequency signal SAM$_1$ and the low-frequency signal SAM$_2$ obtained by inverting the signal SAM$_1$, whereby the ON and OFF sides of the modulator driving voltage signal are modulated by low-frequency signals having the same phase. In the fifth embodiment, the drive signals SD, SD' are amplitude modulated by the amplitude modulating signals SAM$_1$, SAM$_2$ having different frequencies, whereby the ON and OFF sides of the modulator driving voltage signal are modulated by signals of different frequencies.

The fifth embodiment of FIG. 21 differs from the second embodiment of FIG. 13 in the following respects:

(1) First and second low-frequency signal oscillators 54a, 54b for generating low-frequency signals of frequencies $f_1$ and $f_2$, respectively, are provided.

(2) A low-frequency signal SLF$_1$ of frequency $f_1$ is input to the gain control terminal of the drive circuit 61 as the amplitude modulating signals SAM$_1$, and a low-frequency signal SLF$_2$ of frequency $f_2$ is input to the gain control terminal of the drive circuit 62 as the amplitude modulating signals SAM$_2$.

(3) First and second phase comparators 57c1, 57c2 are provided. The inputs to the phase comparators 57c1, 57c2 are the low-frequency signals SLF$_1$, SLF$_2$ output by the low-frequency signal oscillators 54a, 54b, respectively, as well as the electrical signal conforming to the photodiode output signal. The first and second phase comparators 57c1, 57c2 detect and output the low-frequency signal components of frequencies $f_1$, $f_2$, respectively, contained in the photodetector output.

(4) Low-pass filters 57d1, 57d2 for smoothing the signals output by the first and second phase comparators 57c1, 57c2 are provided.

(5) An averaging circuit 57e is provided. This circuit calculates the average value of the low-frequency components of frequencies $f_1$, $f_2$, which are contained in the photodetector output signal, and inputs the average value to the bias supply circuit 58.

(6) The bias supply circuit 58 controls the bias voltage in such a manner that the average value becomes zero.

Figure 22:
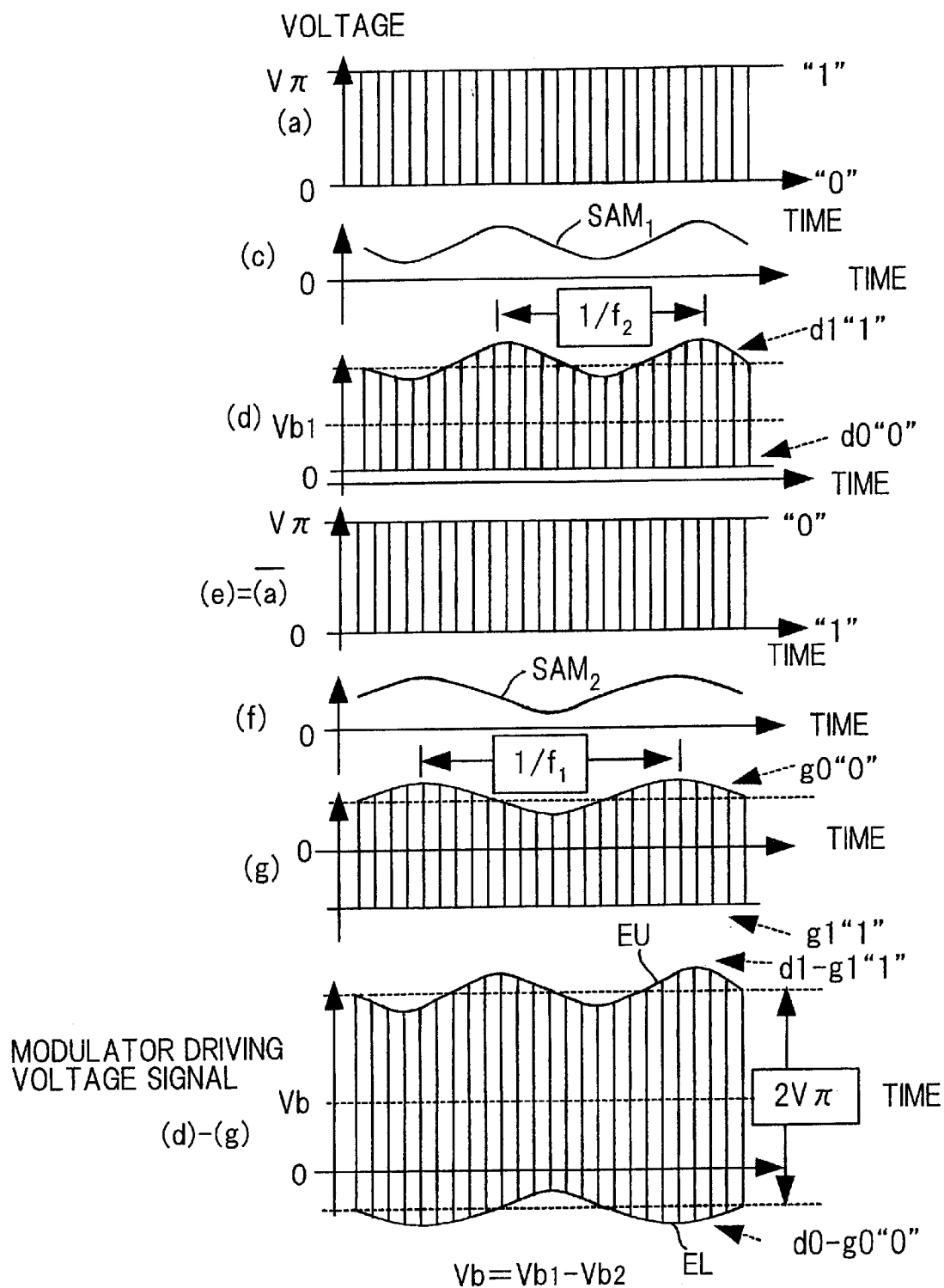
FIG. 22 is a waveform diagram of signals associated with FIG. 21.

When the amplitude modulating signal SAM$_1$ of frequency $f_1$ is input to the gain control terminal of the drive circuit 61, the gain of the drive circuit 61 changes and the latter outputs a drive signal of the kind indicated at (d) in FIG. 22. When the amplitude modulating signal $SAM_2$ of frequency $f_2$ is input to the gain control terminal of the drive circuit 62, the gain of the drive circuit 62 changes and the latter outputs a drive signal of the kind indicated at (g) in FIG. 22. As a result, the modulator driving voltage signal applied to the optical modulator 52 becomes a potential difference [indicated at (d)–(g) in FIG. 22] that is applied between the signal electrodes 52c, 52d. This is the same as the waveform shown in FIG. 5. From this point onward, therefore, the operating point is controlled in such a manner that the low-frequency signal components of frequencies $f_1$, $f_2$ contained in the optical signal output by the optical modulator 52 will become zero. For example, if the bias point of optical modulator 52 shifts from the optimum value, both signal components of the low-frequencies $f_1$, $f_2$ appear in the optical signal and the phase of each signal gives a direction of control for changing the bias point to the optimum position. Accordingly, the averaging circuit 57e calculates the average value of both signal components, and bias control is performed in such a manner that this average value will become zero. This makes it possible to improve the precision of control.

(f) Sixth embodiment

Figure 23:
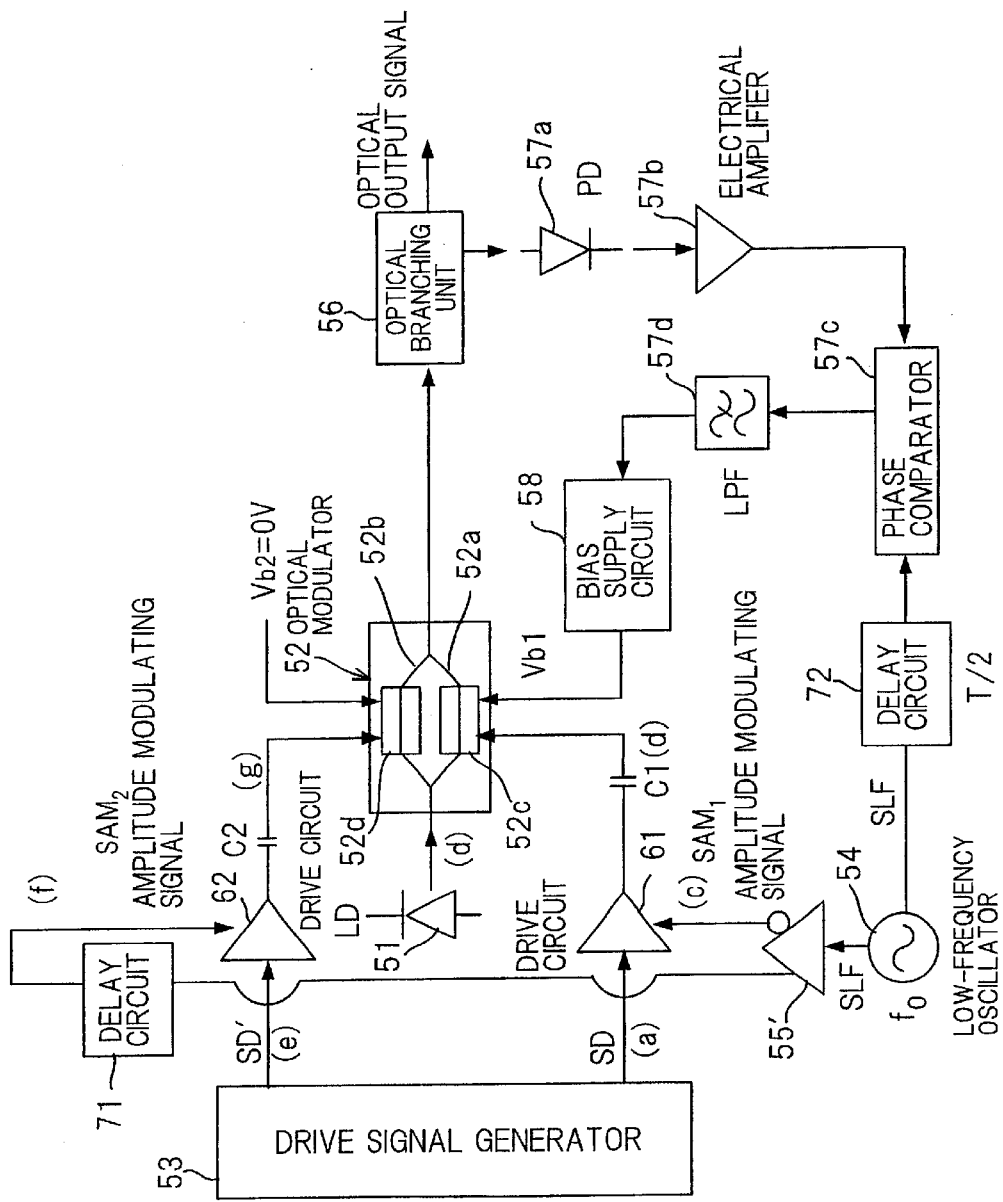
FIG. 23 is a diagram showing the construction of an optical modulation apparatus according to a sixth embodiment.

FIG. 23 is a diagram showing the construction of an optical modulation apparatus according to a sixth embodiment. Components identical with those of the second embodiment shown in FIG. 13 are designated by like reference characters. In the second embodiment, the drive signals SD, SD' are modulated respectively by the low-frequency signal $SAM_1$ and the low-frequency signal $SAM_2$ obtained by inverting the signal $SAM_1$, whereby the ON and OFF sides of the modulator driving voltage signal are modulated by low-frequency signals having the same phase. In the sixth embodiment, the drive signals SD, SD' are modulated respectively by the low-frequency signal $SAM_1$ and low-frequency inverted signal $SAM_2$ of different phases, whereby the ON and OFF sides of the modulator driving voltage signal are modulated by low-frequency signals of different phases.

The sixth embodiment of FIG. 23 differs from the second embodiment of FIG. 13 in the following respects:

(1) A first delay circuit 71 for delaying the low-frequency signal SLF of frequency $f_0$ by a prescribed time T is provided, and the delayed signal output by the delay circuit 71 is input to the gain control terminal of the drive circuit 62 as the amplitude modulating signals SAM2.

(2) A second delay circuit 72 for delaying the low-frequency signal SLF by half the delay time of the first delay circuit 71 (i.e., by T/2) and inputting the delayed signal to the phase comparator 57c is provided.

(3) The phase comparator 57c senses the direction of a shift in the bias point of the optical modulator by comparing the phase of the low-frequency signal output by the delay circuit 72, whose delay is T/2, and the phase of the low-frequency signal component in the optical signal.

Figure 24:
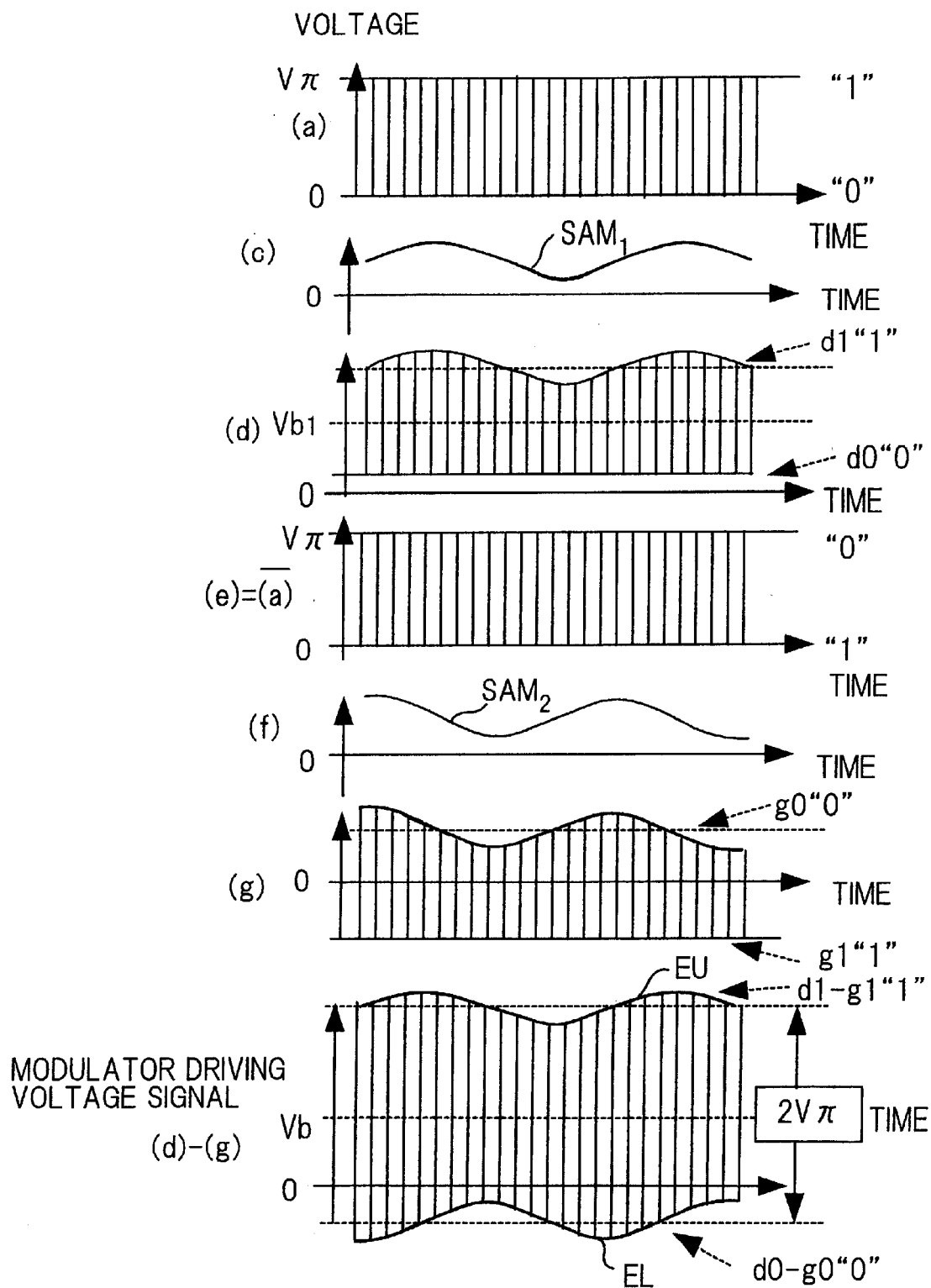
FIG. 24 is a waveform diagram of signals associated with FIG. 23.

When the amplitude modulating signal $SAM_1$, which is obtained by inverting the low-frequency signal SLF, is input to the gain control terminal of the drive circuit 61, the gain of the drive circuit changes. As a result, the drive circuit 61 outputs a drive signal of the kind indicated at (c) in FIG. 24. When the amplitude modulating signal $SAM_2$, which is obtained by delaying the phase of the low-frequency signal SLF by T, is input to the gain control terminal of the drive circuit 62, the gain of the drive circuit 62 changes and the drive circuit 62 outputs a drive signal of the kind indicated at (g) in FIG. 24. As a result, the modulator driving voltage signal applied to the optical modulator 52 becomes a potential difference [indicated at (d)–(g) in FIG. 24] that is applied between the signal electrodes 52c, 52d. This is the same as the waveform of the first embodiment shown in FIG. 6. Accordingly, from this point onward the operating point is controlled in such a manner that the low-frequency signal component of frequency $f_0$ contained in the optical signal output by the optical modulator 52 will become zero.

For example, if the bias point of the optical modulator 52 drifts, a low-frequency signal component delayed by T/2, which is a phase delay that conforms to the direction of the shift, appears in the optical signal. This makes it possible to sense the direction of the shift in the bias point of the optical modulator by comparing the phase of the low-frequency signal, which enters via the delay circuit 72 that applies the delay T/2, and the phase of the low-frequency signal contained in the optical signal.

(g) Seventh embodiment

Figure 25:
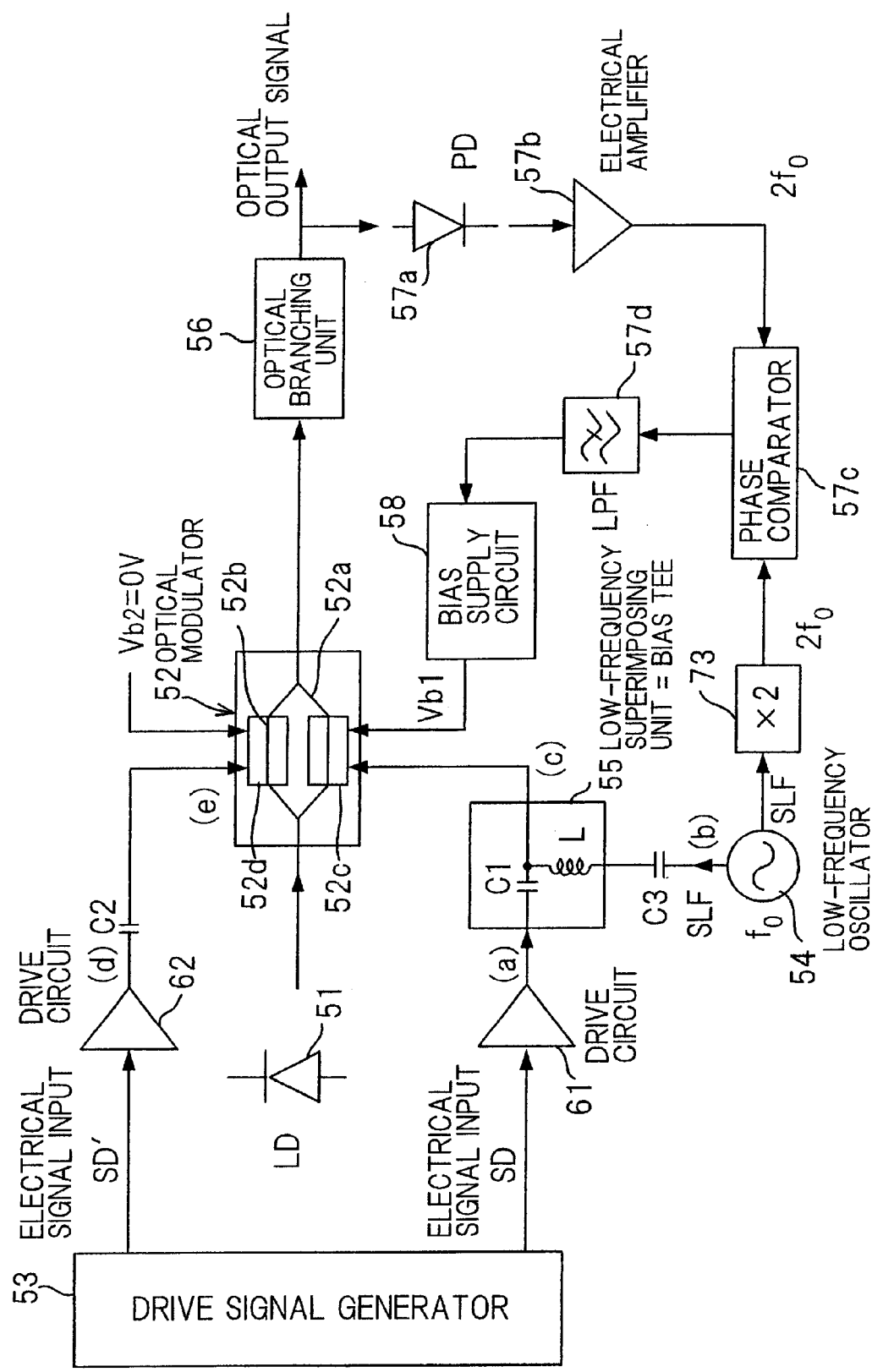
FIG. 25 is a diagram showing the construction of an optical modulation apparatus according to a seventh embodiment.

FIG. 25 is a diagram showing the construction of an optical modulation apparatus according to a seventh embodiment. Components identical with those of the first embodiment shown in FIG. 7 are designated by like reference characters. The associated signal waveforms are identical with those of the first embodiment shown in FIG. 8.

In the first embodiment, a frequency component identical with the frequency $f_0$ generated by the low-frequency oscillator 54 is detected from the optical signal to control the operating point. However, as will be understood from FIGS. 2 to 6, when the operating point of the optical modulator is at the optimum value, a low-frequency signal component whose frequency is twice the frequency $f_0$ (i.e., $2 \cdot f_0$) appears in the optical signal and this signal component takes on a maximum value. According to the seventh embodiment, therefore, the low-frequency signal component of frequency $2 \cdot f_0$ contained in the optical signal is detected and the operating point is controlled so as to maximize this signal component.

As shown in FIG. 25, the arrangement of the first embodiment is additionally provided with a frequency multiplier 73 for doubling the frequency $f_0$ of the low-frequency signal SLF output by the low-frequency oscillator 54. The low-frequency signal of frequency $2 \cdot f_0$ output by the frequency multiplier 73 and the electrical signal conforming to the optical signal output by the optical modulator are input to the phase comparator 57c, which proceeds to detect the low-frequency of frequency $2 \cdot f_0$ in the optical signal by phase comparison. The bias supply circuit 58 controls the bias voltage, which is applied to the signal electrode 52c of the optical modulator, so as to maximize the low-frequency signal component.

(h) Eighth embodiment

According to the foregoing embodiments, the modulation apparatus generates the two mutually complimentary drive signals (push-pull drive signals) SD, SD' each having the amplitude $V\pi$ between the light-emission culmination A and the neighboring light-extinction culmination B of the voltage-optical output characteristic of the optical modulator 52, and inputs these drive signals to the respective signal electrodes of the optical modulator, which is of the type driven on both sides thereof, whereby a modulator driving voltage signal of $2 \cdot V\pi$ is applied to the optical modulator. However, if the objective is to eliminate chirping of the optical modulated signal by push-pull modulation and reduce transmission waveform degradation, it is not always necessary to apply a modulator driving voltage signal of $2 \cdot V\pi$ to the optical modulator. According to an eighth embodiment, therefore, two complimentary drive signals SP, SP' each of amplitude $V\pi/2$ are generated and the signals SP, SP' are input to the respective signal electrodes of the optical modulator, which is of the type driven on both sides thereof, whereby a modulator driving voltage signal of Vπ is applied to the optical modulator to generate an NRZ optical signal or an RZ optical signal.

Figure 26:
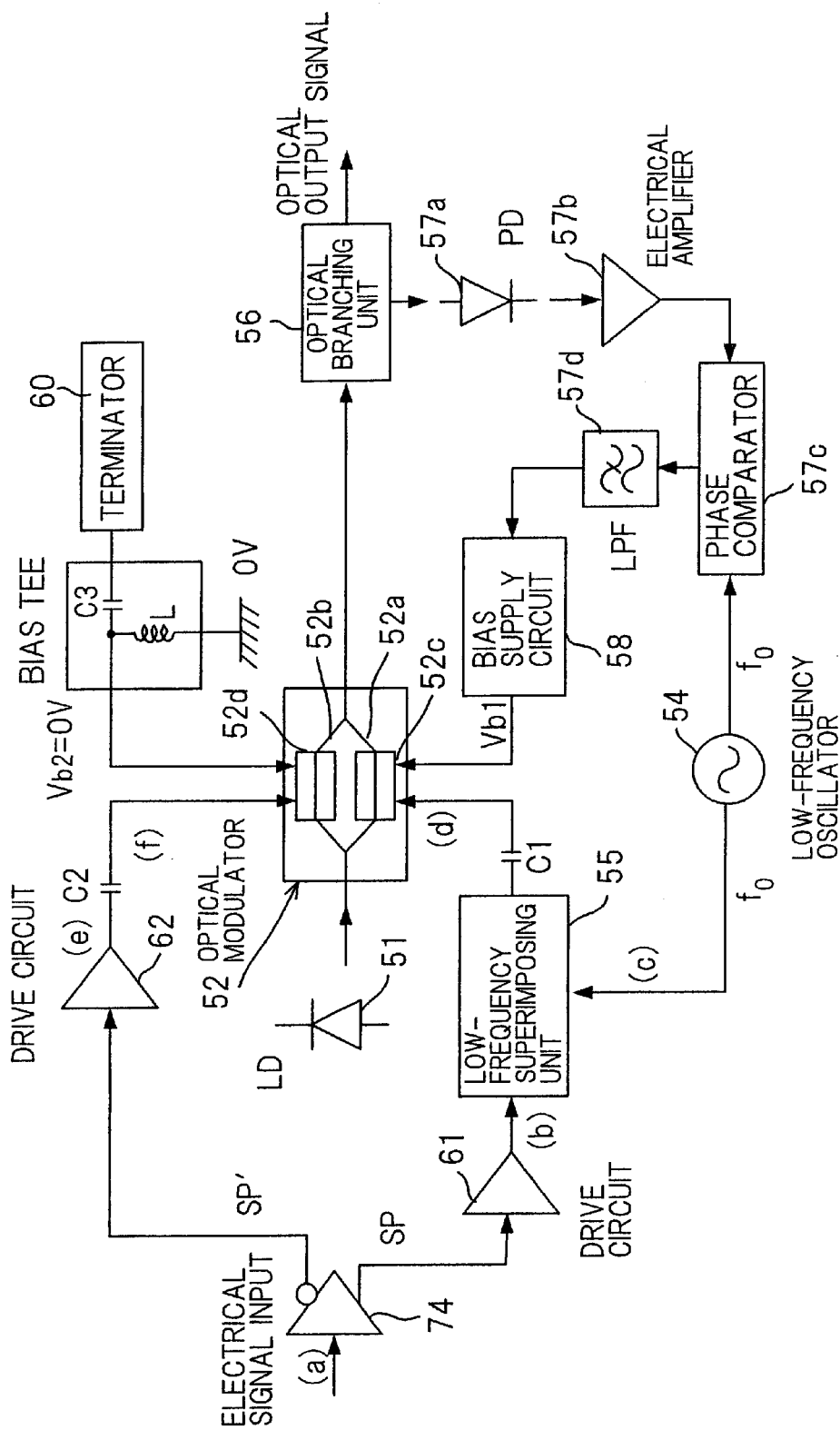
FIG. 26 is a diagram showing the construction of an optical modulation apparatus according to an eighth embodiment.
Figure 27:
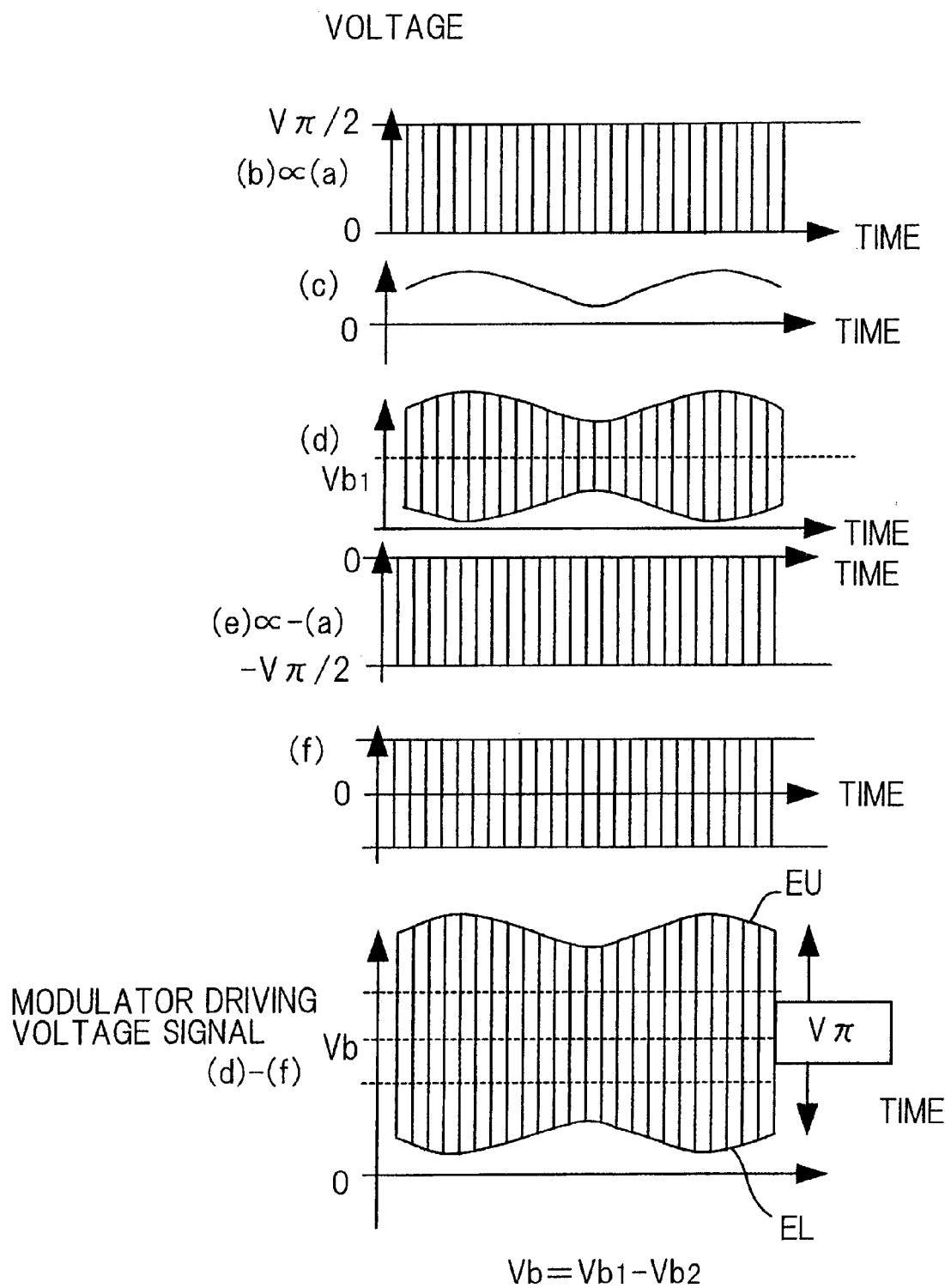
FIG. 27 is a waveform diagram of signals associated with FIG. 26.

FIG. 26 is a diagram showing the construction of an optical modulation apparatus according to an eighth embodiment, and FIG. 27 is a waveform diagram of the associated signal waveforms. Components identical with those of the first embodiment shown in FIG. 7 are designated by like reference characters. The eighth embodiment of FIG. 26 differs from the first embodiment of FIG. 7 in the following respects:

(1) A push-pull drive signal generator 74 for generating two complimentary drive signals SP, SP' each of amplitude Vπ/2 is provided.

(2) The low-frequency superimposing unit 55 superimposes the low-frequency signal of frequency $f_0$ upon the drive signal SP in such a manner that the phases of the envelopes EU, EL on the ON and OFF sides, respectively, of the modulator driving voltage signal will be displaced from each other by 180° [see (c) of FIG. 27].

(3) The amplitude of the modulator driving voltage signal is made Vπ and the phases of the envelopes EU, EL on the ON and OFF sides, respectively, of the modulator driving voltage signal are displaced from each other by 180° [see (d)–(f) of FIG. 27].

The center of the output signal from the low-frequency superimposing unit 55 and the center of the output signal from the drive circuit 62 are made to coincide with the bias voltages Vb1 and Vb2 (=0V), respectively, of the signal electrodes 52c, 52d, respectively. These output signal waveforms, therefore, are as shown at (d) and (f) of FIG. 27. As a result, the modulator driving voltage signal applied to the optical modulator 52 has the amplitude Vπ [indicated by (d)–(f) in FIG. 27], which corresponds to the potential difference across both electrodes, as well as the envelopes EU, EL, on the ON and OFF sides, modulated by the low frequency $f_0$ and at the 180° phase difference.

If the operating point of the optical modulator 52 drifts from the optimum value, a low-frequency signal component having a phase conforming to the direction of drift is produced in the optical signal output by the optical modulator 52. From this point onward, therefore, the bias voltage Vb1 of the optical modulator is controlled in a direction that will cancel out this low-frequency component.

Thus, in accordance with the eighth embodiment, chirping of the optical modulated signal is made zero by push-pull modulation, degradation of a transmission waveform can be reduced and drift of the operating point can be compensated for by control of bias voltage.

According to the eighth embodiment, the operating point is controlled upon detecting, from the optical signal, a frequency component identical with the frequency $f_0$ generated by the low-frequency oscillator 54. However, it is also possible to adopt an arrangement similar to that of the seventh embodiment (see FIG. 25), in which the low-frequency signal component of frequency $2 \cdot f_0$ contained in the optical signal is detected and the operating point is controlled in such a manner that this signal component takes on the maximum value.

Further, as described above, the low-frequency signal of frequency $f_0$ is superimposed upon the drive signal SP in such a manner that the phases of the envelopes EU, EL on the ON and OFF sides, respectively, of the modulator driving voltage signal will be displaced from each other by 180°. However, it is also possible to adopt the following arrangements:

(1) a low-frequency signal is superimposed upon the drive signal SP or SP' in such a manner that only one envelope of the envelopes EU, EL on the ON and OFF sides, respectively, of the modulator driving voltage signal will vary, or (2) a low-frequency signal is superimposed upon the drive signals SP or SP' in such a manner that the amplitudes of the envelopes EU, EL on the ON and OFF sides, respectively, of the modulator driving voltage signal will differ, or (3) a low-frequency signal is superimposed upon the drive signals SP or SP' in such a manner that the frequencies of the envelopes EU, EL on the ON and OFF sides, respectively, of the modulator driving voltage signal will differ, or (4) a low-frequency signal is superimposed upon the drive signals SP or SP' in such a manner that the phases of the envelopes EU, EL on the ON and OFF sides, respectively, of the modulator driving voltage signal will differ, and the operating point is controlled upon detecting a frequency component, which is identical with the frequency $f_0$, from the optical signal. When the operating point is controlled by any of these methods, the arrangements of the second through sixth embodiments can be applied.

(i) Ninth embodiment

The periodicity of the voltage-optical output characteristic of the optical modulator is such that 2·Vπ is equal to one period of voltage. Accordingly, the optical modulation apparatus can be provided with a function for changing over the range of drive in terms of the voltage-optical output characteristic of the optical modulator.

Figure 28A:
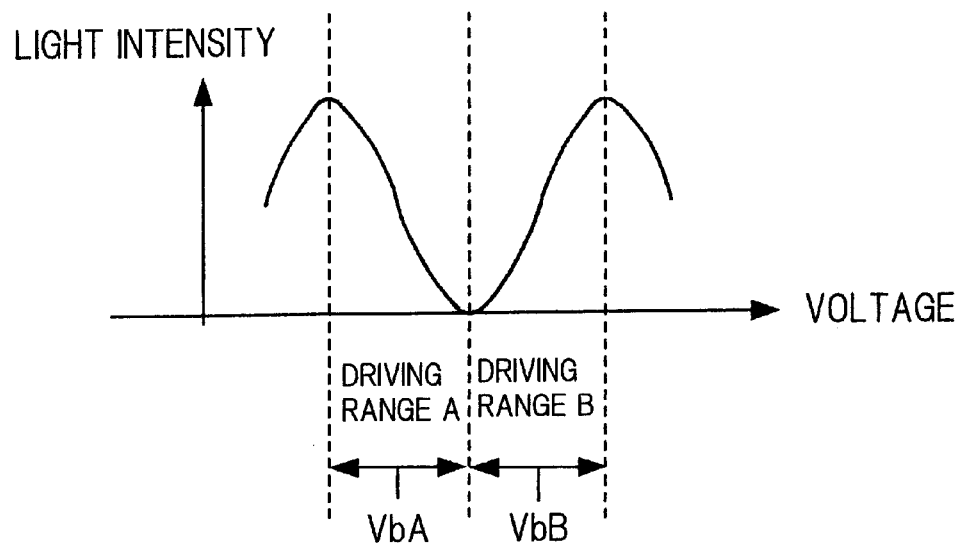
FIGS. 28A and 28B are diagrams useful in describing switching of a bias point of a modulator.

For example, in a case where modulation is carried out by a driving amplitude of Vπ in NRZ modulation, the optical modulator is provided with a function for shifting the bias voltage by Vπ between VbA and VbB, as shown in FIG. 28A, and the range of drive voltages is made to change from A to B by this shifting of the bias voltage. This shifting of the operating point can be applied directly to the optical modulation apparatus (see FIG. 26) of the eighth embodiment, which generates the NRZ, RZ signals using the optical modulator that is driven on both sides.

Figure 28B:
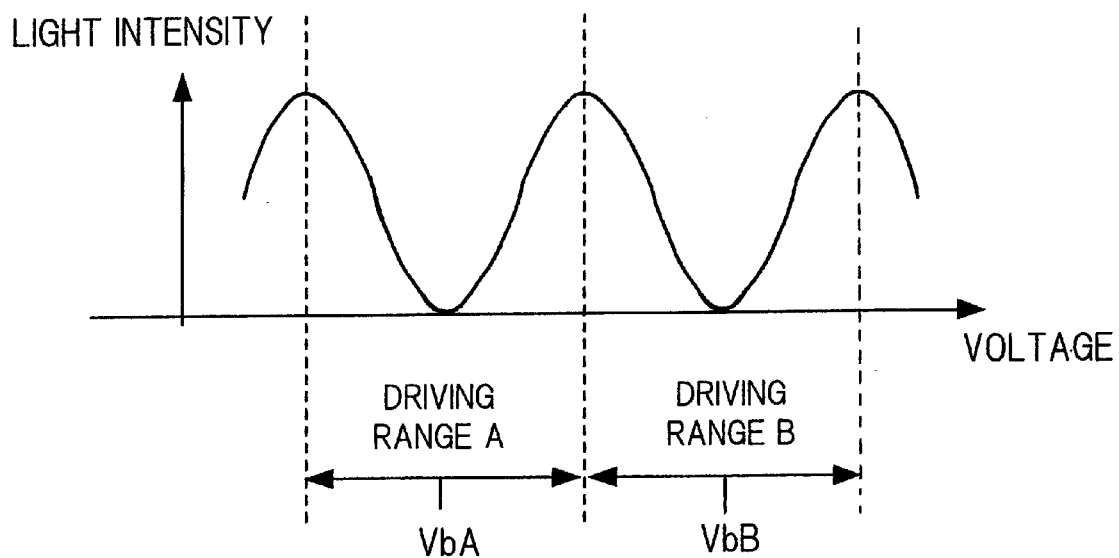

Further, in a case where modulation, such as optical duobinary modulation, is performed by a driving amplitude of 2·Vπ, the optical modulation apparatus is provided with a function for shifting the bias voltage by 2·Vπ between VbA and VbB, as shown in FIG. 28B, and the range of drive voltages is made to change from A to B by this shifting of the bias voltage.

The above-described changeover of the operating point can be applied to a case where chirping is set to a direction advantageous for transmission and to a case where it is necessary to select a range in which the voltage-optical output characteristic has the proper shape. The changeover can be realized by intentionally shifting the bias voltage by a fixed amount in response to an externally applied changeover signal.

Figure 29:
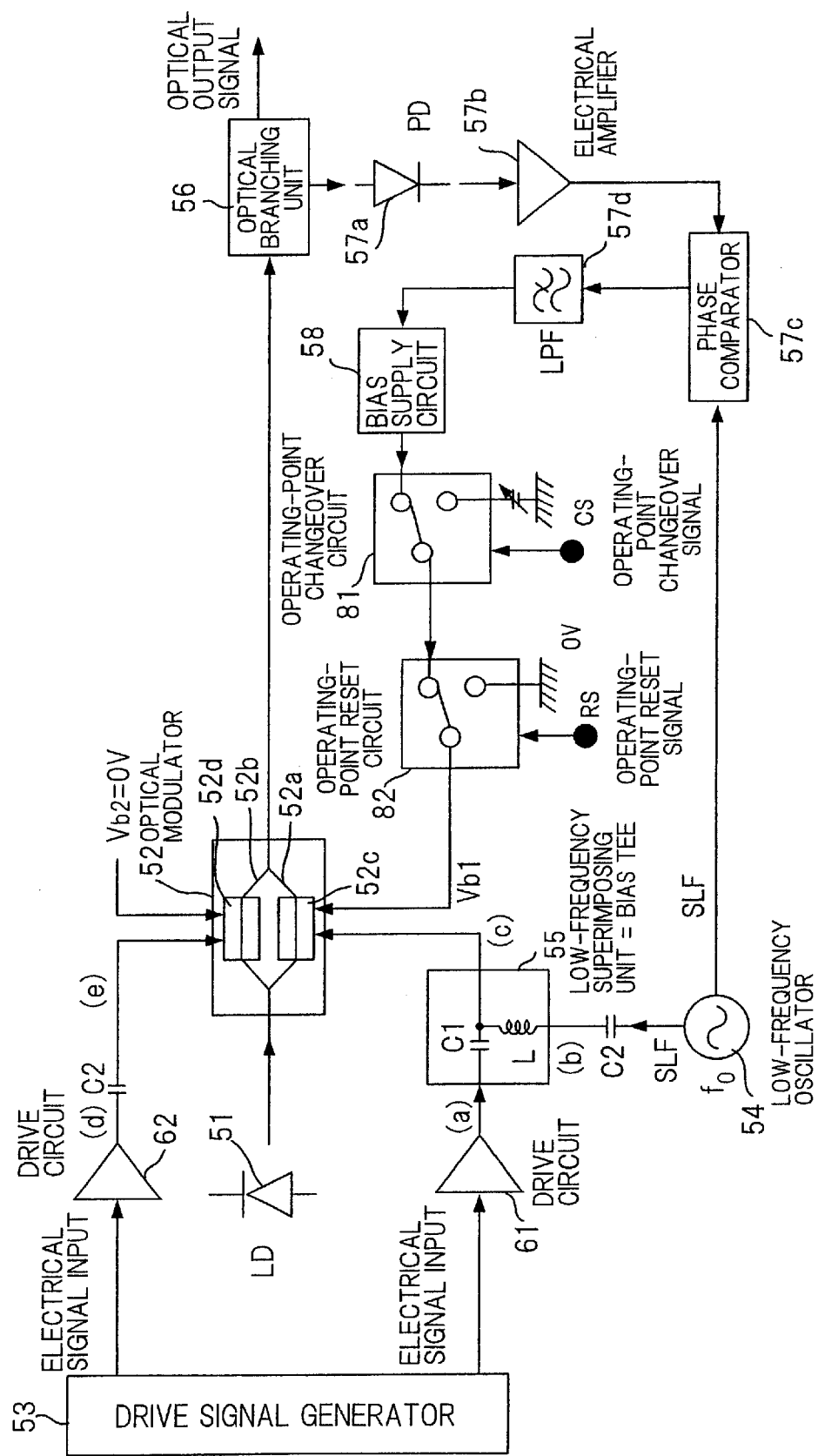
FIG. 29 is a diagram showing the construction of an optical modulation apparatus according to a ninth embodiment.

FIG. 29 is a diagram showing the construction of an optical modulation apparatus according to a ninth embodiment having an operating-point shifting function. Components identical with those of the first embodiment shown in FIG. 7 are designated by like reference characters.

An operating-point changeover circuit 81 shifts the bias voltage by a fixed amount of voltage in response to an externally applied changeover signal CS, thereby changing over the range of drive of the voltage-optical output characteristic.

An operating-point reset circuit 82 forcibly resets the bias point to zero in response to an operating-point reset signal RS. It is necessary to reset the bias point (1) when the system is initially put into operation and (2) when bias-point drift becomes so large during system operation that the bias voltage of the modulator, which is controlled to achieve stability, exceeds an allowable range. In such cases the operating-point reset circuit 82 forcibly resets the bias point to zero by the operating-point reset signal RS, which enters from the outside.

As shown in FIG. 29, the operating-point changeover circuit 81 is constituted by a fixed-voltage power supply (although a variable-voltage power supply is possible) and a switching arrangement for switching the bias supply line, and the operating-point reset circuit 82 is constituted by a point of ground potential (GND) and a switching arrangement for switching the bias supply line. However, other methods are acceptable as long as the same operating-point changeover function and operating-point reset function can be implemented. Further, the operating-point changeover signal CS or operating-point reset signal RS is entered as necessary and the changeover of the operating point by the operating-point changeover circuit or reset of the operating point by the operating-point reset circuit is performed in accordance with the entered signal.

It should be noted that the components of FIG. 29 for shifting the operating point and for resetting the operating point can be applied to the eighth embodiment of FIG. 26 as is.

(j) Position of photodetector

Figure 30A:
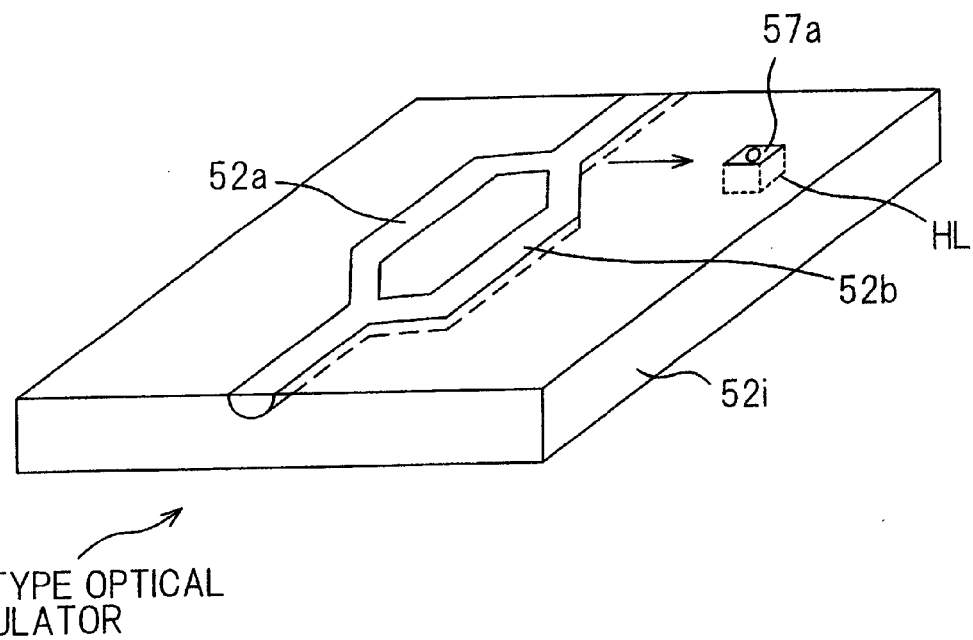
FIGS. 30A and 30B are diagrams useful in describing a case where a light receiver is incorporated in a substrate.

In each of the foregoing embodiments, the optical modulator is externally provided with the optical branching unit 56 and photodiode 57a. However, the same function can be achieved by incorporating a photodiode 57a in the LiNbO$_3$ substrate 52 of the optical modulator 52 and detecting the light intensity of the light emission produced within the optical modulator, as shown in FIG. 30A. (See ECOC'97 vol. 2, pp. 167–170, Y. Kubota et al., "10 Gb/s Ti; LiNbO3 Mach-Zehnder modulator with Built-in Monitor Photodiode Chip".)

Figure 30B:
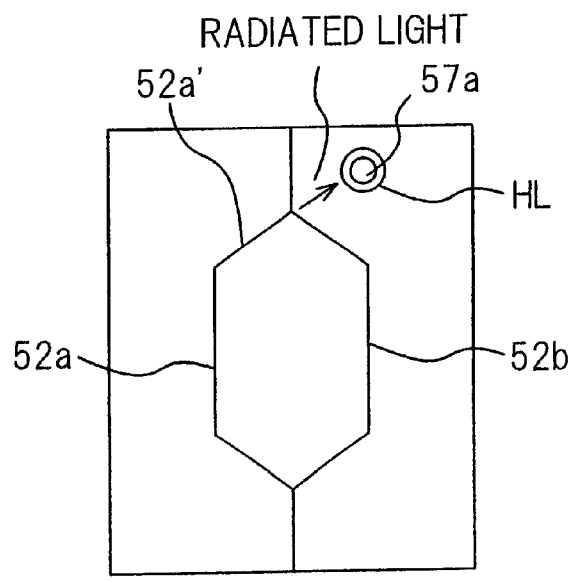
Figure 32A:
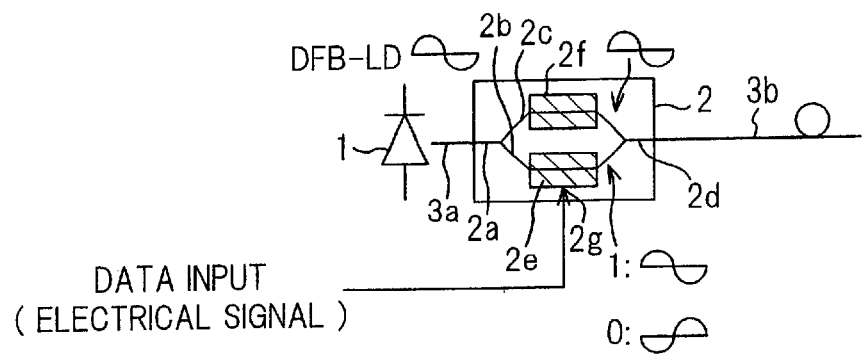
FIGS. 32A and 32B are diagrams for describing a Mach-Zehnder optical modulator.
Figure 32B:
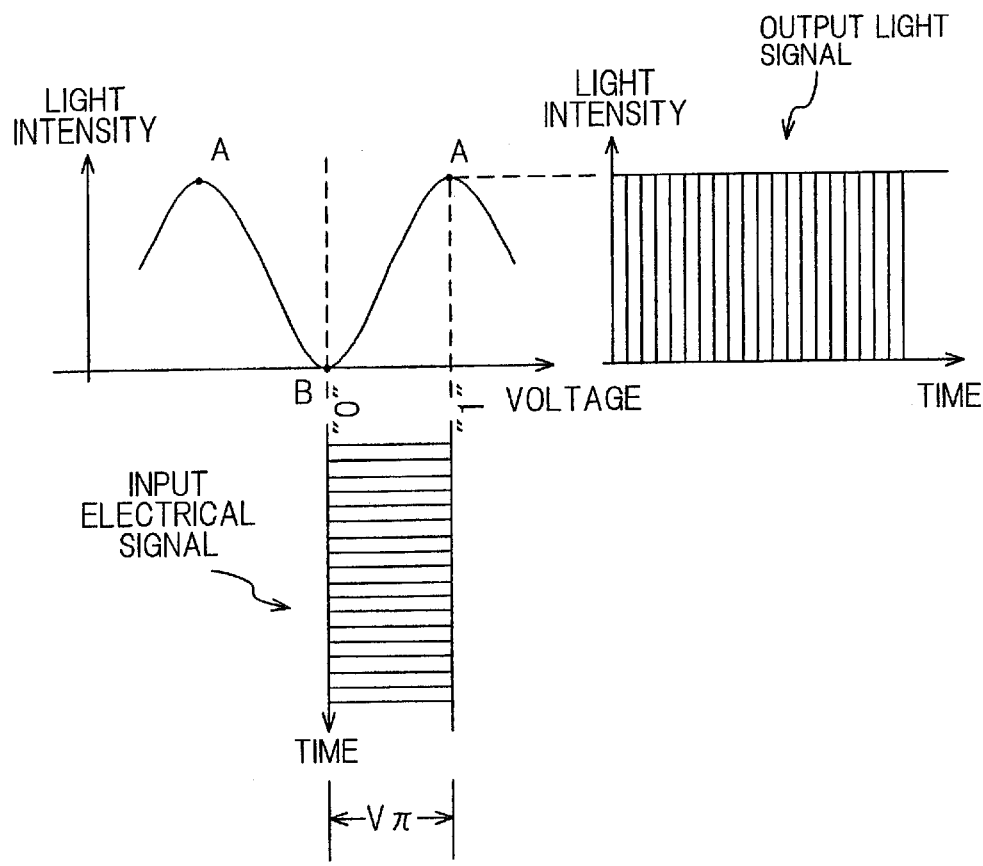
Figure 33:
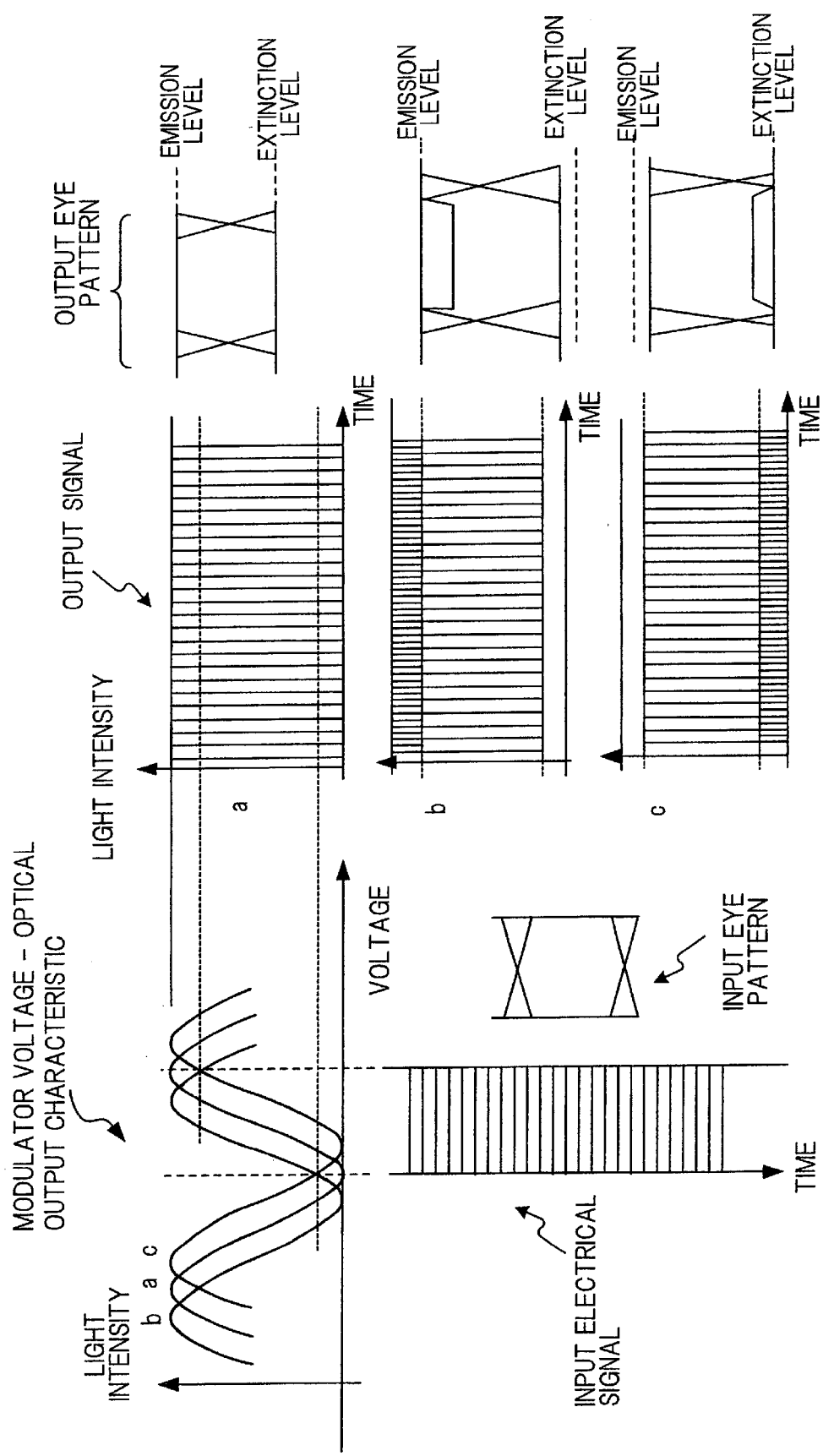
FIG. 33 is a diagram useful in describing the problems caused by drift of the operating point of an optical modulator.
Figure 34:
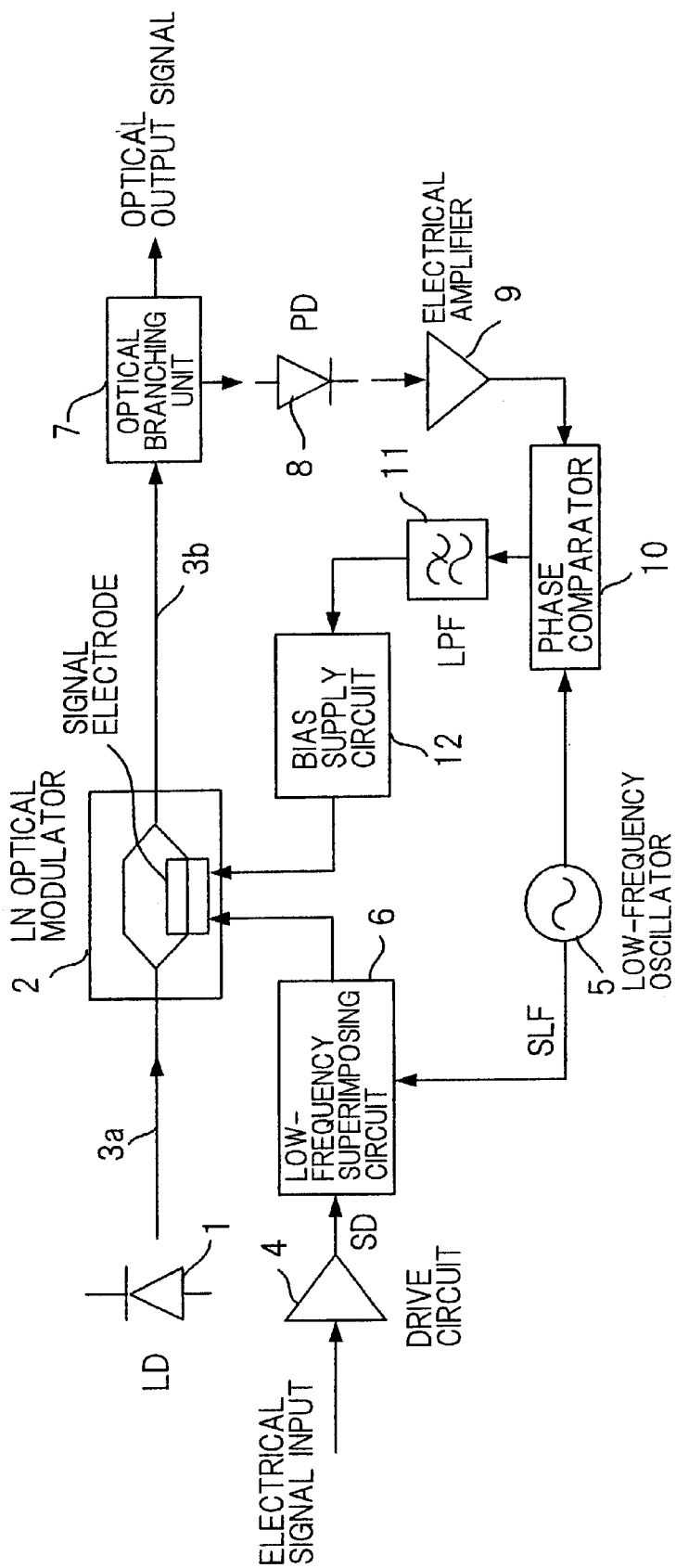
FIG. 34 is a diagram showing the construction of a circuit for stabilizing the operating point of an optical modulator in NRZ modulation.
Figure 35:
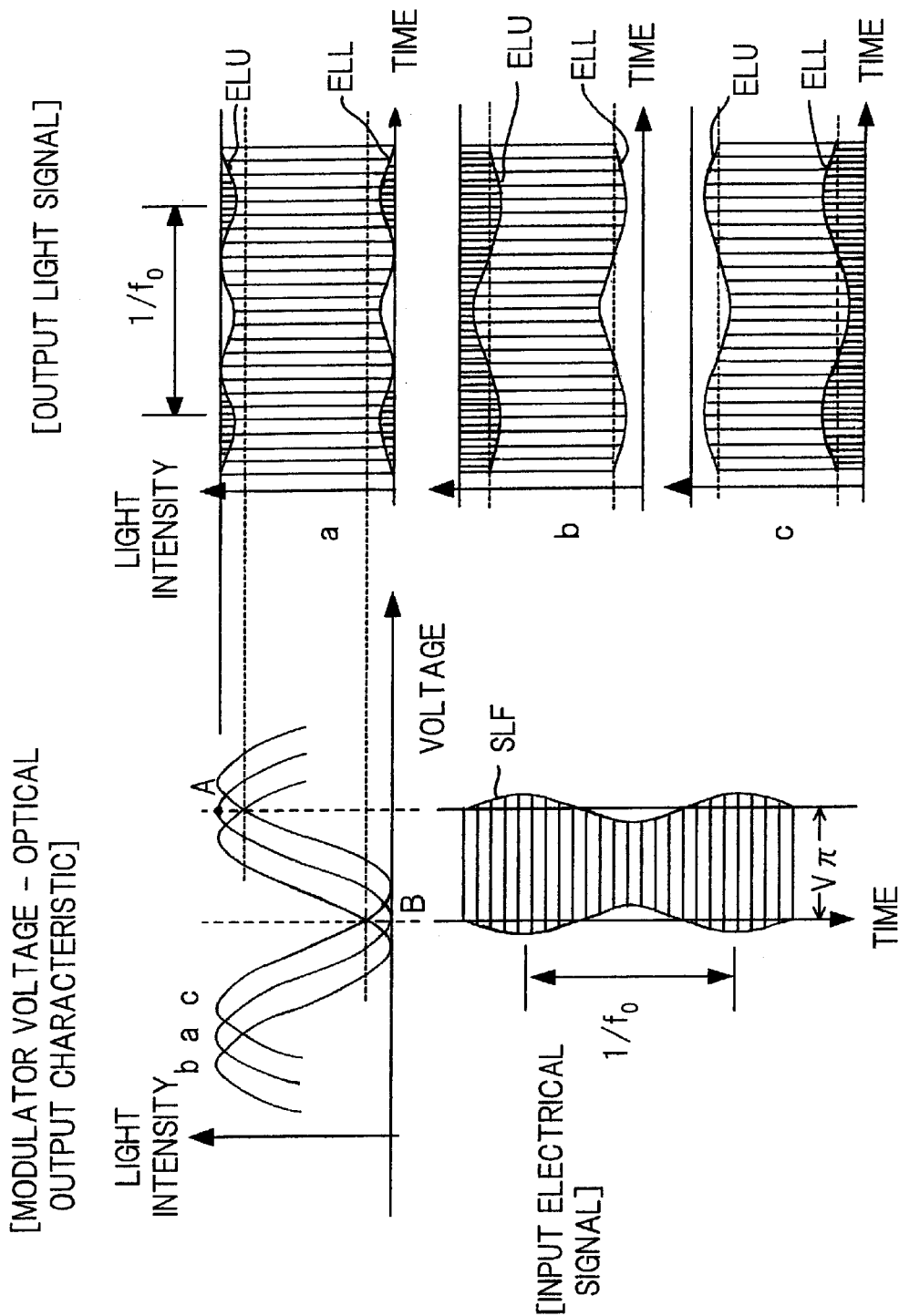
FIG. 35 is a diagram showing the principle underlying the circuit for stabilizing the operating point of an optical modulator in NRZ modulation.

Specifically, at extinction of the MZ-type optical modulator 52, light energy is not actually extinguished even though light waves, displaced in phase by 180°, that propagate through branched optical waveguides 52a, 52b are combined. Rather, a combining of modes takes place owing to the width of the optical waveguides, and radiated light ascribable to surplus modes radiates to the exterior of the optical waveguides from interference points. If viewed from directly above the substrate, the radiated light radiates along an extension line of a branched optical waveguide 52a', as shown in FIG. 30B. Accordingly, a hole HL is cut into the substrate at a prescribed position along the extension line, the photodiode 57a is imbedded within the hole HL and is electrically wired. If this arrangement is adopted, an optical branching unit and external photodiode can be dispensed with, thereby making it possible to simplify structure.

(k) Arrangement for dealing with input light of any polarization

If the fiber routing between the light source and optical modulator is of great length or the arrangement is not one in which polarization is fixed, then it is necessary to adopt an arrangement in which the optical modulator modulates light of any polarization. FIG. 31 shows an example of the construction of an MZ-type optical modulator capable of dealing with such a situation. Shown in FIG. 31 are two branched optical waveguides 52a, 52b within the optical modulator, electrodes 52c, 52d to which electrical signals for modulating the optical signals in the respective optical waveguides are input, and half-wave plates 91, 92 inserted in the middles of the respective optical waveguides. The half-wave plates are obtained by cutting holes into the substrate at the optical waveguides and filling the holes with a material exhibiting birefringence. The width of the half-wave plates is decided in such a manner that the optical path difference between the polarization modes caused by birefringence will be half the signal wavelength.

The efficiency of phase modulation in the optical waveguides of the optical modulator is better in the TM mode than in the TE mode. If light of any polarization having mixed TE-mode and TM-mode components enters the modulator, the TM-mode components undergo phase modulation along the first half of the optical waveguides 52a, 52b (in front of the half-wave plates), after which they are converted to TE-mode components by the half-wave plates 91, 92. The TE-mode components then undergo phase modulation along the second half of the optical waveguides (in back of the half-wave plates). Conversely, the TE-mode components do not undergo phase modulation in front of the half-wave plates, are converted to TM-mode components by the half-wave plates 91, 92 and then are phase modulated in the second half of the optical waveguides.

Accordingly, by giving consideration to design, such as the electrode length for obtaining the amount of phase modulation necessary in the first and second halves of the optical waveguides, modulation can be performed even in cases where light of any polarization impinges upon the modulator.

Thus, in accordance with the present invention as described above, when an optical modulator is driven by an electrical drive signal, which has an amplitude of 2·Vπ between two light-emission culminations or two light extinction culminations of a voltage-optical output characteristic, a low-frequency signal component can be detected reliably from the optical signal output of the optical modulator by way of a simple arrangement, and fluctuation of the voltage-optical output characteristic of the optical modulator, namely drift of the operating point, can be compensated for using this low-frequency component. By applying the operating-point control method of the present invention to optical duobinary modulation, the effects of waveform dispersion can be reduced. Moreover, push-pull drive makes it possible to reduce chirping.

In accordance with the present invention, when an optical modulator is driven by a driving signal having an amplitude between a light-emission culmination and a neighboring light-extinction culmination of a voltage-optical output characteristic, two complimentary drive signals each having an amplitude of Vπ/2 are generated and the optical modulator is subjected to push-pull drive by these drive signals. As a result, chirping can be reduced. Moreover, low-frequency signal components can be detected reliably from the optical signal output by the optical modulator, and it is possible to compensate for drift of the operating point.

In accordance with the present invention, a range used in modulation can be shifted in the voltage-optical output characteristic of an optical modulator. As a result, chirping can be set to a direction advantageous for transmission, or a range having the proper shape can be selected from the shape of the voltage-optical output characteristic, and the modulator can be driven using this range.

In accordance with the present invention, an operating point on the voltage-optical output characteristic of an optical modulator can be set to a prescribed initial point. Accordingly, in the event that bias-point drift becomes so large at the start of system operation or during system operation that the bias voltage exceeds an allowable range, the bias point can be forcibly reset to zero and the system restarted.

In accordance with the present invention, an arrangement is adopted in which a photodiode is imbedded in the substrate of an optical modulator, light leaking from an optical waveguide is detected and low-frequency components are extracted from the detected light. This makes it possible to dispense with an optical branching unit, thereby simplifying overall structure.

In accordance with the present invention, a half-wave plate is inserted in the middle of a branched optical waveguide on each side of the modulator. This makes it possible to modulate light of any polarization.

In accordance with the present invention, control is performed so as to maximize a signal component of frequency $2 \cdot f_0$ contained in the output of a photodetector, thereby making it possible to compensate for operating-point drift that accompanies fluctuation of the voltage-optical output characteristic of the optical modulator.

The present invention is such that when an optical modulator configured to be driven on both its sides is used in optical duobinary modulation, NRZ modulation or RZ modulation, a low-frequency signal component can be detected reliably from the optical signal output of the optical modulator by way of a simple arrangement, and it is possible to compensate for operating-point drift that accompanies fluctuation of the voltage-optical output characteristic of the optical modulator.

As many apparently widely different embodiments of the present invention can be made without departing from the spirit and scope thereof, it is to be understood that the invention is not limited to the specific embodiments thereof except as defined in the appended claims.

What is claimed is:

1. An optical modulation apparatus including an optical modulator having a voltage-optical output characteristics in which optical output varies periodically with respect to a voltage value of an electrical drive signal, and a drive signal generator for generating an electrical device signal which drives the optical modulator by an amplitude between two light emission culminations or two light extinction culminations of the voltage-optical output characteristic, said apparatus comprising:
    a low-frequency oscillator generating a prescribed low-frequency signal;
    a low-frequency superimposing unit superimposing the prescribed low-frequency signal on the drive signal by varying a center level of the drive signal by said low-frequency signal;
    a low-frequency signal detection unit detecting operating-point drift of the optical modulator based upon the low-frequency signal component contained in an optical signal output from said optical modulator; and
    an operating-point control unit controlling the operating point of the optical modulator in dependence upon the drift of the operating point of the optical modulator.

2. An optical modulation apparatus including an optical modulator having a voltage-optical characteristic in which optical output varies periodically with respect to a voltage value of an electrical drive signal, and a drive signal generator for generating an electrical drive signal which drives the optical modulator by an amplitude between two light emission culminations or two light extinction culminations of the voltage-optical output characteristic, said apparatus comprising:
    a low-frequency oscillator generating a prescribed low-frequency signal;
    a low-frequency superimposing unit superimposing the prescribed low-frequency signal on the drive signal in such a manner that phases of upper and lower envelopes of said drive signal coincide;
    a low-frequency signal detection unit detecting operating-point drift of the optical modulator based upon the low-frequency signal component contained in an optical signal output from said optical modulator; and
    an operating-point control unit controlling the operating point of the optical modulator in dependence upon the drift of the operating point of the optical modulator.

3. An optical modulation apparatus including an optical modulator having a voltage-optical output characteristic in which optical output varies periodically with respect to a voltage value of an electrical drive signal, and a drive signal generator for generating an electrical drive signal which drives the optical modulator by an amplitude between two light emission culminations or two light extinction culminations of the voltage-optical output characteristic, said apparatus comprising:
    a low-frequency oscillator generating a prescribed low-frequency signal;
    a low-frequency superimposing unit superimposing the prescribed low-frequency signal on the drive signal in such a manner that only an upper or lower envelope of said drive signal varies;
    a low-frequency signal detection unit detecting operating-point drift of the optical modulator based upon the low-frequency signal component contained in an optical signal output from said optical modulator; and
    an operating-point control unit controlling the operating point of the optical modulator in dependence upon the drift of the operating point of the optical modulator.

4. An optical modulation apparatus including an optical modulator having a voltage-optical output characteristics in which optical output varies periodically with respect to a voltage value of an electrical drive signal, and a drive signal generator for generating an electrical drive signal which drives the optical modulator by an amplitude between two light emission culminations or two light extinction culminations of the voltage-optical output characteristic, said apparatus comprising:
    a low-frequency oscillator generating a prescribed low-frequency signal;
    a low-frequency superimposing unit superimposing the prescribed low-frequency signal on the drive signal in such a manner that amplitudes of upper and lower envelopes of said drive signal differ;
    a low-frequency signal detection unit detecting operating-point drift of the optical modulator based upon the low-frequency signal component contained in an optical signal output from said optical modulator; and
    an operating-point control unit controlling the operating point of the optical modulator in dependence upon the drift of the operating point of the optical modulator.

5. An optical modulation apparatus including an optical modulator having a voltage-optical output characteristic in which optical output varies periodically with respect to a voltage value of an electrical drive signal, and a drive signal generator for generating an electrical drive signal which drives the optical modulator by an amplitude between two light emission culminations or two light extinction culminations of the voltage-optical output characteristic, said apparatus comprising:
    a low-frequency oscillator generating a prescribed low-frequency signal;
    a low-frequency superimposing unit superimposing the prescribed low-frequency signal on the drive signal in such a manner that frequencies of upper and lower envelopes of said drive signal differ;

a low-frequency signal detection unit detecting operating-point drift of the optical modulator based upon the low-frequency signal component contained in an optical signal output from said optical modulator; and an operating-point control unit controlling the operating point of the optical modulator in dependence upon the drift of the operating point of the optical modulator.

6. An optical modulation apparatus including an optical modulator having a voltage-optical output characteristic in which optimal output varies periodically with respect to a voltage value of an electrical drive signal, and a drive signal generator for generating an electrical drive signal which drives the optical modulator by an amplitude between two light emission culminations or two light extinction culminations of the voltage-optical output characteristic, said apparatus comprising:

a low-frequency oscillator generating a prescribed low-frequency signal;

a low-frequency superimposing unit superimposing the prescribed low-frequency signal on the drive signal in such a manner that phases of upper and lower envelopes of said drive signal differ;

a low-frequency signal detection unit detecting operating-point drift of the optical modulator based upon the low-frequency signal component contained in an optical signal output from said optical modulator; and an operating-point control unit controlling the operating point of the optical modulator in dependence upon the drift of the operating point of the optical modulator.

7. An optical modulation apparatus including an optical modulator having optical waveguides that branch on a light input side and merge on a light output side, two signal electrodes for applying phase modulation to optical signals in the branched optical waveguides on both sides and two drive-signal input terminals for inputting complimentary drive signals to respective ones of said signal electrodes, and possessing a voltage-optical output characteristic in which optical output varies periodically with respect to a voltage value of an electrical drive signal; and a drive signal generator for generating complimentary drive signals having an amplitude between a light-emission culmination and a neighbouring light-extinction culmination of the voltage-optical output characteristic of said optical modulator, said apparatus comprising:

a low-frequency-oscillator for generating a prescribed low-frequency signal;

a low-frequency superimposing unit superimposing the prescribed low-frequency signal on the drive signal in such a manner that phases of upper and lower envelopes of said drive signal coincide;

a low-frequency signal detection unit detecting operating-point drift of the optical modulator based upon the low-frequency signal component contained in an optical signal output from said optical modulator; and an operating-point control unit controlling the operating point of the optical modulator in dependence upon the drift of the operating point of the optical modulator.

8. An optical modulation apparatus including an optical modulator having optical waveguides that branch on a light input side and merge on a light output side, two signal electrodes for applying phase modulation to optical signals in the branched optical waveguides on both sides and two drive-signal input terminals for inputting complimentary drive signals to respective ones of said signal electrodes, and possessing a voltage-optical output characteristic in which optical output varies periodically with respect to a voltage value of an electrical drive signal; and a drive signal generator for generating complimentary drive signals having an amplitude between a light-emission culmination and a neighbouring light-extinction culmination of the voltage-optical output characteristic of said optical modulator, said apparatus comprising:

a low-frequency-oscillator for generating a prescribed low-frequency signal;

a low-frequency superimposing unit superimposing the prescribed low-frequency signal on the drive signal in such a manner that only an upper or lower envelope of said drive signal varies;

a low-frequency signal detection unit detecting operating-point drift of the optical modulator based upon the low-frequency signal component contained in an optical signal output from said optical modulator; and an operating-point control unit controlling the operating point of the optical modulator in dependence upon the drift of the operating point of the optical modulator.

9. An optical modulation apparatus including an optical modulator having optical waveguides that branch on a light input side and merge on a light output side, two signal electrodes for applying phase modulation to optical signals in the branched optical waveguides on both sides and two drive-signal input terminals for inputting complimentary drive signals to respective ones of said signal electrodes, and possessing a voltage-optical output characteristic in which optical output varies periodically with respect to a voltage value of an electrical drive signal; and a drive signal generator for generating complimentary drive signals having an amplitude between a light-emission culmination and a neighbouring light-extinction culmination of the voltage-optical output characteristics of said optical modulator, said apparatus comprising:

a low-frequency-oscillator for generating a prescribed low-frequency signal;

a low-frequency superimposing unit superimposing the prescribed low-frequency signal on the drive signal in such a manner that amplitudes of upper and lower envelopes of said drive signal differ;

a low-frequency signal detection unit detecting operating-point drift of the optical modulator based upon the low-frequency signal component contained in an optical signal output from said optical modulator; and an operating-point control unit controlling the operating point of the optical modulator in dependence upon the drift of the operating point of the optical modulator.

10. An optical modulation apparatus including an optical modulator having optical waveguides that branch on a light input side and merge on a light output side, two signal electrodes for applying phase modulation to optical signals in the branched optical waveguides on both sides and two drive-signal input terminals for inputting complimentary drive signals to respective ones of said signal electrodes, and possessing a voltage-optical output characteristics in which optical output varies periodically with respect to a voltage value of an electrical drive signal; and a drive signal generator for generating complimentary drivesignals having an amplitude between a light-emission culmination and a neighbouring light-extinction culmination of the voltage-optical output characteristic of said optical modulator, said apparatus comprising:

a low-frequency-oscillator for generating a prescribed low-frequency signal;

a low-frequency superimposing unit superimposing the prescribed low-frequency signal on the drive signal in such a manner that frequencies of upper and lower envelopes of said drive signal differ;

a low-frequency signal detection unit detecting operating-point drift of the optical modulator based upon the low-frequency signal component contained in an optical signal output from said optical modulator; and an operating-point control unit controlling the operating point of the optical modulator in dependence upon the drift of the operating point of the optical modulator.

11. An optical modulation apparatus including an optical modulator having optical waveguides that branch on a light input side and merge on a light output side, two signal electrodes for applying phase modulation to optical signals in the branched optical waveguides on both sides and two drive-signal input terminals for inputting complimentary drive-signals to respective ones of said signal electrodes, and possessing a voltage-optical output characteristic in which optical output varies periodically with respect to a voltage value of an electrical drive signal; and a drive signal generator for generating complimentary drive signals having an amplitude between a light-emission culmination and a neighbouring light-extinction culmination of the voltage-optical output characteristic of said optical modulator, said apparatus comprising:

a low-frequency-oscillator for generating a prescribed low-frequency signal;

a low-frequency superimposing unit superimposing the prescribed low-frequency signal on the drive signal in such a manner that phases of upper and lower envelopes of said drive signal differ;

a low-frequency signal detection unit detecting operating-point drift of the optical modulator based upon the low-frequency signal component contained in an optical signal output from said optical modulator; and an operating-point control unit controlling the operating point of the optical modulator in dependence upon the drift of the operating point of the optical modulator.

12. A method of controlling an optical modulator, which has a voltage-optical output characteristic in which optical output varies periodically with respect to a voltage value of an electrical drive signal, by the electrical drive signal, which has an amplitude between two light-emission culminations or two light extinction culminations of the voltage-optical output characteristic, said method comprising:

superimposing a prescribed low-frequency signal on the drive signal in such a manner that phases of upper and lower envelopes of said drive signal coincide;

detecting operating-point drift of the optical modulator based upon the low-frequency signal component contained in an optical signal output from said optical modulator;

controlling the operating point of the optical modulator in dependence upon the drift of the operating point of the optical modulator;

using, as said optical modulator, an optical modulator which includes optical waveguides that branch on a light input side and merge on a light output side two signal electrodes for applying phase modulation to optical signals in the branched optical waveguides on both sides, and two drive signal input terminals for inputting complimentary drive-signals to respective ones of said signal electrodes; and generating two complimentary drive signals having an amplitude between a light-emission culmination and a neighbouring light-extinction culmination of the voltage-optical output characteristics of the optical modulator, and inputting the complimentary drive signals to respective ones of said signal electrodes.

13. A method of controlling an optical modulator, which as a voltage-optical output characteristic in which optical output varies periodically with respect to a voltage value of an electrical drive signal, by the electrical drive signal, which has an amplitude between two light-emission culminations or two light extinction culminations of the voltage-optical output characteristic, said method comprising:

superimposing a prescribed low-frequency signal on the drive signal in such a manner that only an upper or lower envelope of said drive signal varies;

detecting operating-point drift of the optical modulator based upon the low-frequency signal component contained in an optical signal output from said optical modulator;

controlling the operating point of the optical modulator in dependence upon the drift of the operating point of the optical modulator;

using, as said optical modulator, an optical modulator which includes optical waveguides that branch on a light input side and merge on a light output side two signal electrodes for applying phase modulation to optical signals in the branched optical waveguides on both sides, and two drive-signal input terminals for inputting complimentary drive signals to respective ones of said signal electrodes; and generating two complimentary drive signals having an amplitude between a light-emission culmination and a neighbouring light-extinction culmination of the voltage-optical output characteristic of the optical modulator, and inputting the complimentary drive signals to respective ones of said signal electrodes.

14. A method of controlling an optical modulator, which has a voltage-optical output characteristics in which optical output varies periodically with respect to a voltage value of an electrical drive signal, by the electrical drive signal, which has an amplitude between two light-emission culminations or two light extinction culminations of the voltage-optical output characteristics, said method comprising:

superimposing a prescribed low-frequency signal on the drive signal in such a manner that amplitudes of upper and lower envelopes of said drive signal differ;

detecting operating-point drift of the optical modulator based upon the low-frequency signal component contained in an optical signal output from said optical modulator;

controlling the operating point of the optical modulator in dependence upon the drift of the operating point of the optical modulator;

using, as said optical modulator, an optical modulator which includes optical waveguides that branch on a light input side and merge on a light output side two signal electrodes for applying phase modulation to optical signals in the branched optical waveguides on both sides, and two drive-signal input terminals for inputting complimentary drive signals to respective ones of said signal electrodes; and generating two complimentary drive signals having an amplitude between a light-emission culmination and a neighbouring light-extinction culmination of the voltage-optical output characteristic of the optical modulator, and inputting the complimentary drive signals to respective ones of said signal electrodes.

15. A method of controlling an optical modulator, which has a voltage-optical output characteristic in which optical output varies periodically with respect to a voltage value of an electrical drive signal, by the electrical drive signal, which has an amplitude between two light-emission culminations or two light extinction culminations of the voltage-optical output characteristics, said method comprising:

superimposing a prescribed low-frequency signal on the drive signal in such a manner that frequencies of upper and lower envelopes of said drive signal differ;

detecting operating-point drift of the optical modulator based upon the low-frequency signal component contained in an optical signal output from said optical modulator;

controlling the operating point of the optical modulator in dependence upon the drift of the operating point of the optical modulator;

using, as said optical modulator, an optical modulator which includes optical waveguides that branch on alight input side and merge on a light output side two signal electrodes for applying phase modulation to optical signals in the branched optical waveguides on both sides, and two drive-signal input terminals for inputting complimentary drive signals to respective ones of said signal electrodes; and generating two complimentary drive signals having an amplitude between a light-emission culmination and a neighbouring light-extinction culmination of the voltage-optical output characteristic of the optical modulator, and inputting the complimentary drive signals to respective ones of said signal electrodes.

16. A method of controlling an optical modulator, which has a voltage-optical output characteristic in which optical output varies periodically with respect to a voltage value of an electrical drive signal, by the electrical drive signal, which has an amplitude between two light-emission culminations or two light extinction culminations of the voltage-optical output characteristic, said method comprising:

superimposing a prescribed low-frequency signal on the drive signal in such a manner that phases of upper and lower envelopes of said drive signal differ;

detecting operating-point drift of the optical modulator based upon the low-frequency signal component contained in an optical signal output from said optical modulator;

controlling the operating point of the optical modulator in dependence upon the drift of the operating point of the optical modulator;

using, as said optical modulator, an optical modulator which includes optical waveguides that branch on a light input side and merge on a light output side two signal electrodes for applying phase modulation to optical signals in the branched optical waveguides on both sides, and two drive-signal input terminals for inputting complimentary drive signals to respective ones of said signal electrodes; and generating two complimentary drive signals having an amplitude between a light-emission culmination and a neighbouring light-extinction culmination of the voltage-optical output characteristic of the optical modulator, and inputting the complimentary drive signals to respective ones of said signal electrodes.

* * * * *